(12) United States Patent
Almog et al.

(10) Patent No.: US 10,847,897 B2
(45) Date of Patent: Nov. 24, 2020

(54) DIRECTION FINDER ANTENNA SYSTEM

(71) Applicant: Elta Systems Ltd., Ashdod (IL)

(72) Inventors: Benyamin Almog, Givat Brener (IL); Gill Ofer, Kedron (IL)

(73) Assignee: ELTA SYSTEMS LTD, Ashdod (IL)

( * ) Notice: Subject to any disclaimer, the term of this patent is extended or adjusted under 35 U.S.C. 154(b) by 162 days.

(21) Appl. No.: 16/211,854

(22) Filed: Dec. 6, 2018

(65) Prior Publication Data
US 2019/0199004 A1 Jun. 27, 2019

(30) Foreign Application Priority Data
Dec. 27, 2017 (IL) .......................................... 256632

(51) Int. Cl.
| | | |
|---|---|---|
| *H01Q 21/22* | (2006.01) | |
| *H01Q 9/28* | (2006.01) | |
| *H01Q 9/44* | (2006.01) | |
| *H01Q 21/20* | (2006.01) | |
| *H01Q 1/08* | (2006.01) | |
| *G01S 3/48* | (2006.01) | |
| *H01Q 9/20* | (2006.01) | |

(52) U.S. Cl.
CPC .............. *H01Q 21/22* (2013.01); *G01S 3/48* (2013.01); *H01Q 1/085* (2013.01); *H01Q 9/20* (2013.01); *H01Q 9/28* (2013.01); *H01Q 9/44* (2013.01); *H01Q 21/205* (2013.01)

(58) Field of Classification Search
CPC ...... H01Q 21/22; H01Q 21/205; H01Q 1/085; H01Q 1/02; H01Q 9/20; H01Q 9/44; H01Q 9/28; G01S 3/48; G01S 3/16; G01S 3/74; G01S 3/50
USPC ........................................................ 342/445
See application file for complete search history.

(56) References Cited

U.S. PATENT DOCUMENTS

| | | | |
|---|---|---|---|
| 3,691,561 A | 9/1972 | Jager | |
| 4,568,944 A | 2/1986 | Cassel | |
| 4,905,013 A * | 2/1990 | Reindel | .................. H01Q 9/065 |
| | | | 333/21 A |
| 6,346,920 B2 | 2/2002 | Sharp et al. | |
| 7,679,575 B1 | 3/2010 | Horner et al. | |
| 2013/0120209 A1* | 5/2013 | Mak | ...................... H01Q 21/205 |
| | | | 343/819 |
| 2014/0232572 A1 | 8/2014 | Sharawi et al. | |
| 2015/0244076 A1 | 8/2015 | Nitch et al. | |
| 2015/0255882 A1* | 9/2015 | Segador | .................. H01Q 9/285 |
| | | | 343/797 |

FOREIGN PATENT DOCUMENTS

DE 3910877 A1 10/1990

\* cited by examiner

*Primary Examiner* — Harry K Liu
(74) *Attorney, Agent, or Firm* — Dorsey & Whitney LLP

(57) ABSTRACT

A direction-finding antenna system is described. The direction-finding antenna system comprises a plurality of tapered dipole antenna elements arranged in circular array around a central axis. Each tapered dipole antenna element comprises a pair of rectangular elongated antenna elements mounted radially from said central axis and configured to be curved such that a distance between said pair of rectangular elongated antenna elements is larger at periphery of the system with respect to center thereof.

19 Claims, 46 Drawing Sheets

DIRECTION FINDER ANTENNA SYSTEM

TECHNOLOGICAL FIELD

The present invention is in the field of antenna systems and is particularly relevant for direction finding antenna systems.

BACKGROUND

Direction finding antenna systems are used in various fields. Such antenna systems are generally configured for collecting electromagnetic signals, such as radio frequency (RF) signal, and provide output data that enables determining direction from which the received signal was transmitted. Generally, direction finding antenna systems include an array of two or more antenna elements, located at selected positions with predetermined arrangement. The different antenna elements collect input signal with different phases and amplitudes, thereby enabling to reconstruct data on the direction from which the signal was transmitted.

Various techniques have been described, providing broadband direction-finding antenna system. Some of these techniques utilize conical antenna units, partial cone antenna as well as Vivaldi type antenna units. For example U.S. Pat. No. 6,346,920 describes a broadband partial fan cone direction finding antenna and array. The antenna includes a radiator having a partial cone shape. The radiator substantially occupies a spatial area defined by a portion of a cone and the cone is defined by a cone axis, a cone height, and a cone angle. The cone has a base and an apex, and the portion of the cone is defined by a cone sweep angle. The cone sweep angle is determined as the angle subtended by a projection of the portion of the cone projected onto a plane that is perpendicular to the cone axis. The cone sweep angle is less than 360 degrees so that the portion of the cone is bounded on its sides by edges which extend radially from the apex of the cone outward to the base of the cone.

GENERAL DESCRIPTION

As indicated above, direction finding antenna systems are typically required to operate in diverse conditions and enable to determine direction of signals of various RF frequencies. A drawback in typical broadband direction-finding (DF) antenna systems relates to variation in phase difference of signal portions collected by different antenna elements. Generally, for given locations of an array of antenna elements, phase difference between signal portions collected by the antenna elements are determined by frequency of the collected signals. Thus, for determining direction of origin for signals of lower frequency at given accuracy, the antenna array needs to be larger.

The present technique provides for direction finding (DF) antenna system that is capable of determining direction of origin from which collecting signals have been transmitted/arrived. Further, the DF antenna system is configured for enabling to determine direction of origin for wide frequency range (broadband) of signals. The antenna system of the present invention is configured to be of relatively small form factor (with respect to bandwidth of operation) and enables high accuracy of direction finding for various frequencies.

To this end the present technique utilizes an antenna system comprising an array of antenna elements arranges in circular arrangement around a common/central axis. The antenna elements are configured as tapered dipole antenna elements each having a pair of curved arms and configured such that effective phase center for collection of signals is dependent on signal frequency. More specifically, the tapered dipole antenna elements are configured such that for lower frequencies, phase center of each tapered dipole antenna element is located at periphery of the system with respect to phase centers for signals of higher frequency. Preferably, a ratio between wavelength of collected signal and radial distance of the corresponding phase center is within predetermined range. For example, in some configurations of the system, an effective radius of the antenna system for collection of signals at frequency of 100 MHz (wavelength of about 2.998 m) is 1.5 meters, while effective radius for collection of signals at frequency of 1000 MHz (wavelength of about 29.98 cm) is 15 cm. In this example, a ratio $R/\lambda$ is about $R/\lambda \approx 0.5$. Generally, the numerical value of $R/\lambda$ may differ between various configurations of the system relating to material, curvature of the antenna elements etc. In the general configuration according to the present invention the values of $R/\lambda$ may be vary by 50% within the frequency band for which the system is configures.

Thus, according to one broad aspect, the invention provides a direction finding antenna system comprising a plurality of tapered dipole antenna elements arranged in circular array around a central axis; wherein each tapered dipole antenna element comprises a pair of rectangular elongated antenna elements mounted radially from said central axis and configured to be curved such that a distance between said pair of rectangular elongated antenna elements is larger at periphery of the system with respect to center thereof.

The rectangular elongated antenna elements may comprise at least one metal stripe sandwiched between two flexible dielectric stripes. Additionally, or alternatively, the rectangular elongated antenna elements of the dipole antenna elements may be configured with ratio between length dimension and width dimension thereof being greater than 10 (L/W>10).

According to some embodiments, the rectangular elongated antenna elements may be configured with one or more chokes at selected location of the rectangular elongated antenna elements. To this end the rectangular elongated antenna elements may comprise one or more bent metal tips along length thereof. The at least one choke, or bent at least one metal tip, may be located at peripheral end of the rectangular elongated antenna elements. The bent metal tips may comprise at least outward bent and inward bent of different lengths, providing outward and inward chokes.

According to some embodiments, the rectangular elongated antenna elements of said tapered dipole antenna elements may be curved such that phase center of the tapered dipole antenna elements is distal for signals of lower frequency and central for signals of higher frequency.

The curvature of the rectangular elongated antenna elements may be selected to provide a ratio between wavelength of collected signal and radial distance of corresponding phase center of signal detection being within predefined range for a selected bandwidth. For example, $R/\lambda$ may differ by no more than 50% within bandwidth of operation of the system.

According to some embodiments, the plurality of dipole antenna elements may comprise dipole antenna elements of two groups configured for collection of signals of two orthogonal polarizations respectively.

The arrangement of the dipole antenna elements generally defines a general plane for determining signal direction, dipole antenna elements of said two groups may comprise dipole antenna mounted for collection of signals of polarities at +45 degrees and −45 degrees with respect to said general plane.

According to some embodiments, dipole antenna elements may comprise dipole antenna elements mounted for collection of signals having vertical polarization with respect to said general plane. The direction-finding antenna system may further comprise a second circular array of antenna elements configured for collection of signal having horizontal polarization.

According to some embodiments, the DF antenna system may be configured for operation in RF frequencies between 20 MHz and 1200 MHz, or between 20 MHz and 1000 MHz. In some configurations, the DF antenna system may be operable in frequency range between 80 MHz and 600 MHz, or between 80 MHz and 250 MHz, or between 80 MHz and 150 MHz, or between 180 MHz and 250 MHz, or between 400 MHz and 600 MHz.

According to some embodiments, the DF antenna system may be configured to be in mobile mode suitable for low form factor and high mobility and in operation mode configured to be deployed at a selected location for operating in determining direction of origin of collected signals.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A illustrates tapered dipole antenna elements using curved elongated antenna elements and FIG. 1B illustrates a top view of circular arrangement of the tapered dipole antenna elements;

DETAILED DESCRIPTION OF EMBODIMENTS

Figure 1A:
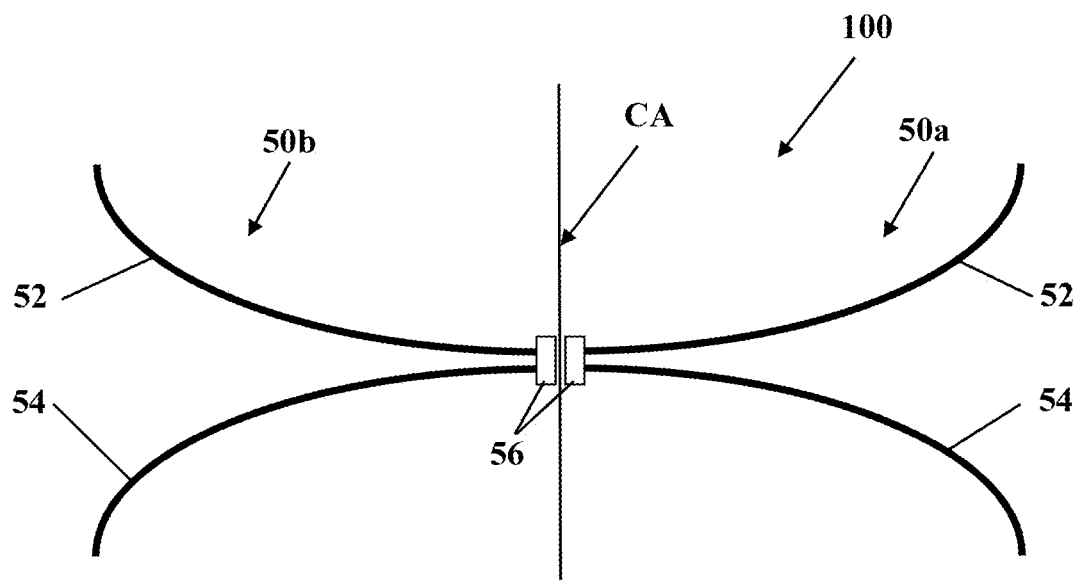
FIGS. 1A and 1B illustrate configuration of a DF antenna system according to some embodiments of the invention.
Figure 1B:
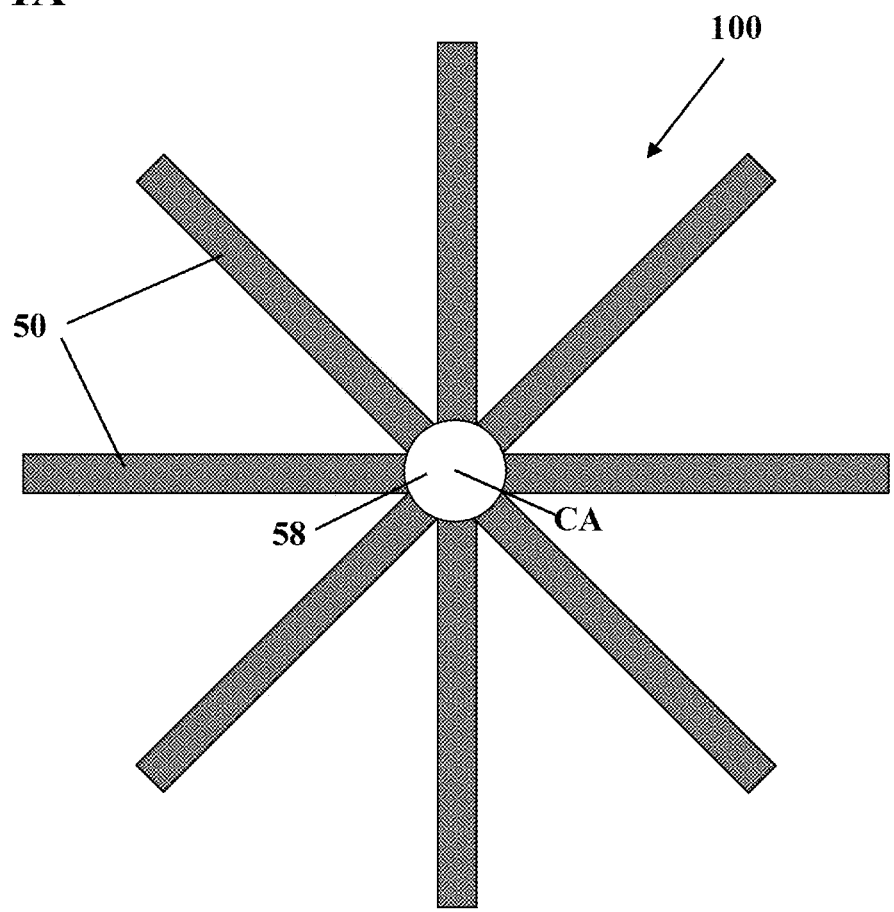

Reference is made to FIGS. 1A and 1B exemplifying direction finding antenna system 100. FIG. 1A illustrates a portion of direction finding antenna system 100 according to some embodiments of the present invention along a horizontal plane; and FIG. 1B illustrates a top view of the DF antenna system 100. In the example of FIG. 1A, the system 100 is illustrated with two dipole antenna elements 50a and 50b. Generally, the DF antenna system 100 is configured with a plurality of three or more dipole antenna elements arranged in circular array about a common/central axis CA, while FIG. 1A illustrates two dipole elements 50a and 50b for simplicity and to illustrate the structure of the dipole elements. The dipole antenna elements 50a and 50b are configured as tapered dipole antenna elements having tapering directed away from central axis of the system 100.

Each of the dipole antenna elements 50a and 50b include a pair of rectangular elongated antenna elements 52 and 54 that are mounted radially from the common axis CA, and generally an adaptor/connector unit 56 providing electronic connection to the antenna elements for feed and readout. The rectangular elongated elements 52 and 54 are mounted to be curved as illustrated in FIG. 1A. Effectively, a distance between the rectangular elongated antenna elements 52 and 54 grows from center (closer to axis CA) toward periphery of the system 100. Thus, a collection aperture of the antenna system 100 effectively increases as the frequency of collected signal decreases.

FIG. 1B illustrates a top view of DF antenna system 100 according to some examples of the invention. As shown, system 100 in this example includes eight dipole antenna elements, generally at 50, arranged in circular array around a common axis CA. In this example, the dipole antenna elements 50 are connected to a central feed/readout box 58 providing electronic connection to the plurality of antenna elements. It should be generally noted that the DF antenna system of the invention may be configured with three or more dipole antenna elements 50. More specifically, the system 100 may be configured with 4, 5, 6, 7, 8, 9 or more dipole antenna elements in circular array.

Generally, the DF antenna system 100 according to the present techniques is configured for collecting input electromagnetic signals and providing output data indicative of direction from which the collected signal has been transmitted from, or has arrived. To this end the different dipole antenna elements 50 of system 100 are located in a predetermined array configuration, such that phase and temporal variations of signals as collected by each dipole antenna element provide data about direction of propagation of the signal, and thus of direction to its source. As the collected signal is generally of unknown source, direction and frequency band, the DF antenna system is preferably capable for operating at wide bandwidth. To this end, the dipole antenna elements of the present technique are configured with selected curvature providing variation in phase center in accordance with signal frequency.

More specifically, electromagnetic signals of higher frequency are collected at central portions of the dipole antenna element, where the distance between the rectangular curved antenna elements is smaller. This is while electromagnetic signals of lower frequency (longer wavelength) are effectively collected at peripheral portion of the dipole antenna element, where the distance between the rectangular curved antenna elements is greater. Accordingly, the location of phase centers of each tapered dipole antenna element is shifted radially in accordance with frequency of collected signals providing effective variation in aperture of signal collection. The effective aperture (radius of the DF system circular arrangement) is increased for collection of signals of lower frequency, and reduced for collection of signals of higher frequency. This maintains phase center variations with respect to signal frequency, and enables the DF system to identify direction of origin of the collected signals within wide frequency bandwidth. In some exemplary configurations, the curvature of the rectangular elongated antenna elements is selected to provide that radial location R (with respect to the central axis CA) of effective phase center for collection of signal of wavelength $\lambda$, provides a ratio $R/\lambda$ being substantially constant, or varying within no more than 50% for different wavelengths within the frequency band that the antenna system is designed for. For example, some configurations provide radial location of phase center for collection of signal at frequency of 1000 MHz at 15 cm from the CA, and radial location of phase center for collection of signals at frequency of 100 MHz to be at 150 cm from the CA.

Figure 2:
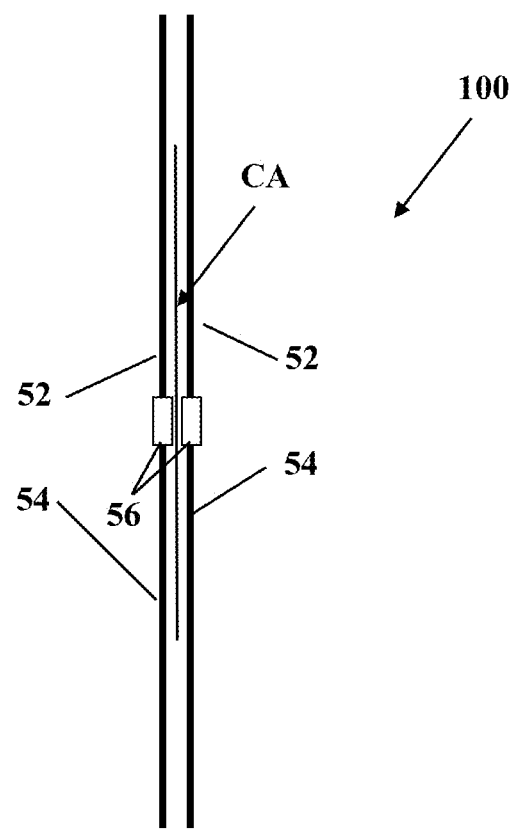
FIG. 2 exemplifies possible closed configuration of the DF antenna system according to some embodiments.

Additionally, the DF antenna system of the present invention may be configured to be partially portable and can be deployed at a selected region. To this end the antenna system 100 is preferably configured with relatively low form factor and reduced material weight. Reference is made to FIG. 2 illustrating an exemplary configuration of DF antenna system 100 in a folded position. As shown, the antenna elements 52 and 54 may be aligned along the central axis CA. The antenna elements may be aligned toward different direction as illustrated in FIG. 2, or toward a similar direction, i.e. both rectangular elongated antenna elements of each dipole antenna element are aligned upward or downward, or one rectangular elongated antenna element is aligned upward and the other one is aligned downward with respect to the central axis. Alternatively, the antenna system 100 may be configured to be taken apart by disconnecting the rectangular elongated antenna elements from the central axis CA. In this connection, it should be noted that the DF antenna system 100 as described herein is preferably configured to be relatively mobile and having low form factor, with respect to size of antenna elements required for collection of electromagnetic signals of the respective bandwidth. Accordingly, the use of rectangular elongated antenna elements is preferred over the fan-like elements as known in the art, for reducing weight and size of the antenna system, while maintaining effective collection of electromagnetic signals.

Figure 3:
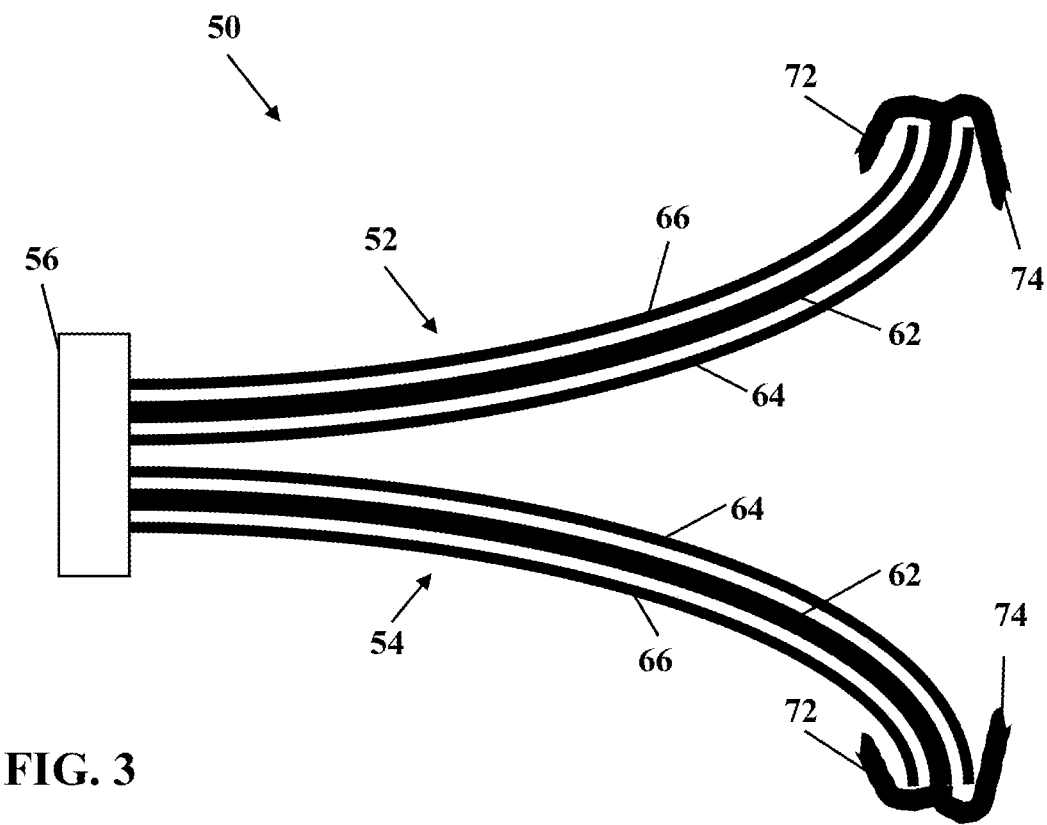
FIG. 3 exemplifies tapered dipole antenna element utilizing peripheral chokes and external dielectric cover according to some embodiments of the invention.

Reference is further made to FIG. 3 illustrating a dipole antenna element 50 according to some embodiments of the invention. As shown, the dipole antenna element 50 includes adapter/connector unit 56 located at vicinity of the central axis, and two rectangular elongated antenna elements 52 and 54 extending from the adaptor 56 toward periphery of the antenna system, while having selected curvature to provide tapered dipole antenna element 50. The rectangular elongated antenna elements may be configured by conducting (e.g. metallic) stripes, e.g. at 62, located between two dielectric stripes 64 and 66. Preferably, the dielectric stripes 64 and 66 are flexible, enabling bending of the elongated antenna elements 52 and 54 to the desired curvature.

Also, as illustrated in FIG. 3, the rectangular elongated antenna elements 52 and 54 may further include one or more chokes, illustrates herein as bent metal tips, along length thereof. The bent metal tips 72 and 74 of the chokes are exemplified at peripheral end of the elongated antenna elements 52 and 54. However, it should be understood that the bent tips may be located at any point along the element 52 or 54. Generally, the dipole antenna element 50 may include outward/external bents, e.g. 72, directed outward from tapering of the dipole antenna element, and inward/internal bents, e.g. 74, directed inward with respect to tapering of the dipole antenna element. Generally, the outward 72 and inward 74 bents may be of different length. Typically, bended tips in antenna units are provided for reducing interference of signals reflected from the material of the antenna element. The use of bended tips of different lengths may provide further elimination of signal interferences for signals of broad frequency range.

Figure 4A:
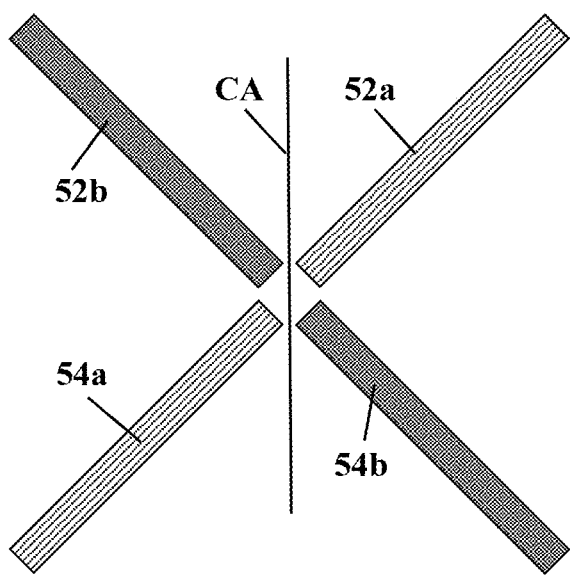
FIGS. 4A and 4B illustrate tapered dipole antenna elements' configuration for collection of signals with various polarizations.
Figure 4B:
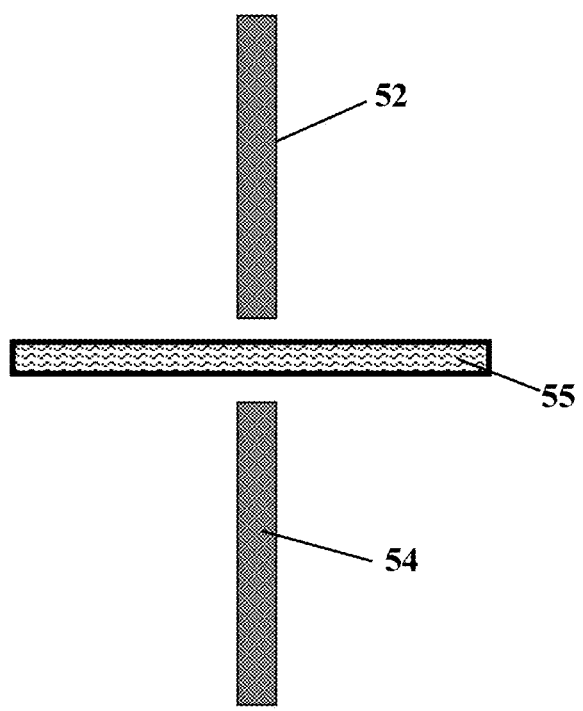

The DF antenna system 100 according to the present technique may also be configured for collecting signals of various polarization states for determining direction from which the signals originate. Reference is made to FIGS. 4A and 4B exemplifying dipole antenna elements' configurations enabling collection of signals of different polarizations. FIG. 4A illustrates overlapping tapered dipole antenna elements arranged at ±45° with respect to a plane defined by the circular arrangement of the tapered dipole antenna elements, and FIG. 4B illustrates tapered dipole antenna element align vertically combined with additional dipole antenna element aligned horizontally, with respect to a plane defined by circular arrangement of the antenna system. FIGS. 4A and 4B are illustrated as seen along radial axis of the antenna system, and the central axis CA is marked in FIG. 4A to simplify understanding. As shown in FIG. 4A, rectangular elongated antenna elements 52a and 54a form a dipole antenna element aligned at +45° and rectangular elongated antenna elements 52b and 54b for dipole antenna element aligned at −45°. This configuration enables detection of signals having generally any polarization. In the example of FIG. 4B, rectangular antenna elements 52 and 54 for dipole antenna element aligned vertical to plane defined by the circular array of the antenna system (perpendicular to the central axis), and configured for collecting signals with vertical polarization. In this example, the antenna system further includes additional arrangement of dipole antenna element 55 configured for collecting signals of horizontal polarization. Such combined polarization dipole antenna elements provide for collecting input electromagnetic signals having any possible polarization state, such as linear polarization along horizontal, vertical axes or at an angle between them, as well as circular polarization states.

According to some examples, the DF antenna system was tested with several curvature profiles. FIGS. 5A to 5D exemplify DF antenna system configured with an arrangement of seven (7) dipole antenna elements configured in a circular array. Each dipole antenna element includes a pair of exponentially curved rectangular elongated antenna elements providing radius of the circular arrangement of 1500 mm. In some examples, the actual portion of the radius formed by the elongated antenna element 52 and 54 is about 1300 mm resulting from the connections/adaptors connecting the antenna element and located around the central axis CA. The actual length of each antenna element may be greater along the curvature thereof.

Figure 5A:
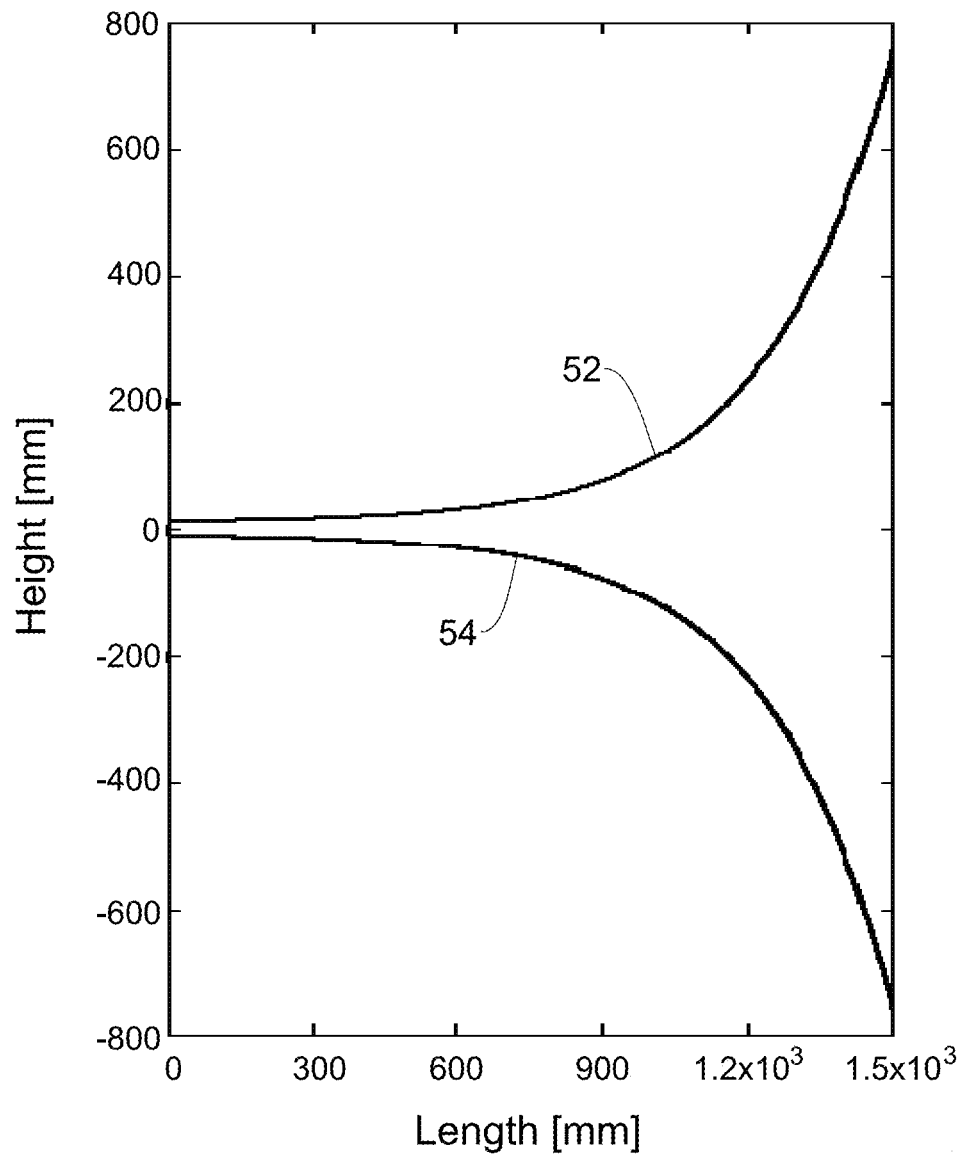
FIGS. 5A to 5D exemplify tapered dipole antenna elements (FIG. 5A), DF system configuration (FIG. 5B), simulated S11 parameter (FIG. 5C) and expected gain (FIG. 5D) for exponential curve profile according to some embodiments of the invention.
Figure 5B:
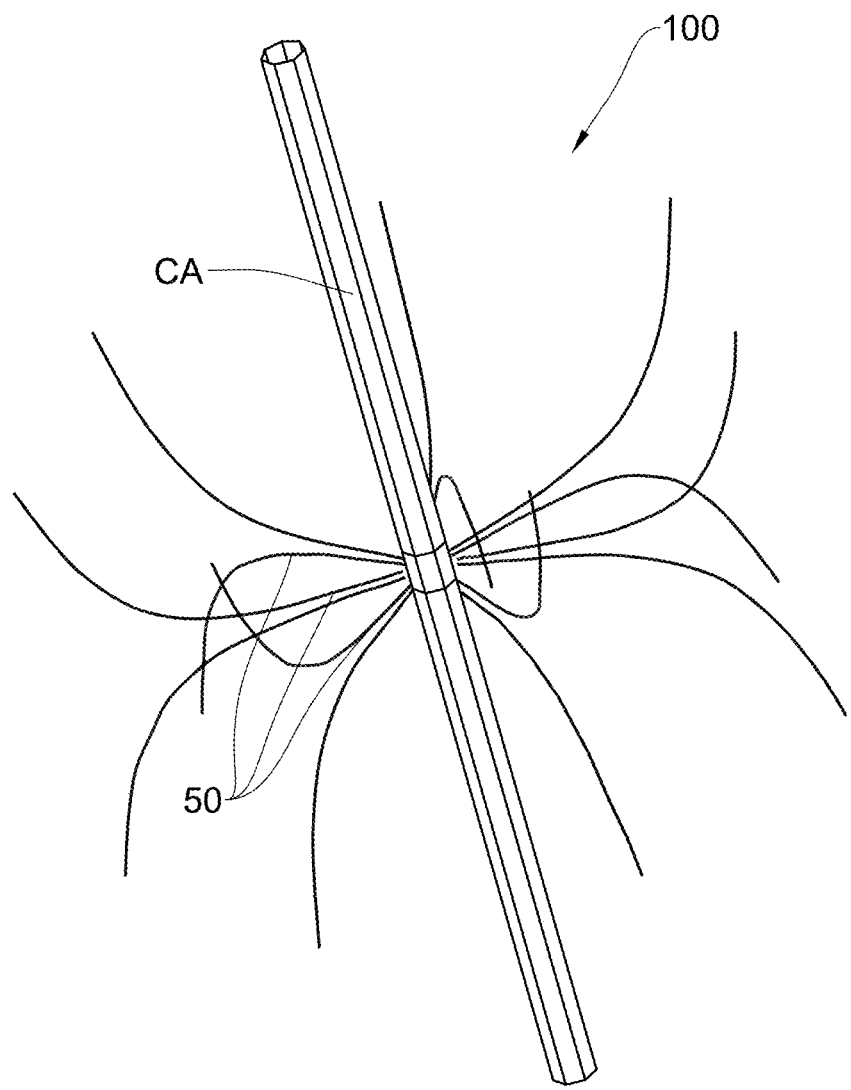
Figure 5C:
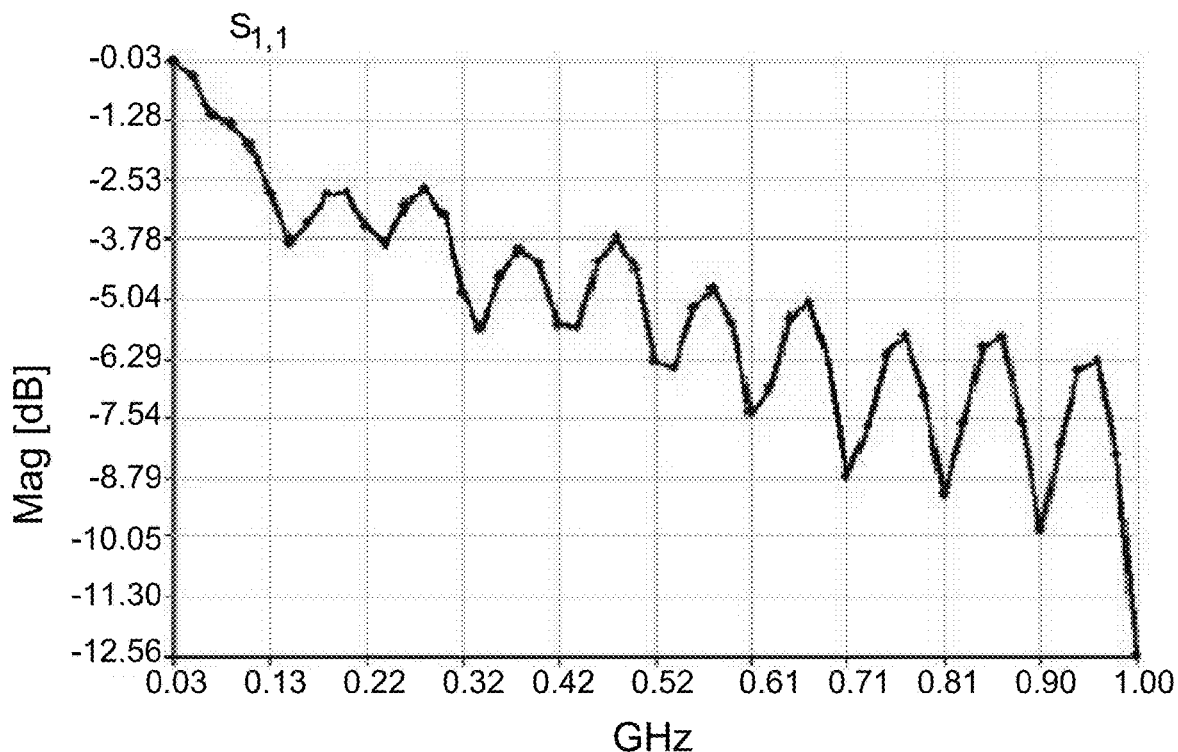
Figure 5D:
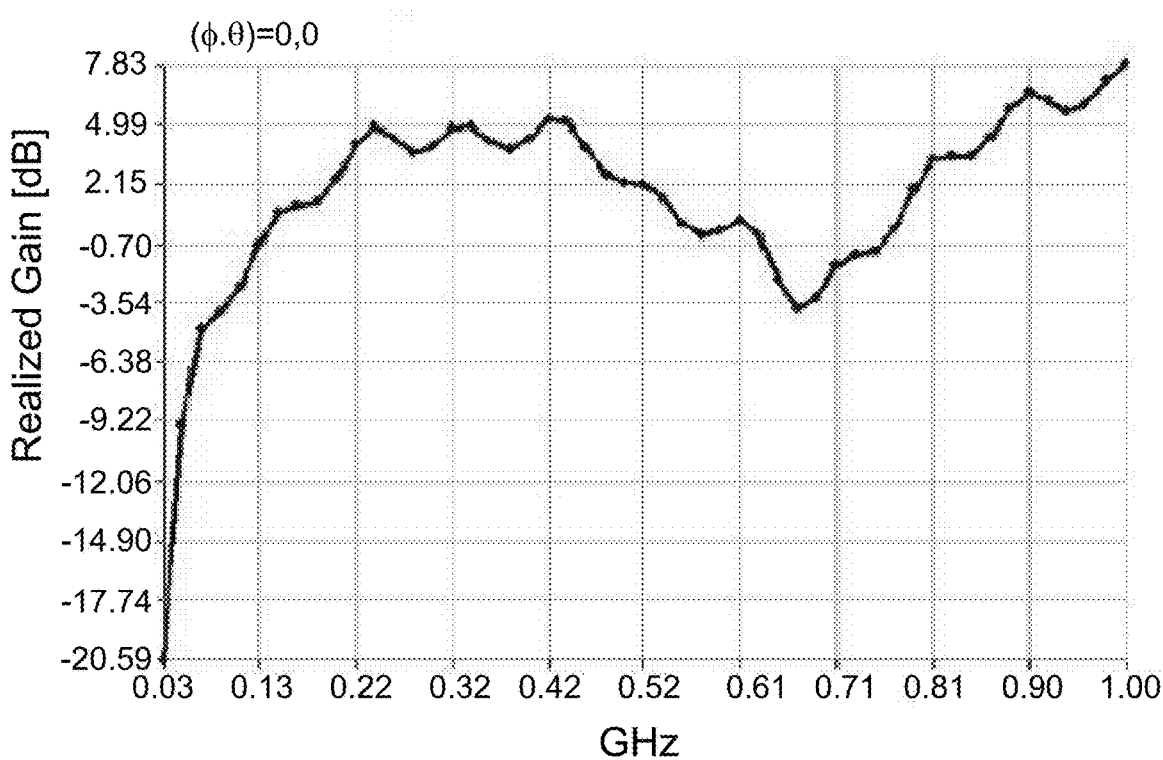
Figure 6A:
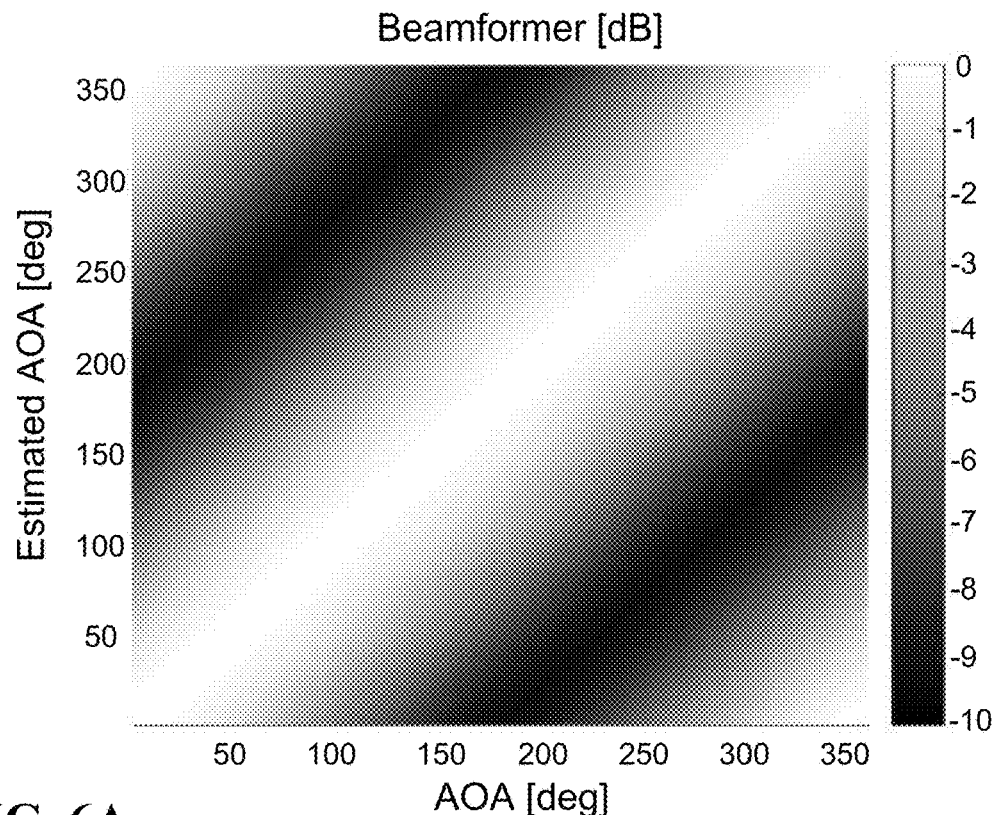
FIGS. 6A to 6D show beam pattern maps for signals having frequencies of 30 MHz, 150 MHz 500 MHz and 1000 MHz respectively.
Figure 6B:
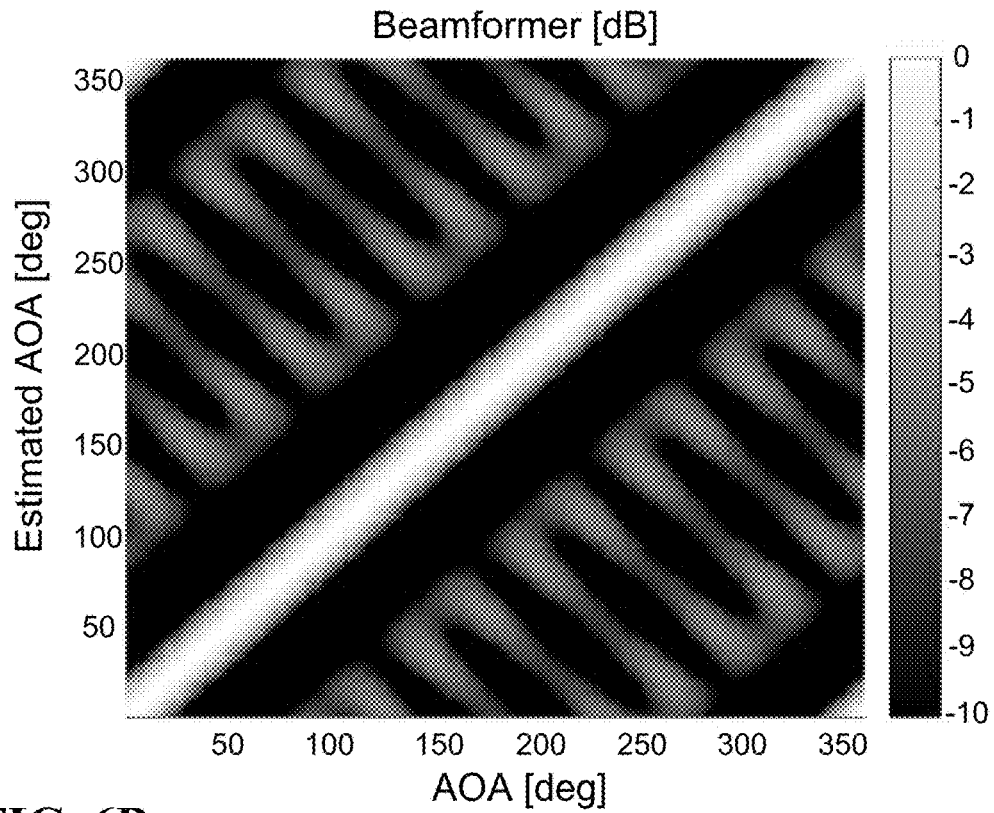
Figure 6C:
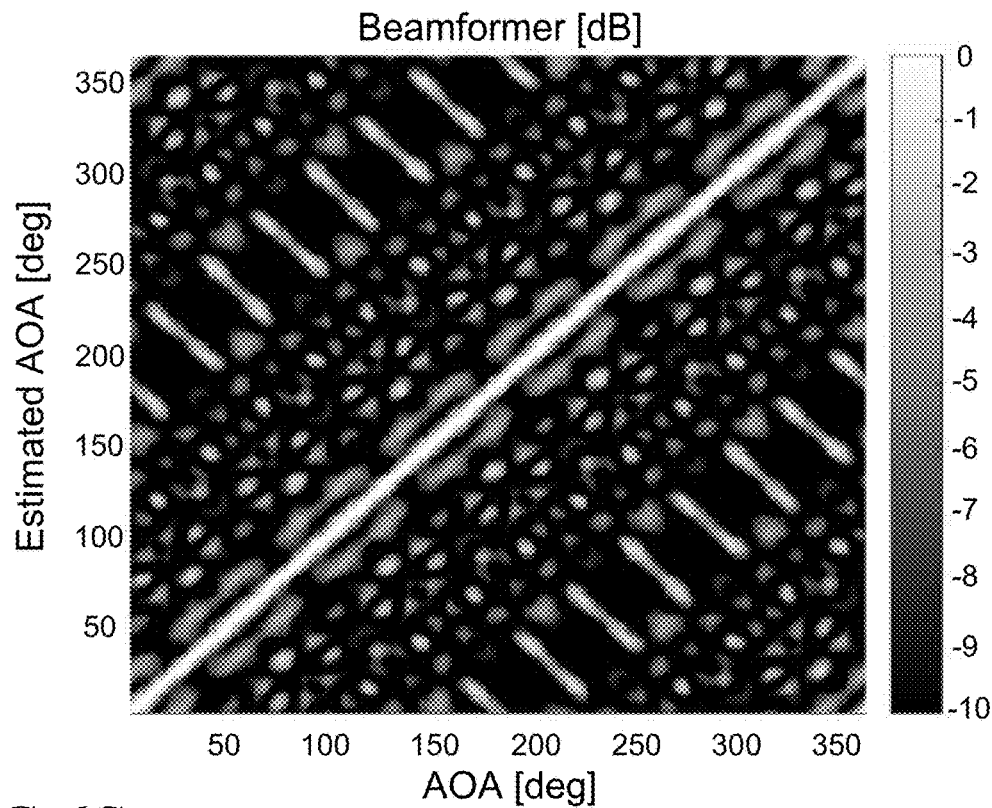
Figure 6D:
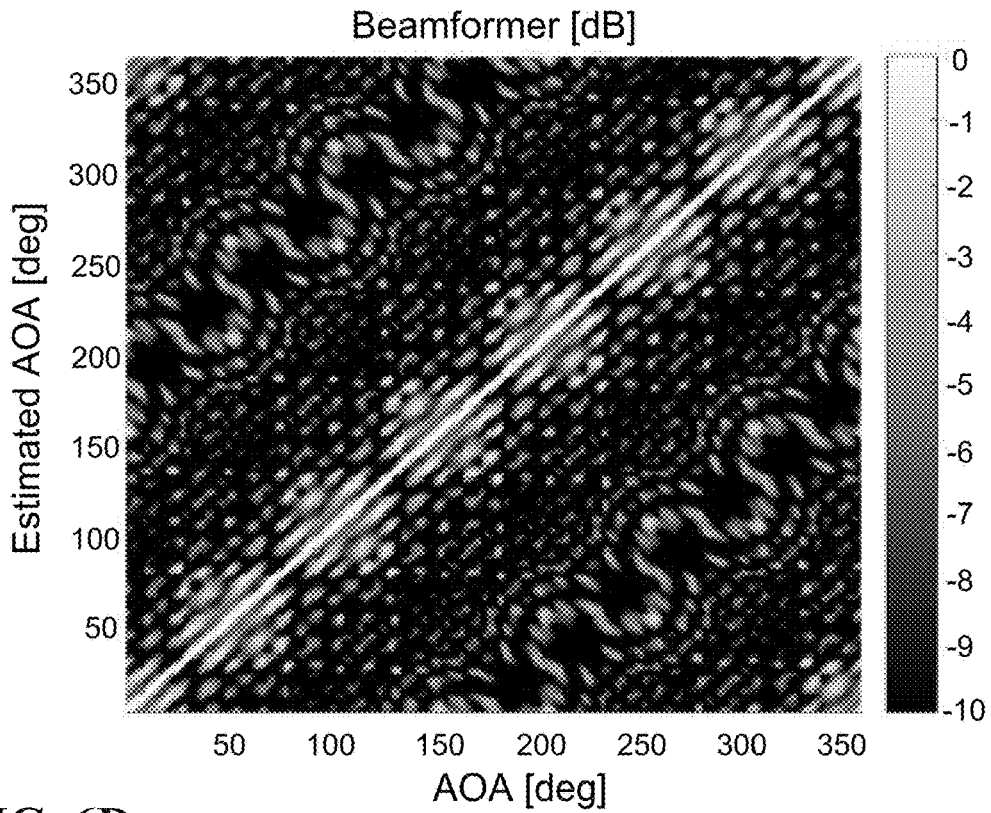

FIG. 5A illustrates curvature of a pair of rectangular antenna elements 52 and 54, curved to provide an Exponential curve described by a general formula $ae^{br}+c$ for antenna element 52, and $-ae^{br}-c$ for antenna element 54 (where r is the radial coordinate indicating distance from the central axis along a plane defined by the circular array). FIG. 5B illustrates a three-dimensional representation of the antenna system 100 having 7 dipole antenna elements in circular array around central axis and where each of the dipole antenna elements include pair of exponentially curved antenna elements. FIG. 5C shows expected S11 data simulated for the antenna system of FIG. 5B, and FIG. 5D shows simulated expected gain.

Direction finding results of this exemplary antenna system are illustrates in FIGS. 6A to 6D showing DF results for collected signals at frequencies of 30 MHz, 150 MHz, 500 MHz and 1000 MHz respectively. These results illustrate estimates angle of arrival (AOA) determined for collected signals of various angles of arrival (AOA). For each collected signal of certain AOA, the antenna system generates output data indicative of phase variations between signal portions as collected by each of the dipole antenna elements. This phase variation map enables determining an estimated AOA shown for each of the various AOA values. In the figures, bright color indicated high estimation values (the estimated AOA's). As seen, the diagonal line indicating agreement between the estimated AOA and the actual AOA is bright, showing accurate direction finding data.

Figure 7A:
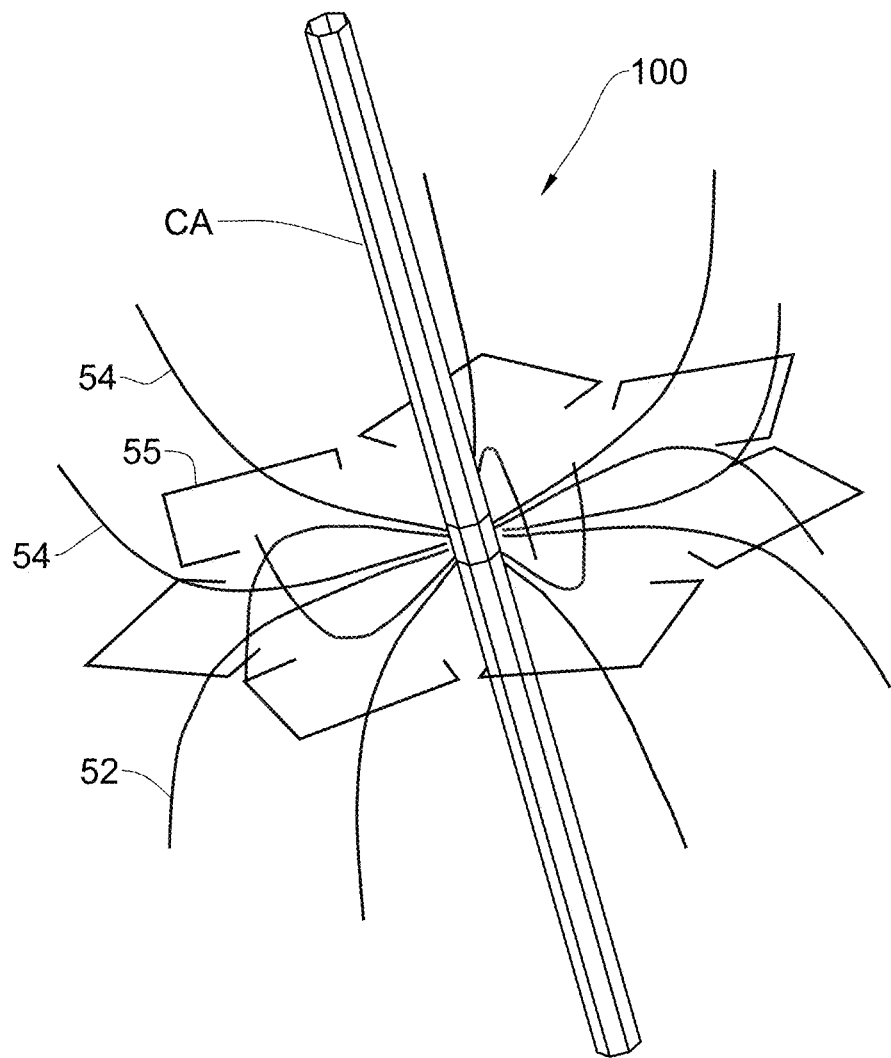
FIGS. 7A to 7C exemplifies configuration of DF antenna system using exponential curved antenna elements and additional horizontal dipole antenna elements (FIG. 7A), corresponding simulated S11 (FIG. 7B) and expected gain (FIG. 7C)
Figure 7B:
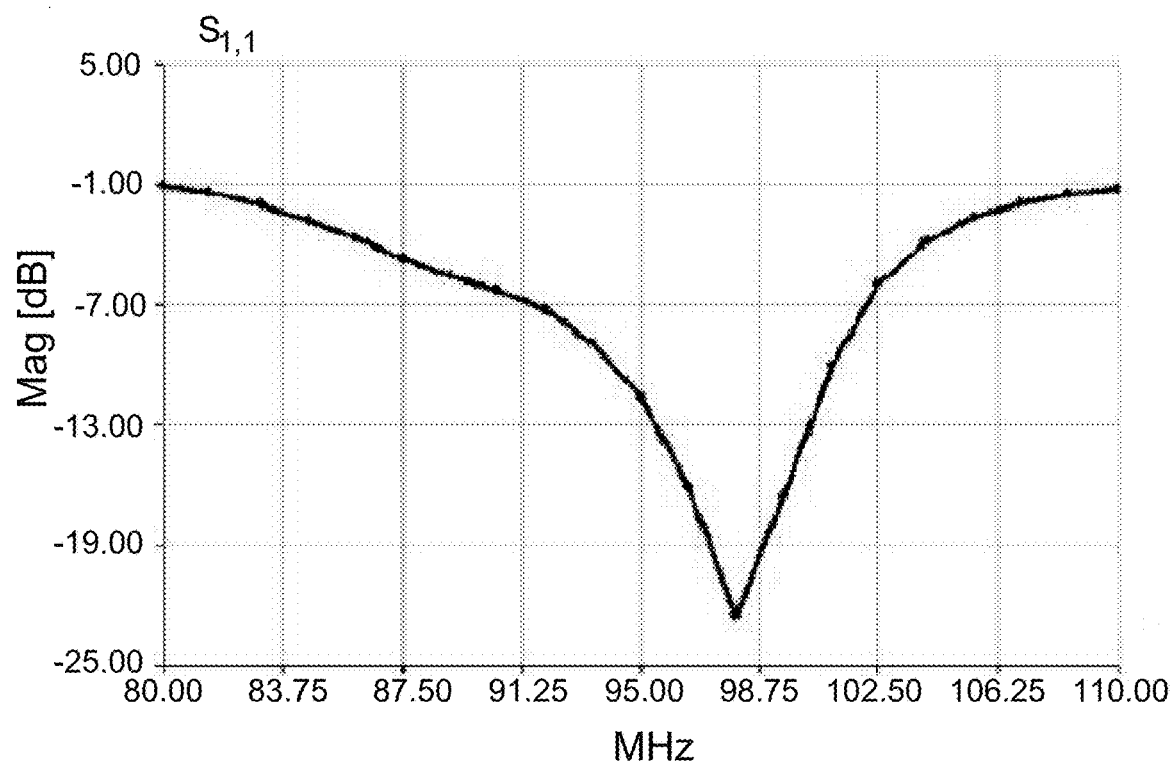
Figure 7C:
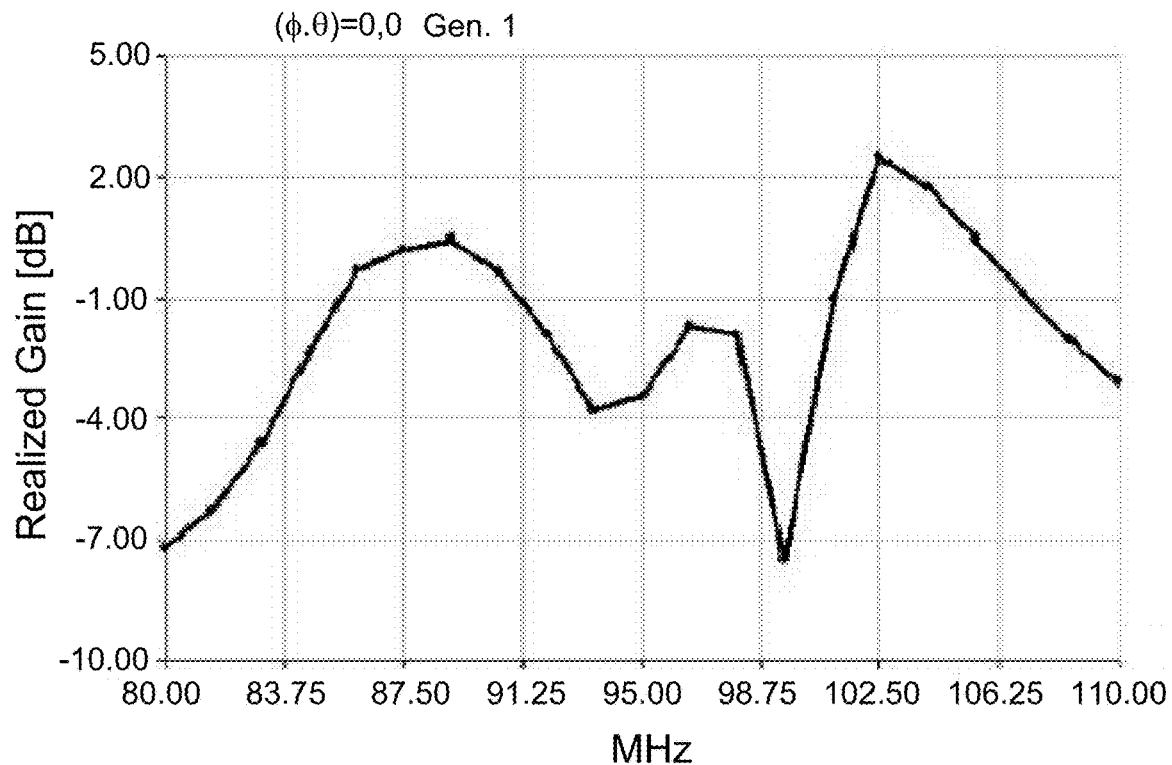
Figure 8A:
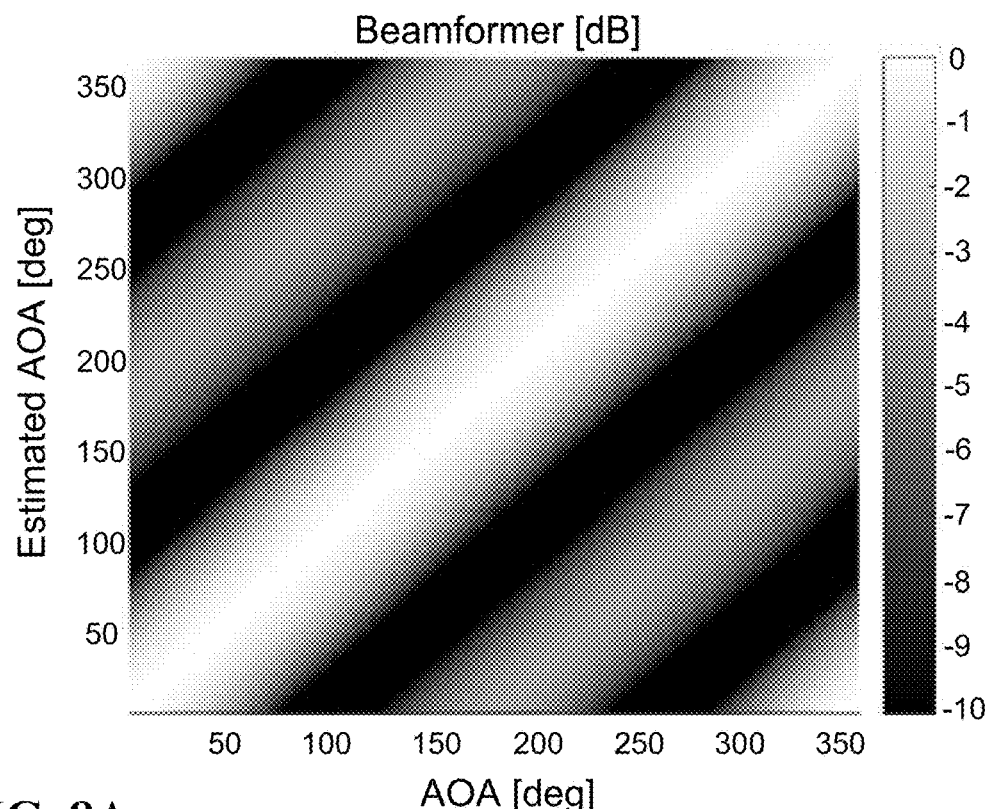
FIGS. 8A to 8D show beam pattern maps for signal frequencies of 88 MHz, 96 MHz, 100 MHz and 108 MHz respectively with horizontal polarization collected by the horizontal dipole antenna elements of FIG. 7A.
Figure 8B:
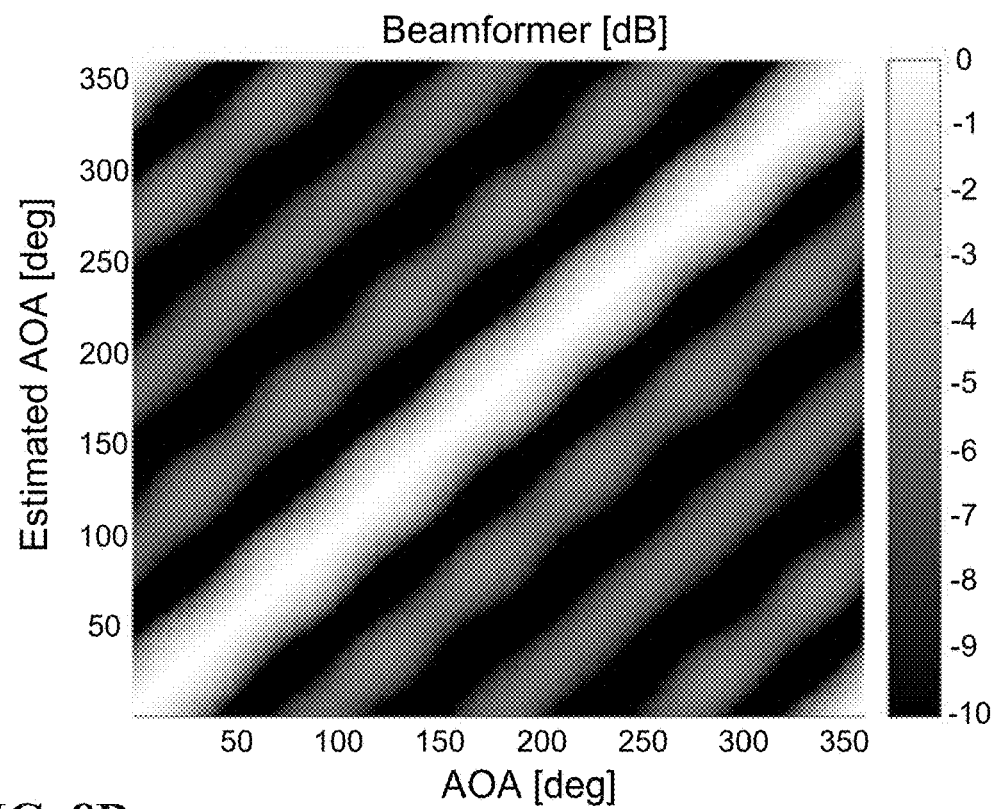
Figure 8C:
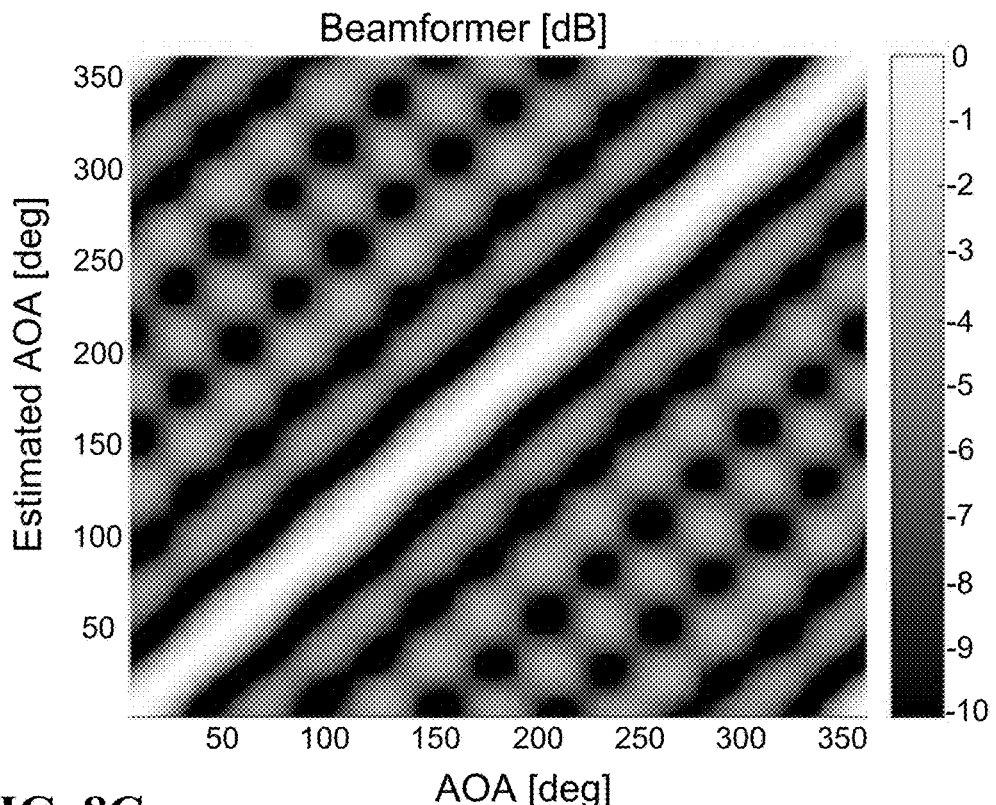
Figure 8D:
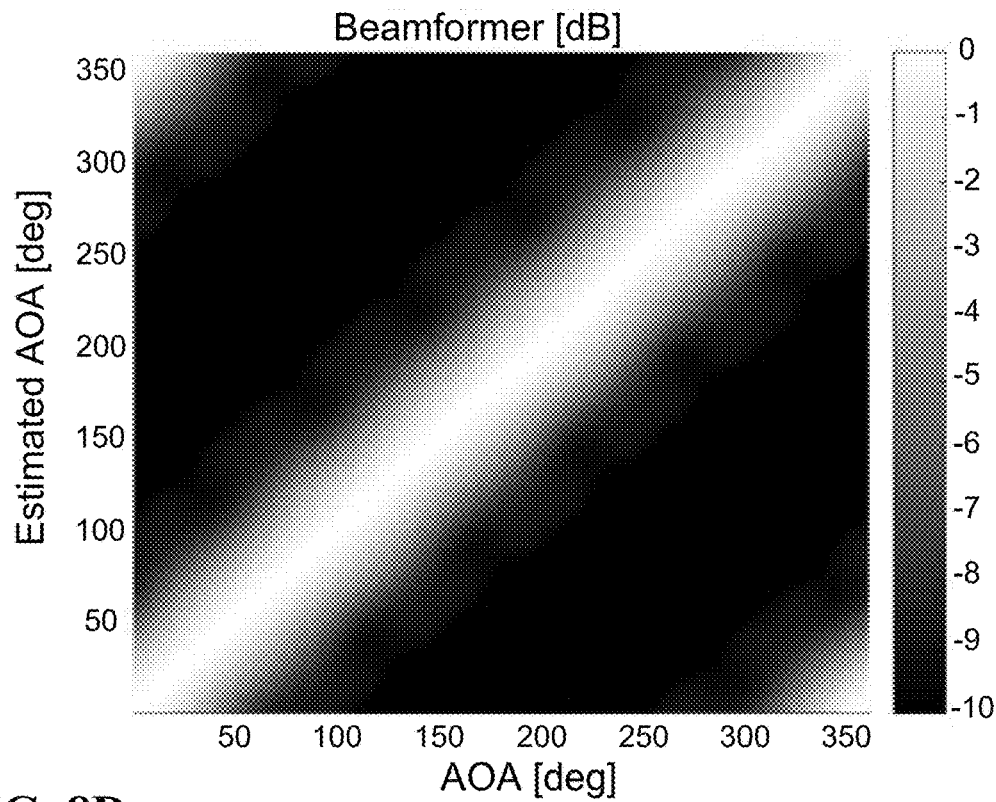

An additional example is illustrated in FIG. 7A with simulated S11 and gain results shown in FIGS. 7B and 7C. This example is based on the configuration illustrated in FIG. 4B utilizing dipole antenna elements utilizing curved elongated antenna elements 52 and 54 in combination with a horizontal bent dipole antenna element 55. This configuration provides for collecting electromagnetic signals having different polarizations where the linear vertical polarization components of signals are collected by antenna elements 52 and 54 provides wide bandwidth while collection of the horizontal polarization components has relatively narrow band, e.g. of 50 MHz to 150 MHz. FIGS. 7B and 7C show estimated S11 and Gain values for the bandwidth of 80 MHz to 110 MHz (or 88 MHz to 108 MHz) indicating overall good performance.

Direction finding simulation results in the form of beam pattern graphs are shown in FIGS. 8A to 8D corresponding with signal frequencies of 88 MHz, 96 MHz, 100 MHz and 108 MHz with horizontal polarization. These results show clear correspondence between the angle of arrival (AOA) and the estimated AOA determined based on signal collection using the DF antenna system and effective direction-finding performance by the dipole antenna elements 55 configured for collecting signals of horizontal polarization.

Additional exemplary configurations are illustrated in FIGS. 9A-9I, 10A-10I, 11A-11I and 12A-12I. These configurations vary in structure of the tapered dipole antenna elements of the DF antenna system.

Figure 9A:
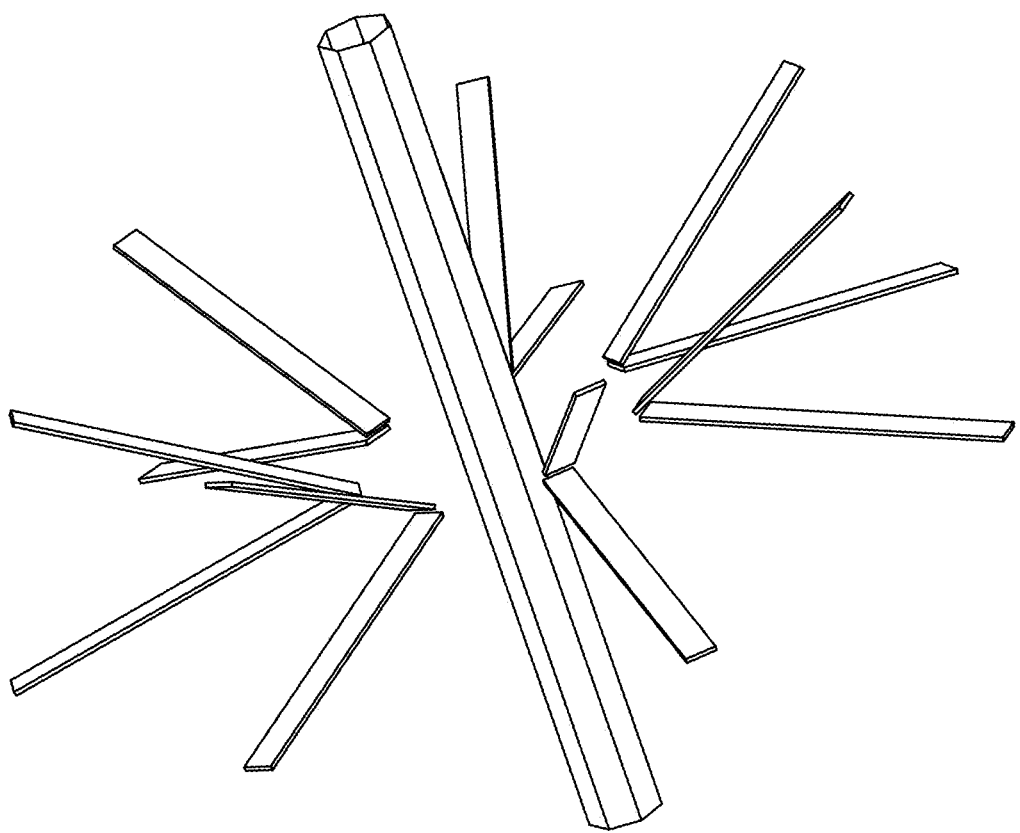
FIGS. 9A-9I illustrate DF antenna system with linear configuration of the tapered dipole antenna elements (FIG. 9A) and beam patterns for signal frequencies of 30 MHz, 130 MHz, 180 MHz, 220 MHz, 300 MHz, 500 MHz, 750 MHz and 1000 MHz in FIGS. 9B to 9I respectively.
Figure 9B:
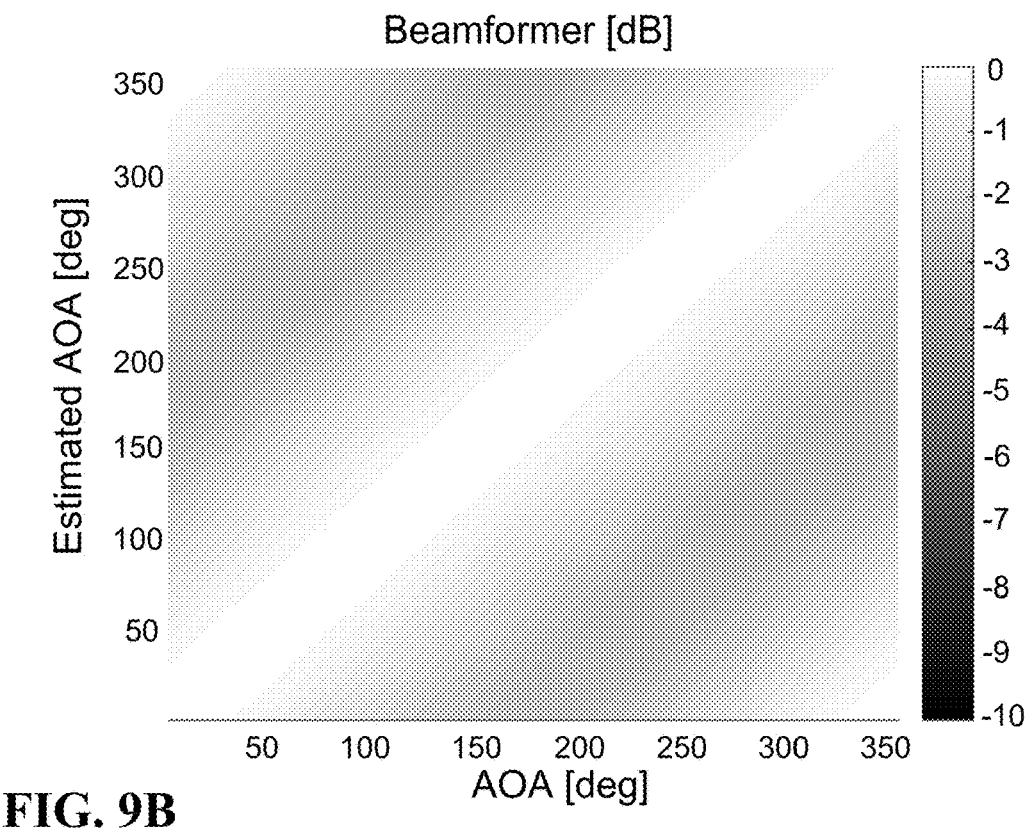
Figure 9C:
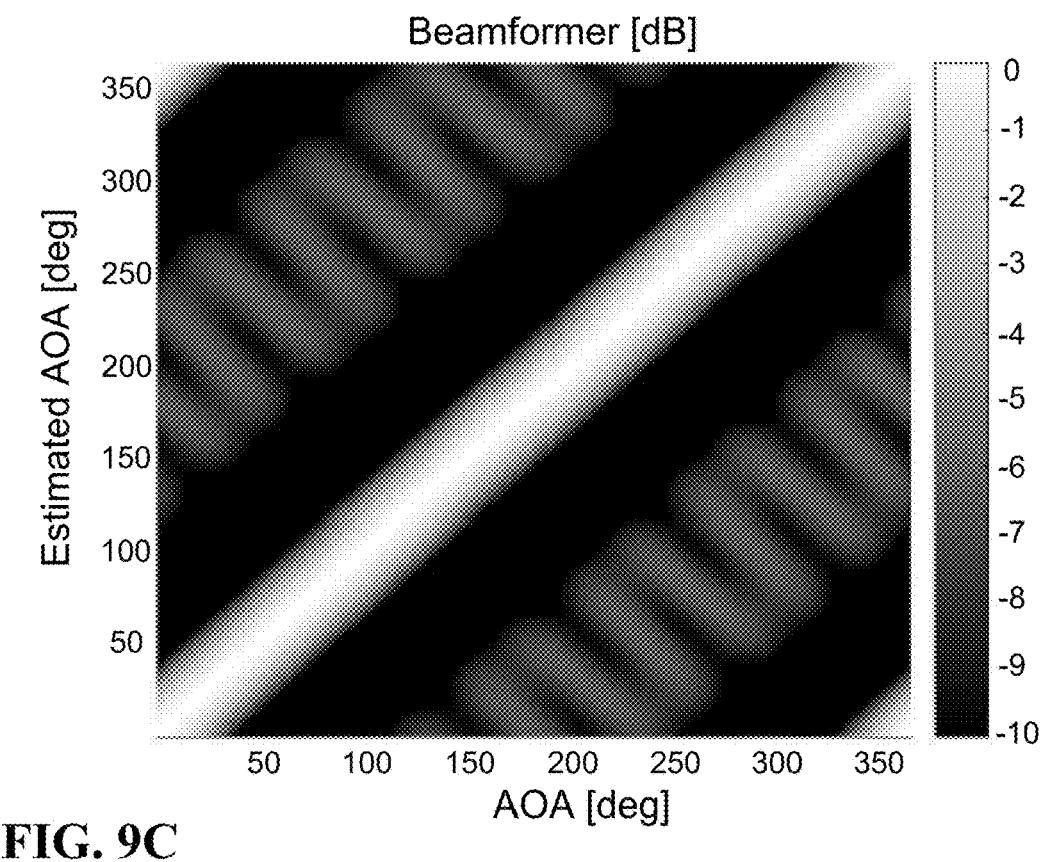
Figure 9D:
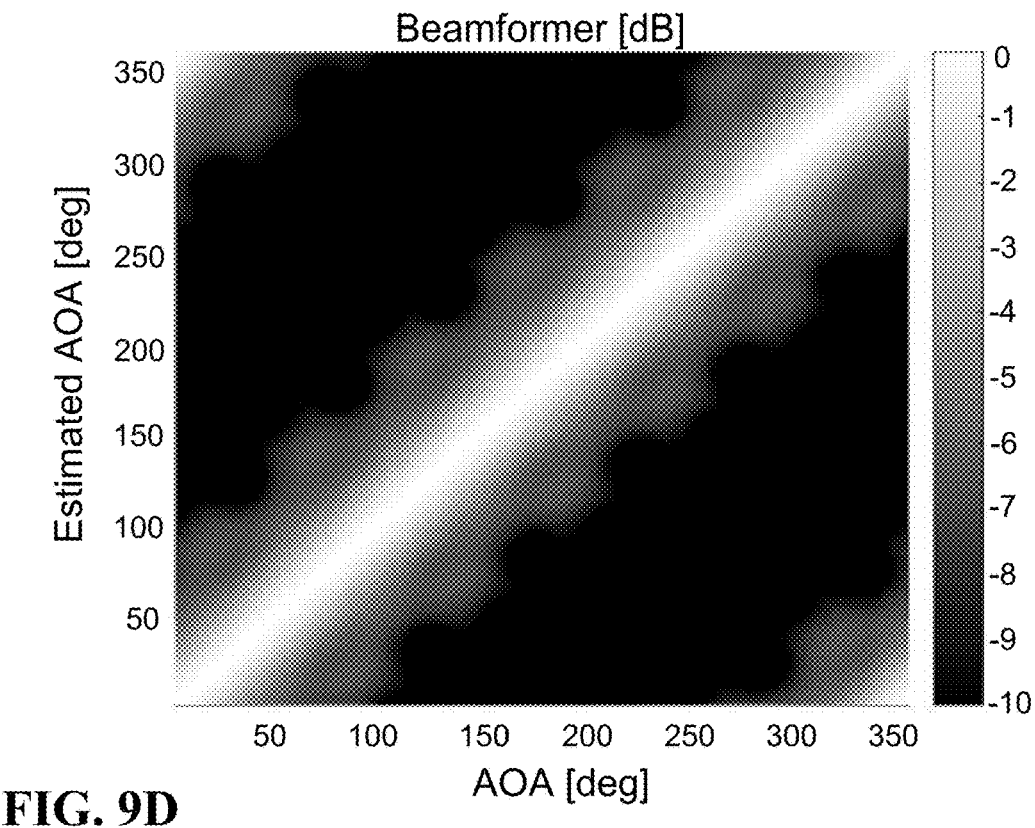
Figure 9E:
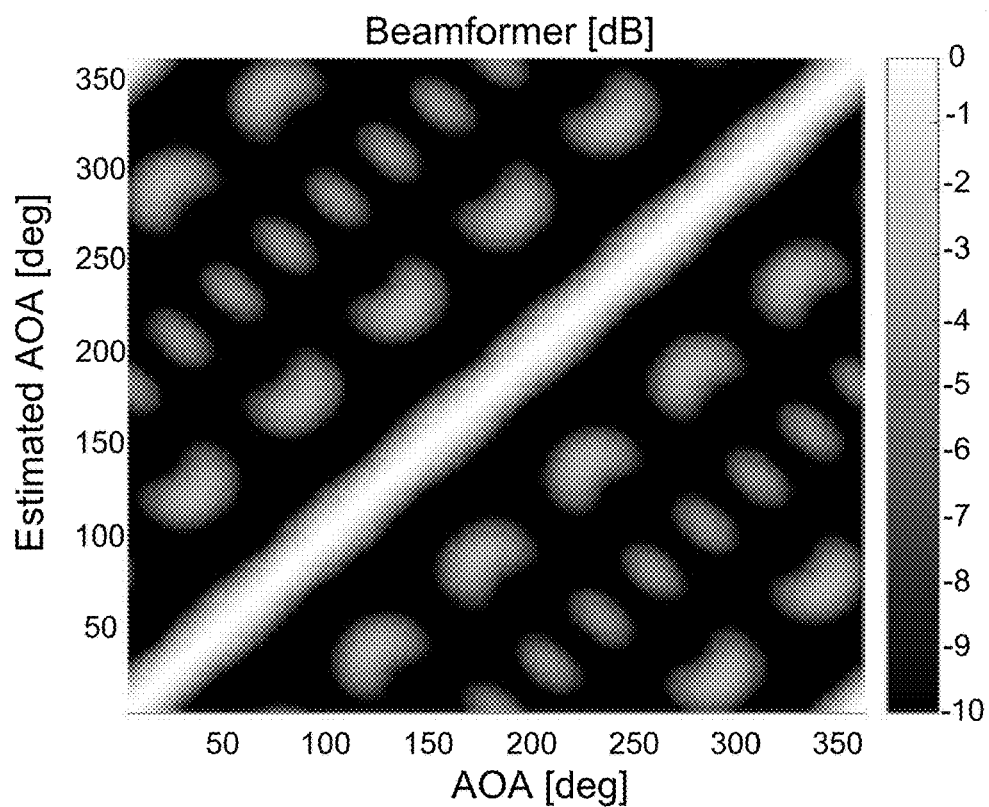
Figure 9F:
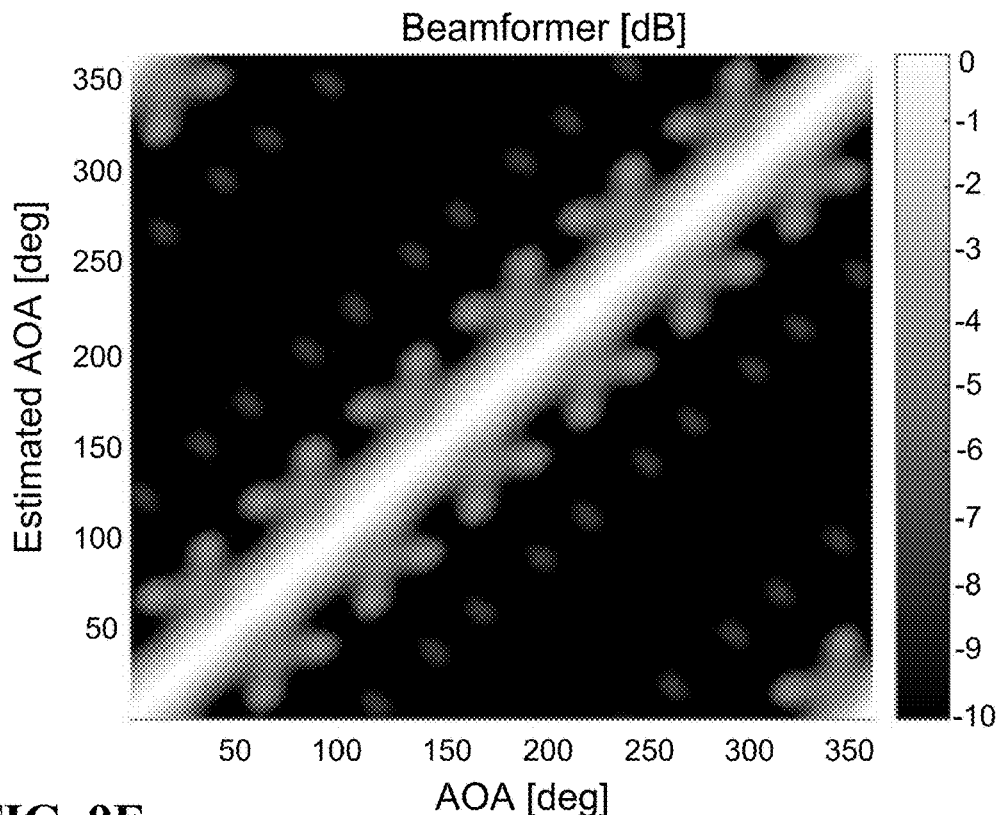
Figure 9G:
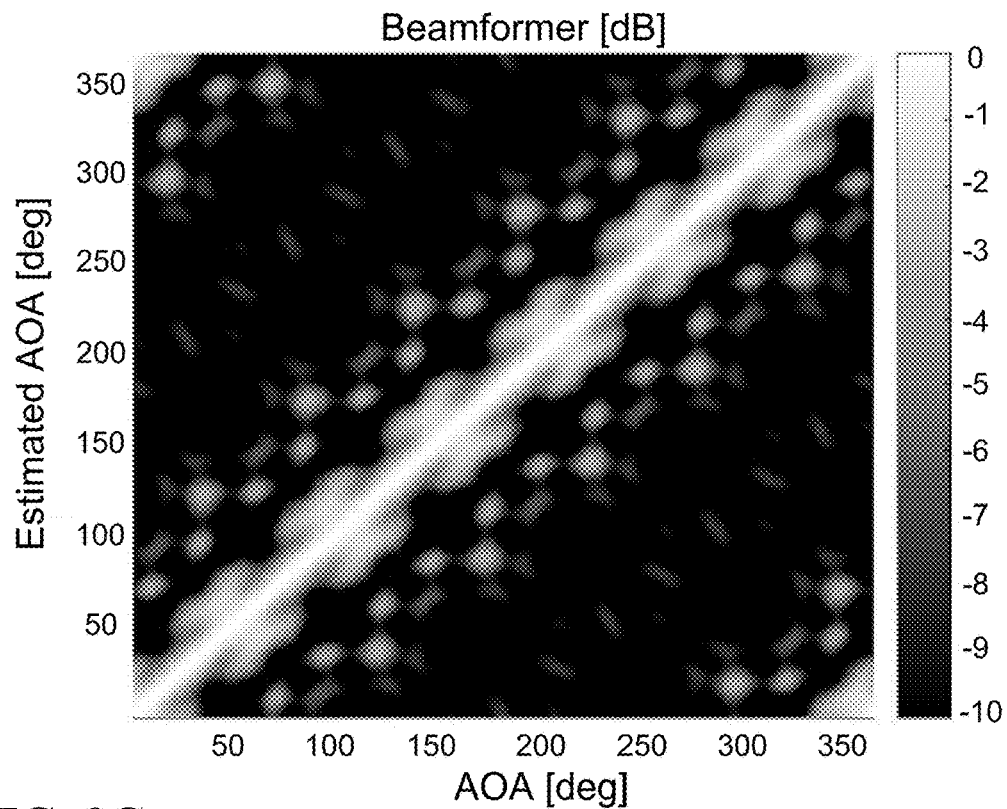
Figure 9H:
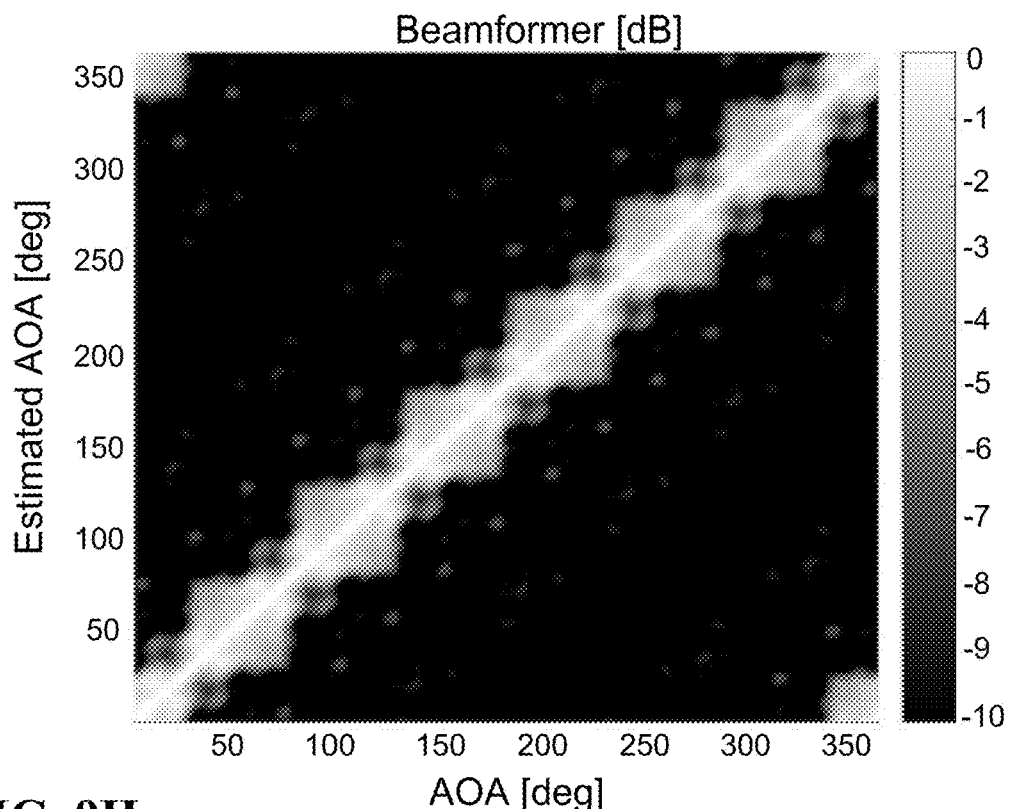
Figure 9I:
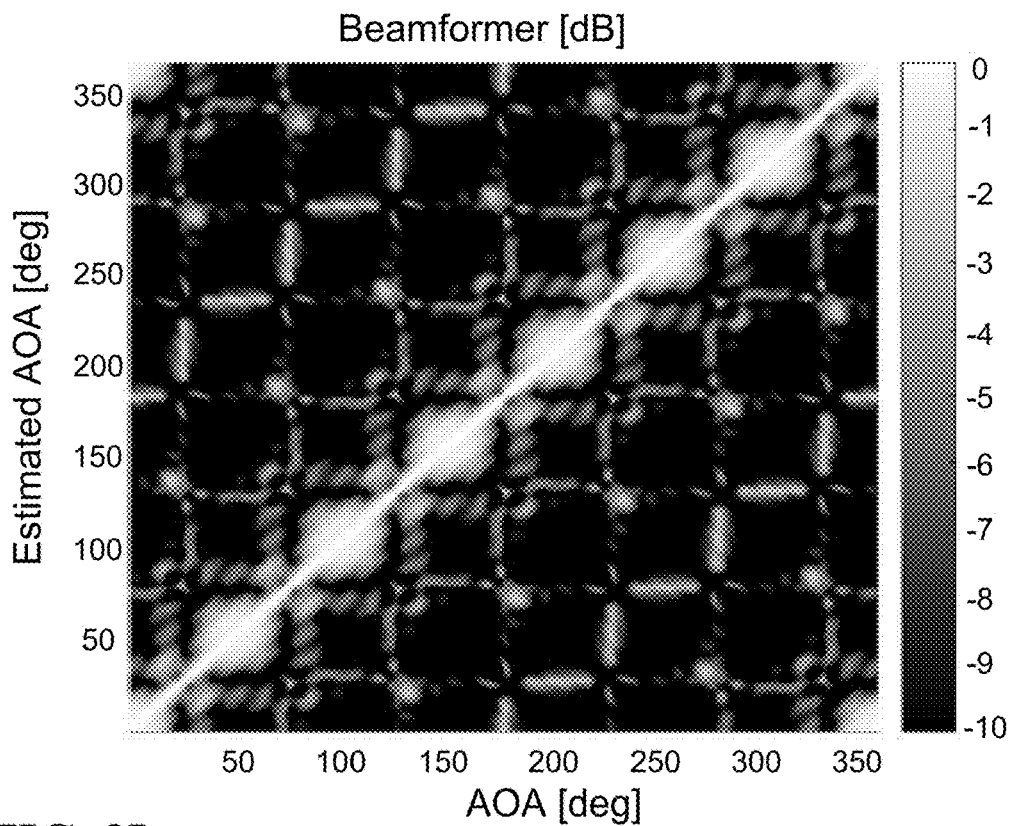

FIGS. 9A to 9I illustrate configuration of DF antenna system utilizing linear elongated antenna elements of the tapered dipole antenna elements. FIG. 9A illustrates structure of the antenna system and FIGS. 9B to 9I show beam pattern graphs indicative of operation of the direction-finding technique and accuracy thereof for signal frequencies of 30 MHz, 130 MHz, 180 MHz, 220 MHz, 300 MHz, 500 MHz, 750 MHz and 1000 MHz respectively. As shown in FIG. 9A, the tapered dipole antenna elements are formed by pairs of elongated stripes acting as antenna elements. The two elongated antenna elements are mounted at a selected angle between them such that the elements are close to each other at vicinity of the central axis and are further from each other at periphery of the system.

Figure 10A:
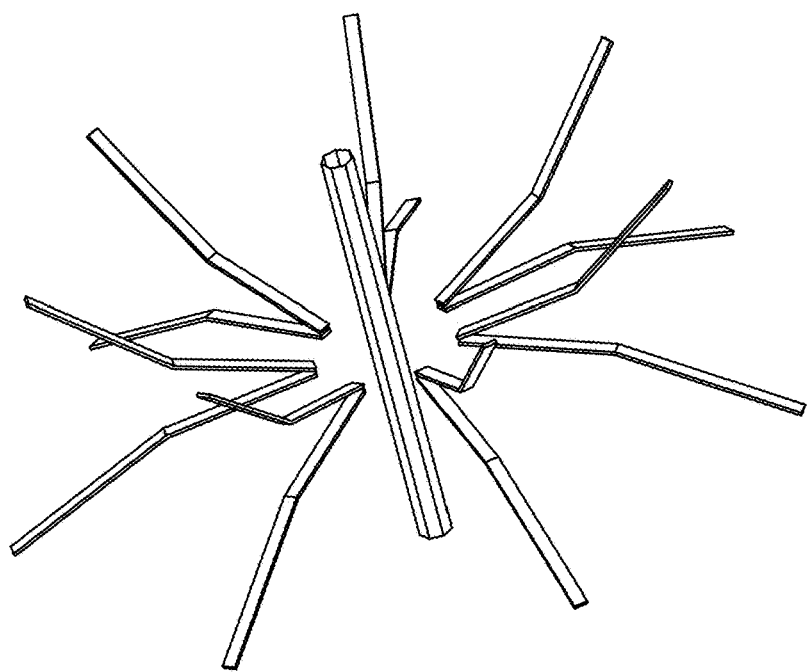
FIGS. 10A-10I illustrate DF antenna system with bi-linear configuration of the tapered dipole antenna elements (FIG. 10A) and beam patterns for signal frequencies of 30 MHz, 130 MHz, 180 MHz, 220 MHz, 300 MHz, 500 MHz, 750 MHz and 1000 MHz in FIGS. 10B to 10I respectively.
Figure 10B:
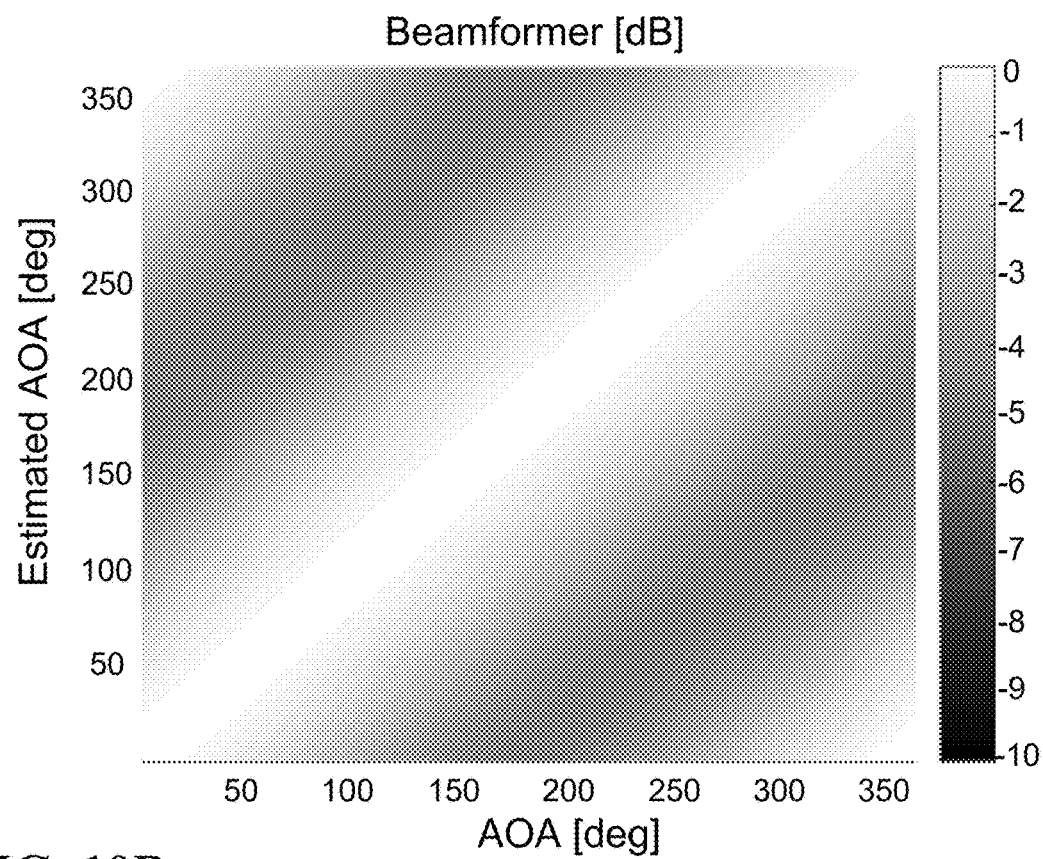
Figure 10C:
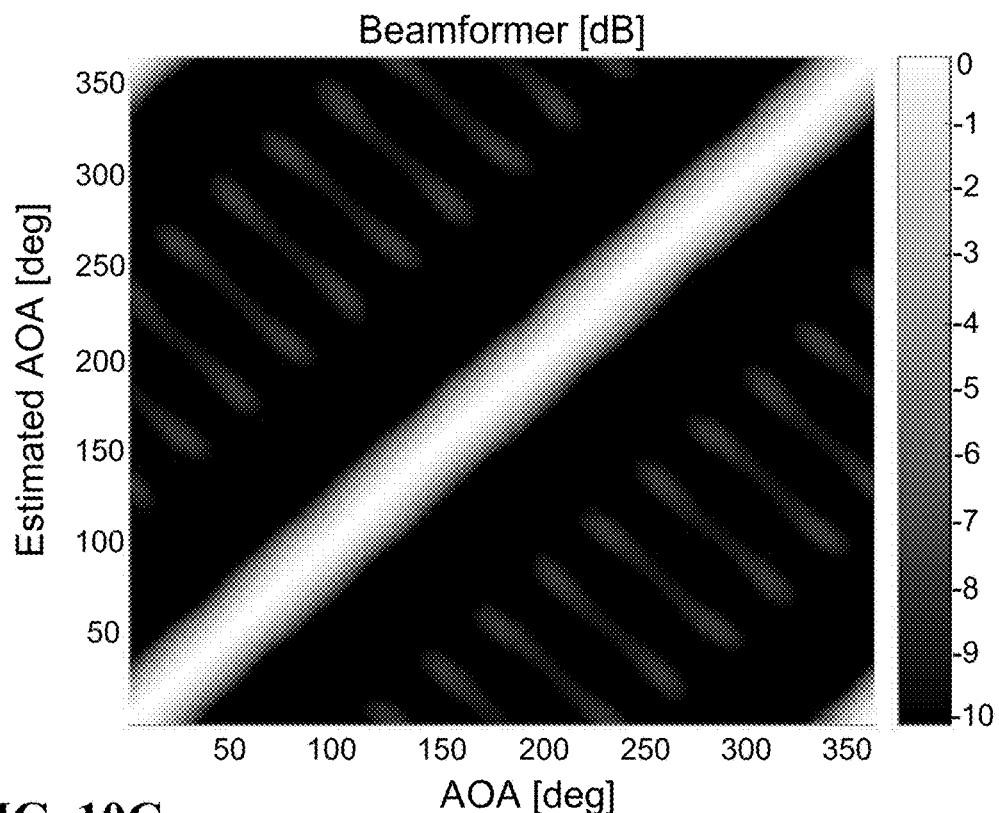
Figure 10D:
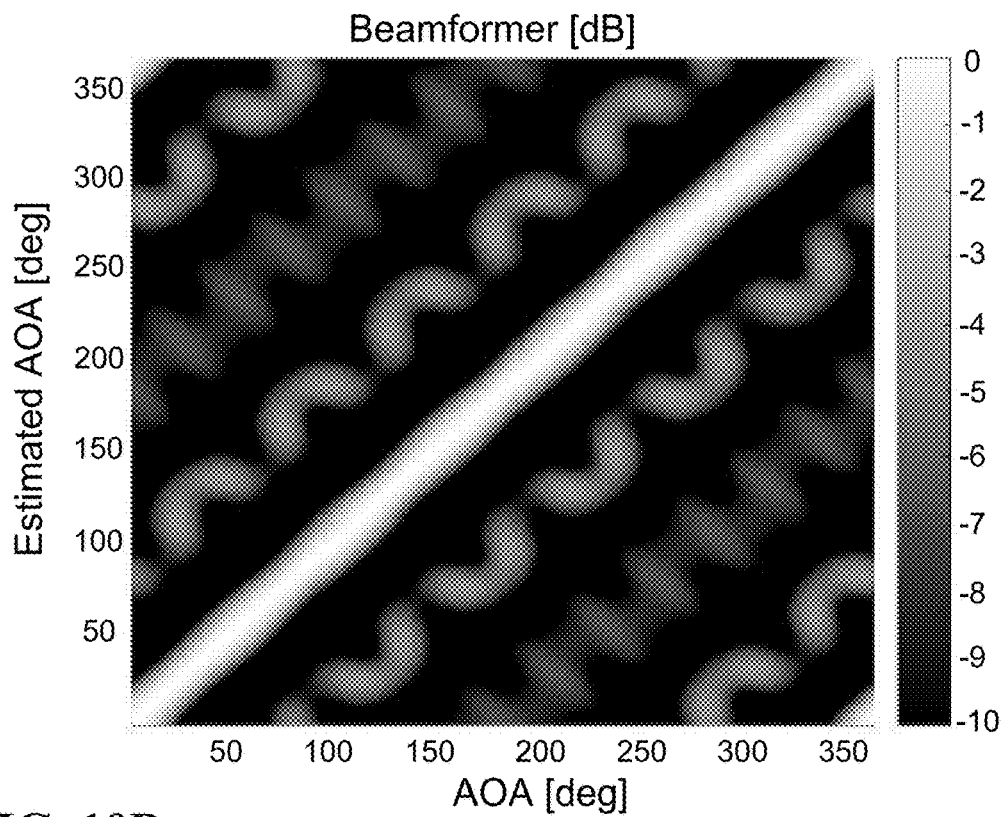
Figure 10E:
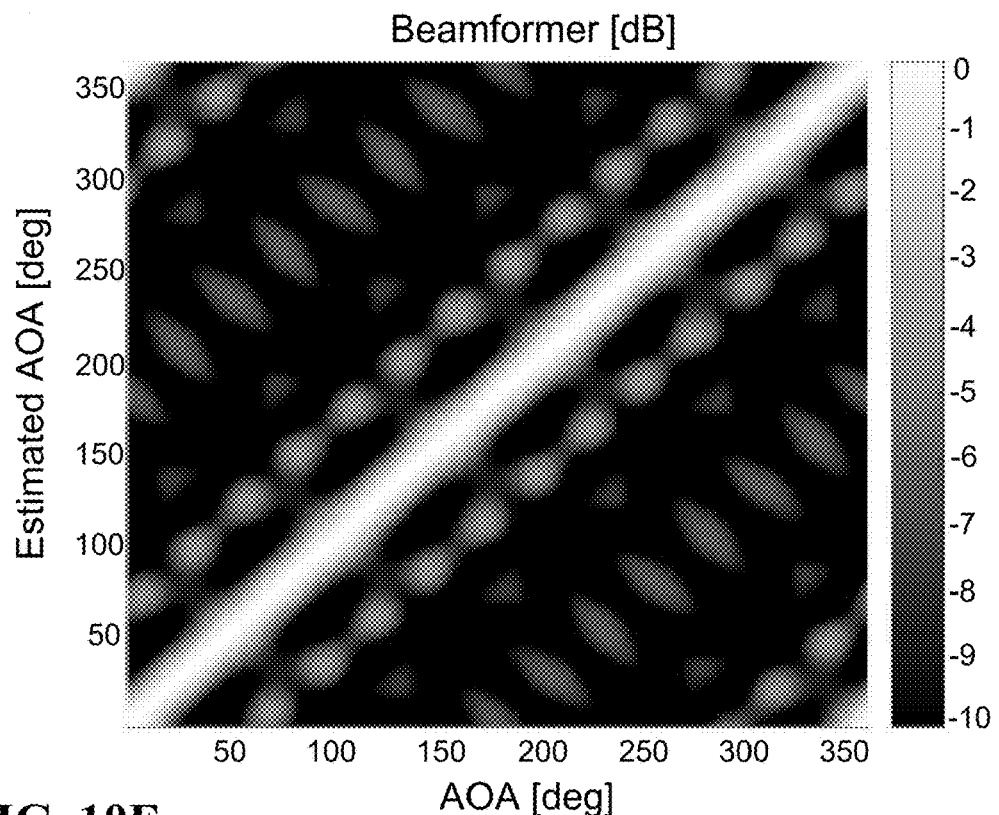
Figure 10F:
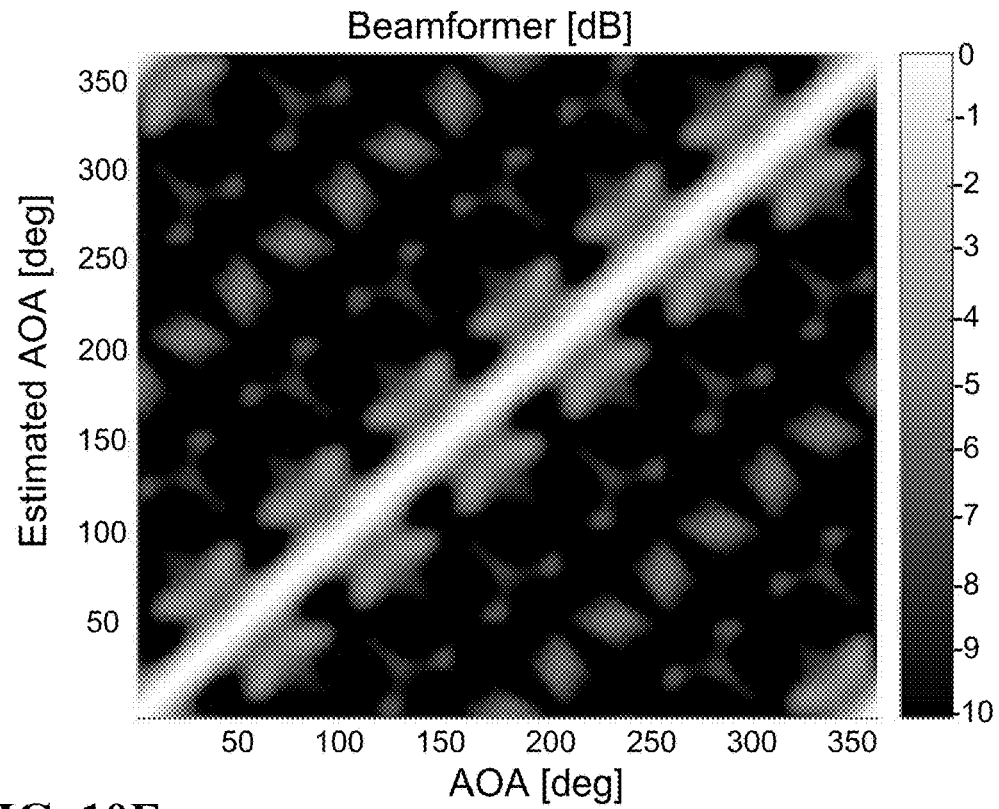
Figure 10G:
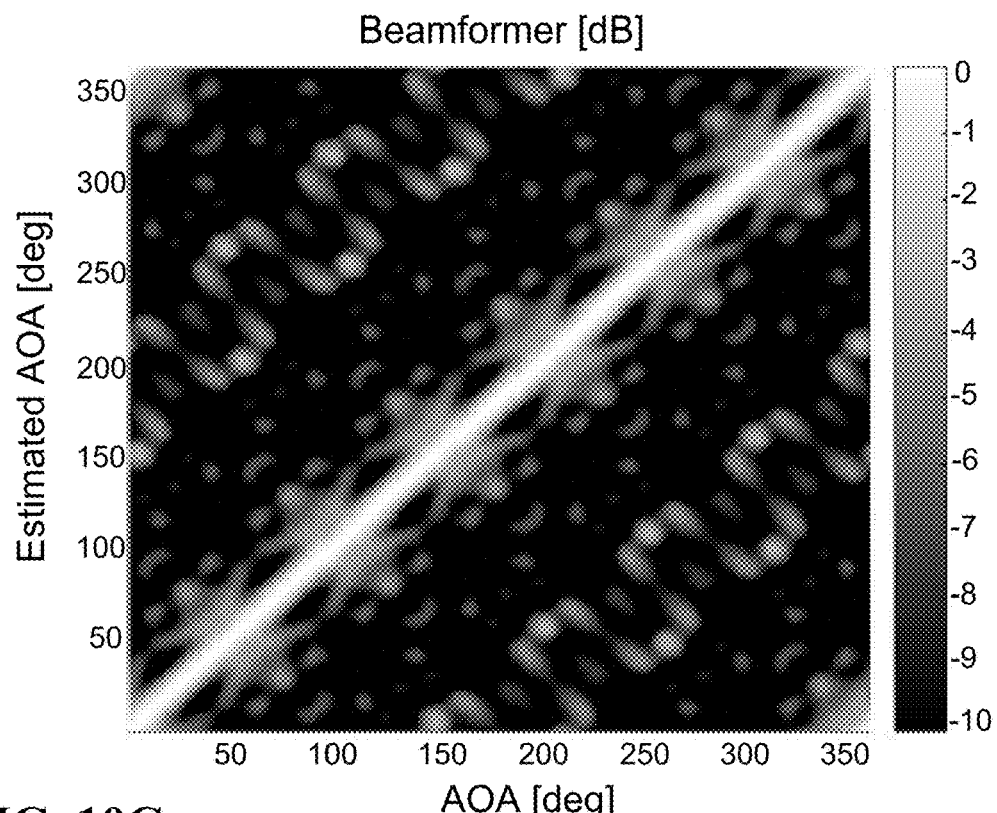
Figure 10H:
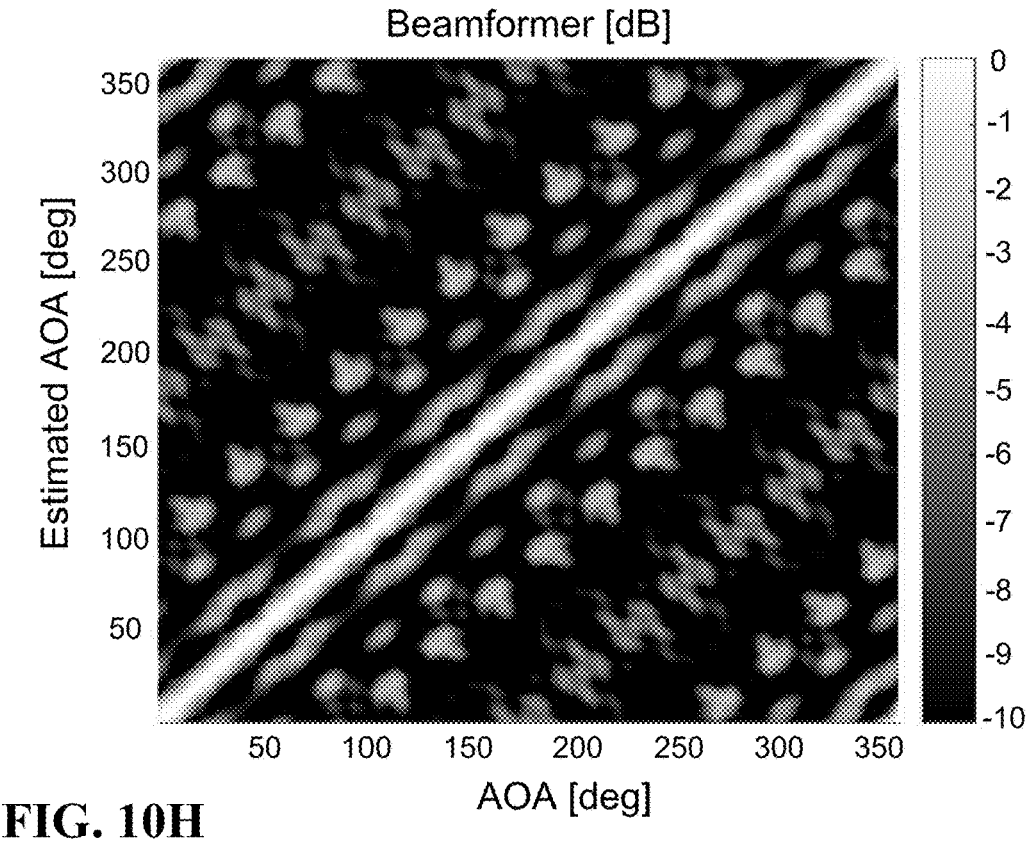
Figure 10I:
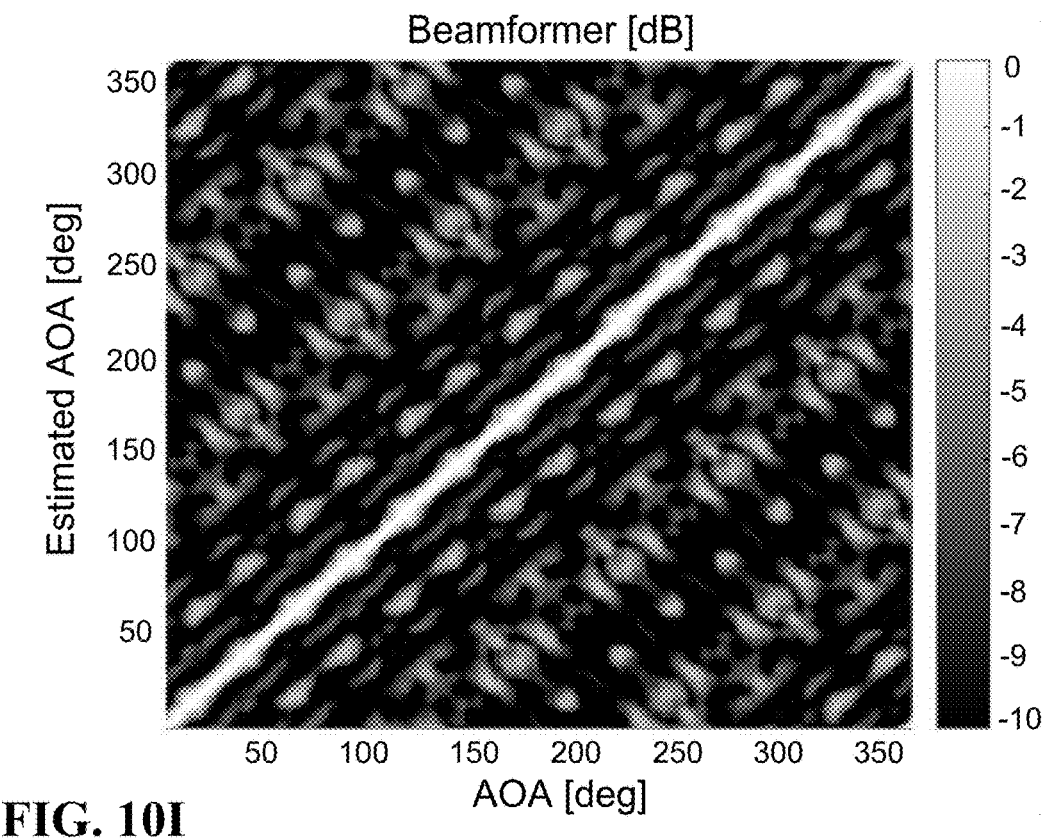

FIGS. 10A to 10I illustrate a bi-linear configuration of the elongated antenna elements. FIG. 10A illustrates configuration of the DF antenna system including 7 tapered dipole antenna elements configured with pairs of bi-linear elongated antenna elements, and FIGS. 10B to 10I show beam pattern graphs indicative of operation of the direction-finding technique and accuracy thereof for signal frequencies of 30 MHz, 130 MHz, 180 MHz, 220 MHz, 300 MHz, 500 MHz, 750 MHz and 1000 MHz respectively. As shown in FIG. 10A, the bi-linear elongated antenna elements are formed of pair of elongated antenna elements angled to distant from each other at a first angle between the central axis and certain radial position, and at a second, larger angle from the selected position toward periphery of the DF antenna system.

Figure 11A:
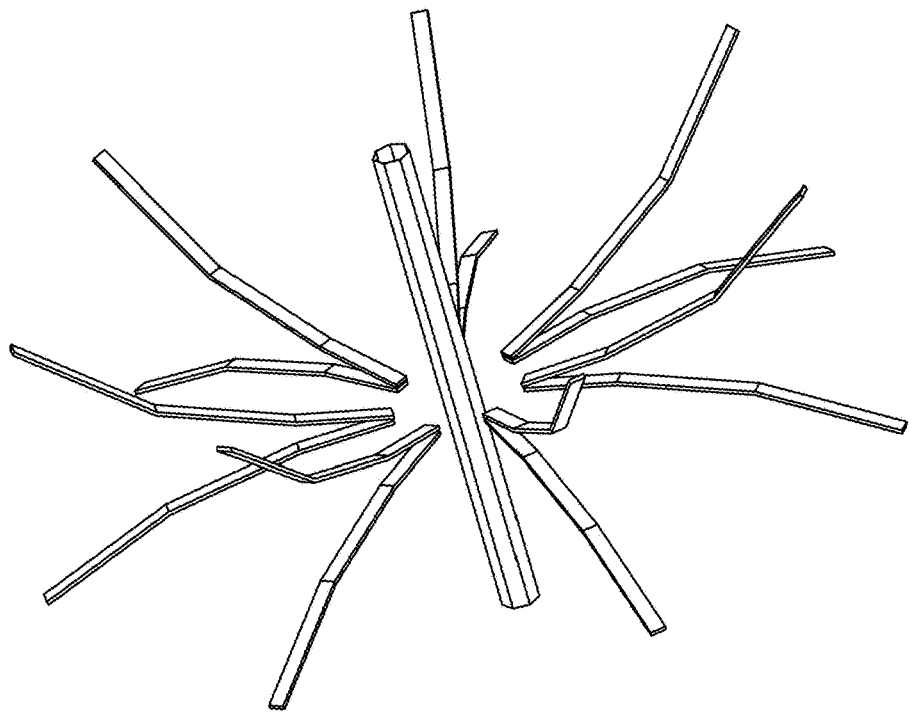
FIGS. 11A-11I illustrate DF antenna system with tri-linear configuration of the tapered dipole antenna elements (FIG. 11A) and beam patterns for signal frequencies of 30 MHz, 130 MHz, 180 MHz, 220 MHz, 300 MHz, 500 MHz, 750 MHz and 1000 MHz in FIGS. 11B to 11I respectively.
Figure 11B:
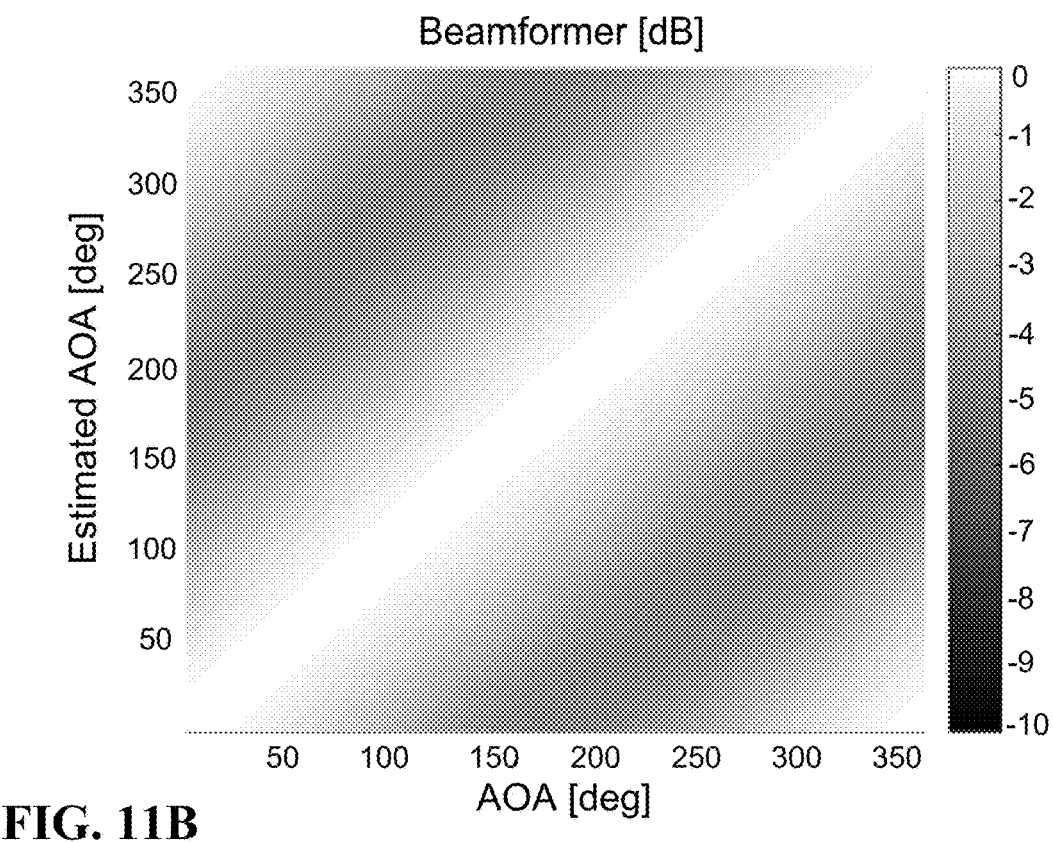
Figure 11C:
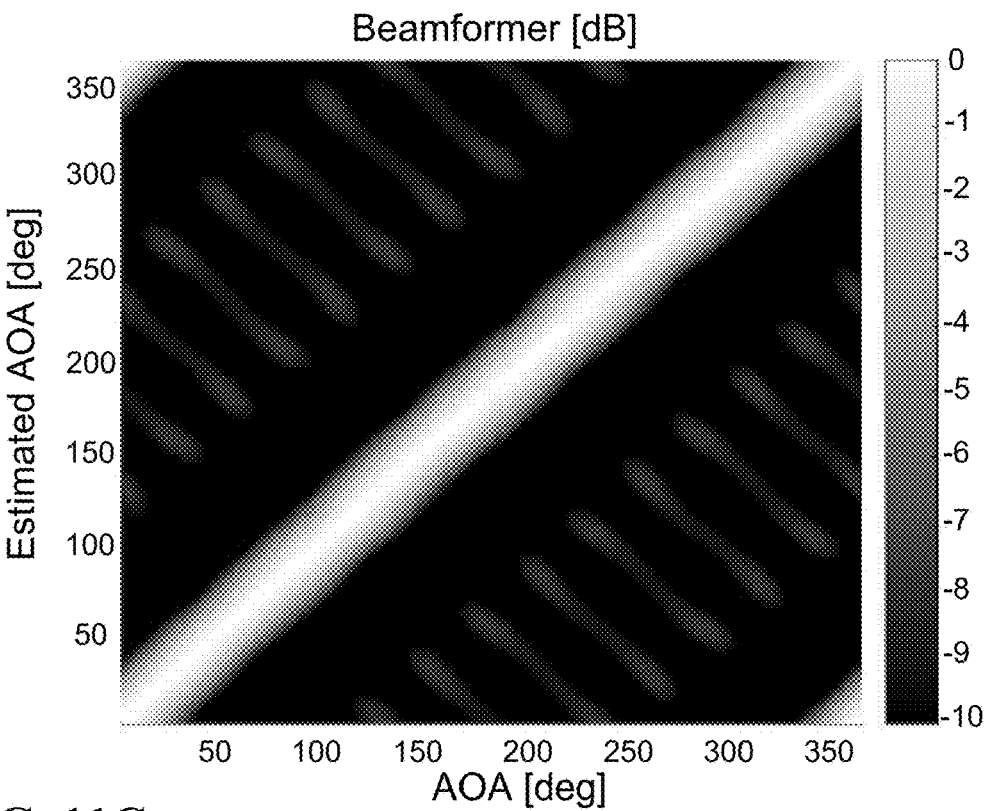
Figure 11D:
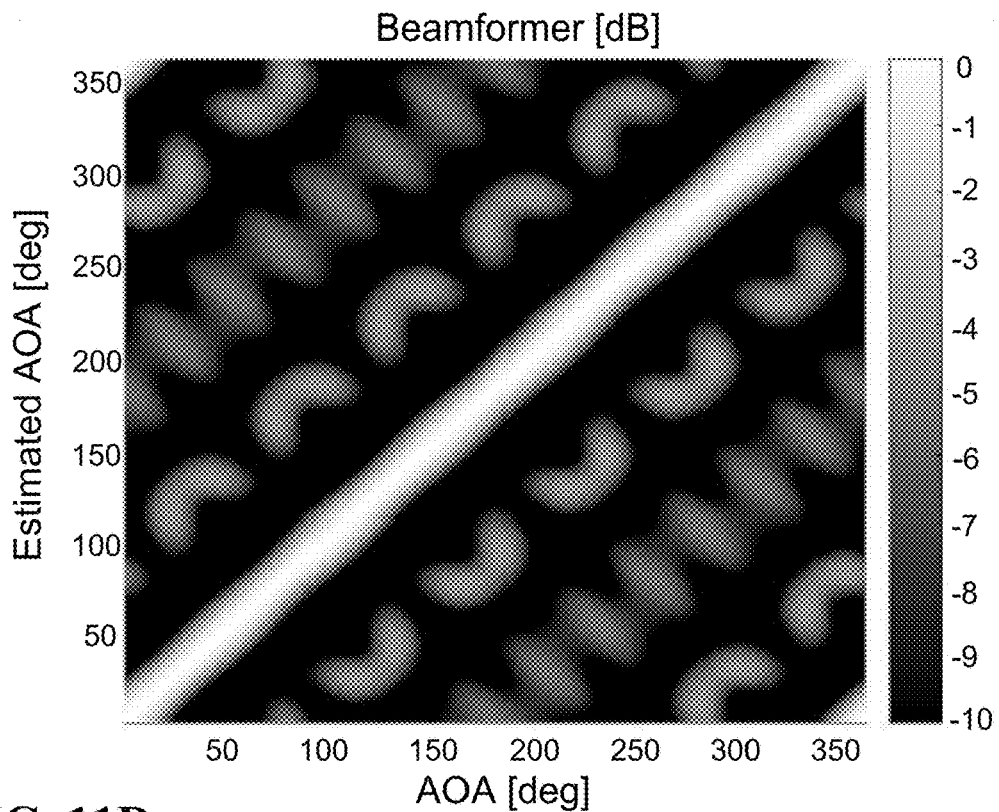
Figure 11E:
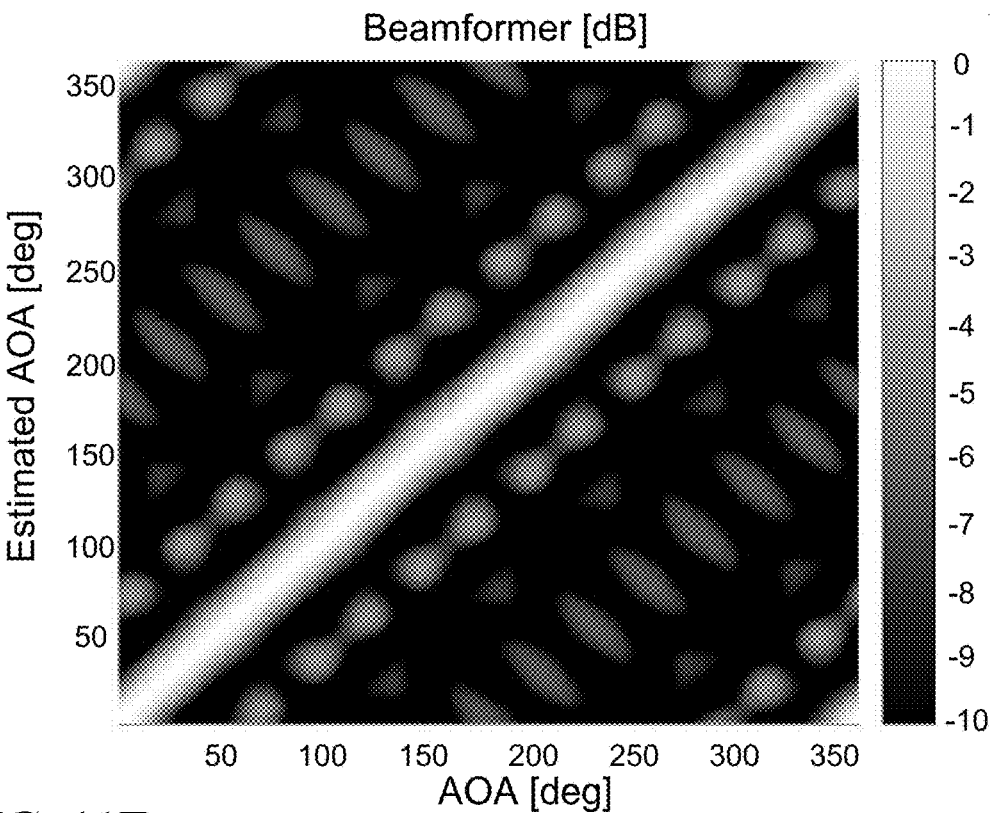
Figure 11F:
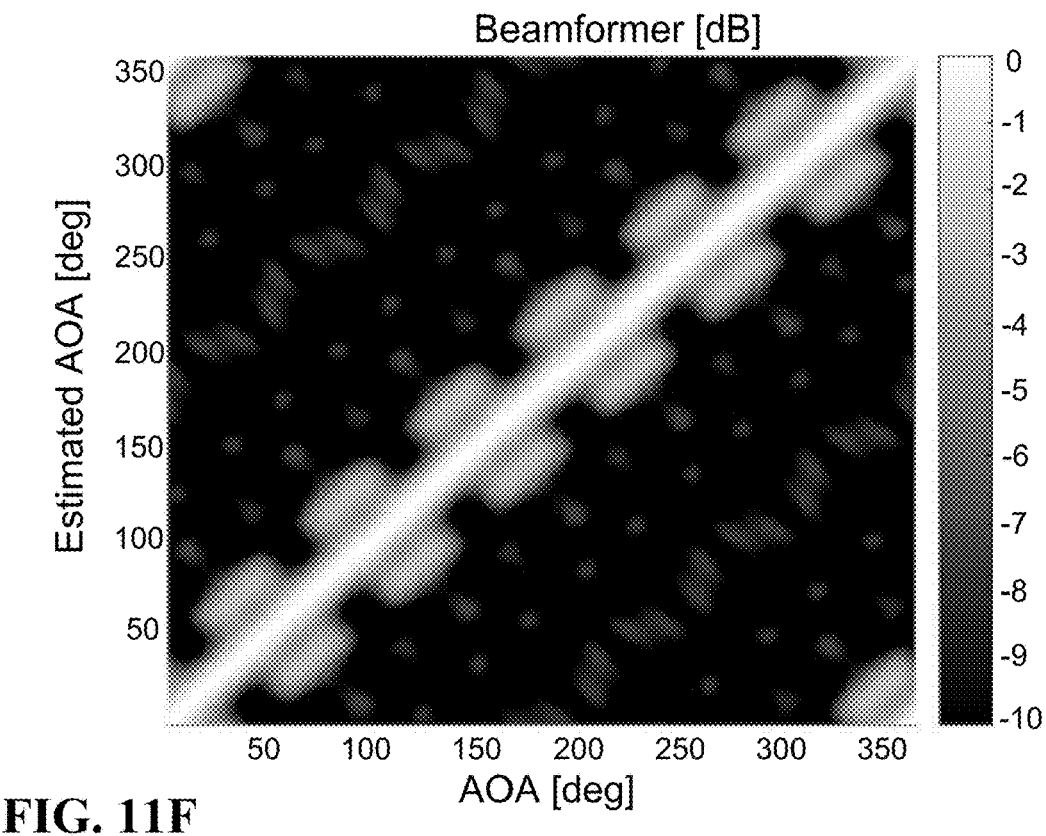
Figure 11G:
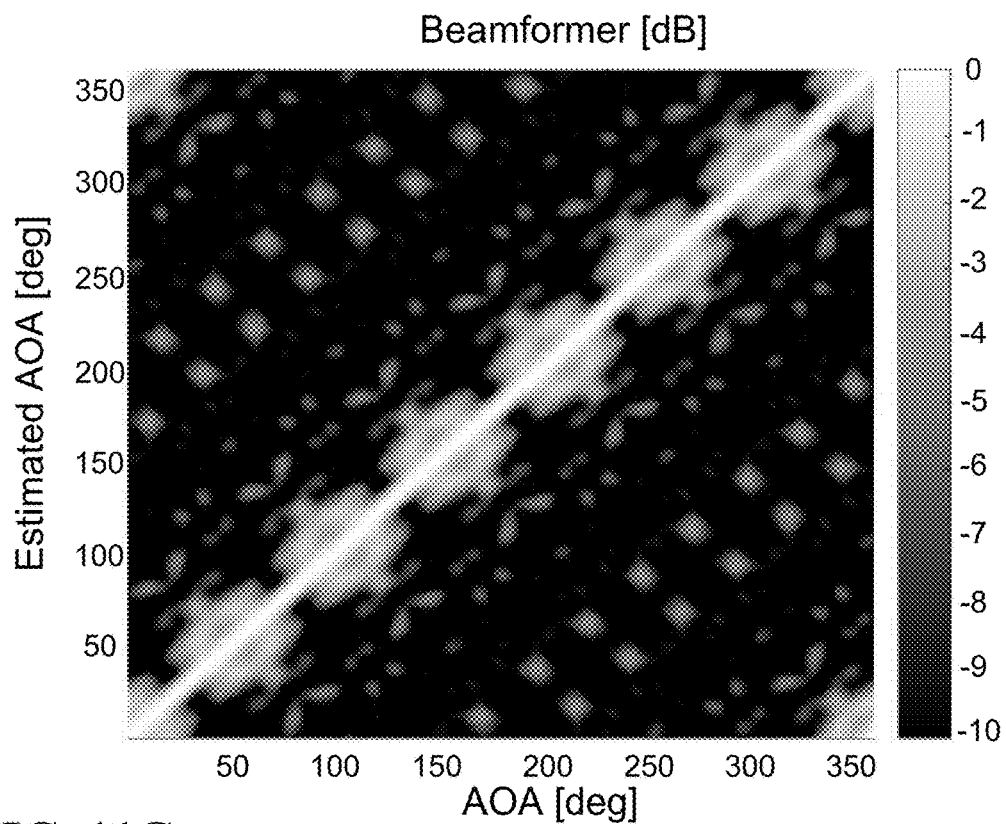
Figure 11H:
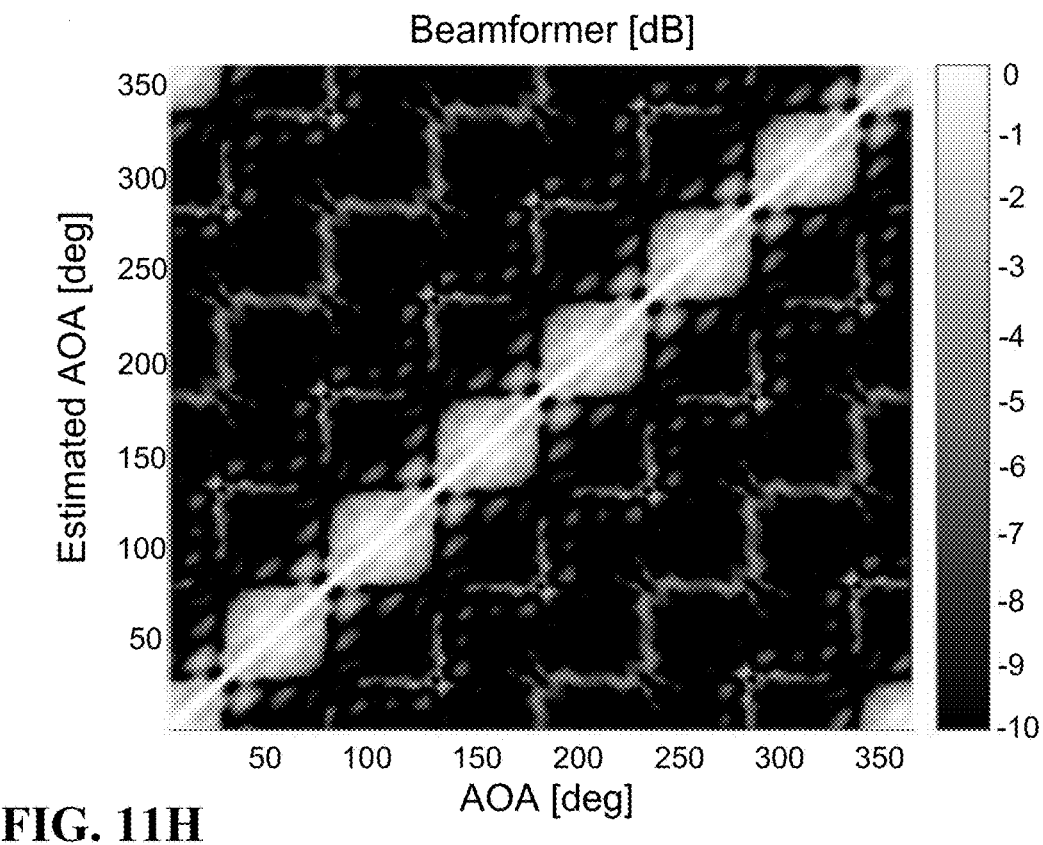
Figure 11I:
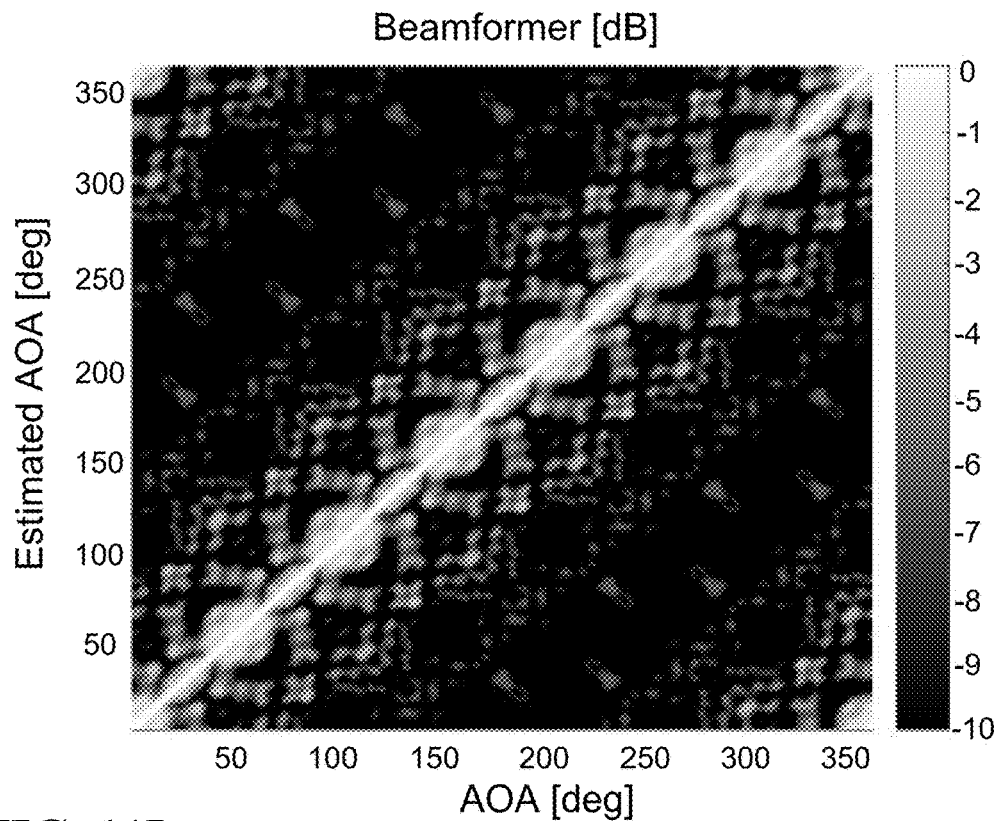

FIGS. 11A to 11I illustrate a tri-linear configuration that is otherwise similar to the configurations shown in FIGS. 9A-9I and 10A-10I. FIG. 11A illustrates structure of the DF antenna system using tri-linear elongated antenna elements, and FIGS. 11B to 11I show beam pattern graphs indicative of operation of the direction-finding technique and accuracy thereof for signal frequencies of 30 MHz, 130 MHz, 180 MHz, 220 MHz, 300 MHz, 500 MHz, 750 MHz and 1000 MHz respectively.

Figure 12A:
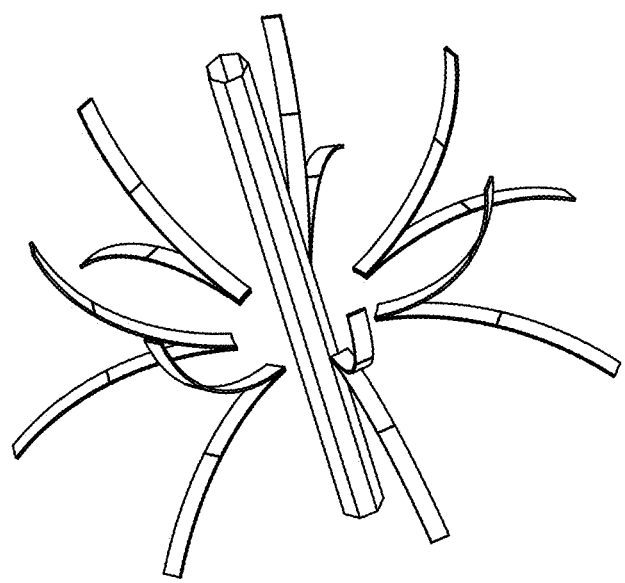
FIGS. 12A-12I illustrate DF antenna system with parabolic configuration of the tapered dipole antenna elements (FIG. 12A) and beam patterns for signal frequencies of 30 MHz, 130 MHz, 180 MHz, 220 MHz, 300 MHz, 500 MHz, 750 MHz and 1000 MHz in FIGS. 12B to 12I respectively.
Figure 12B:
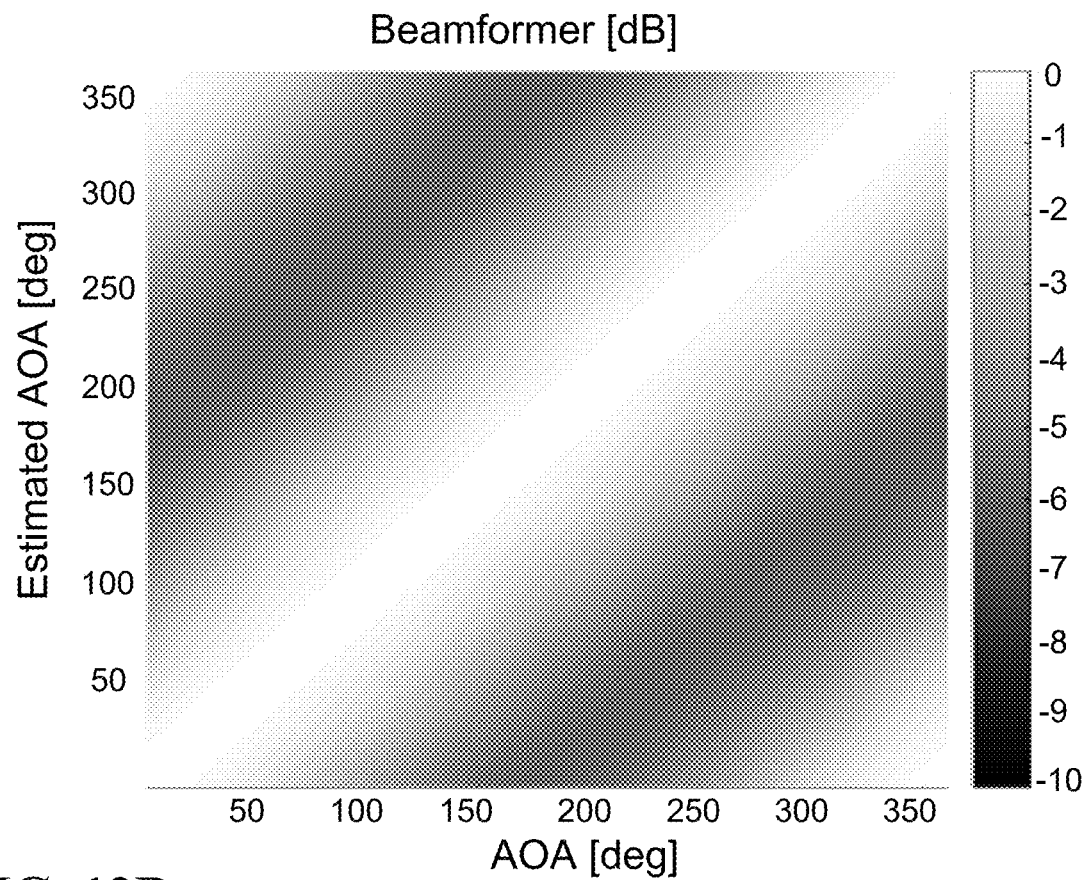
Figure 12C:
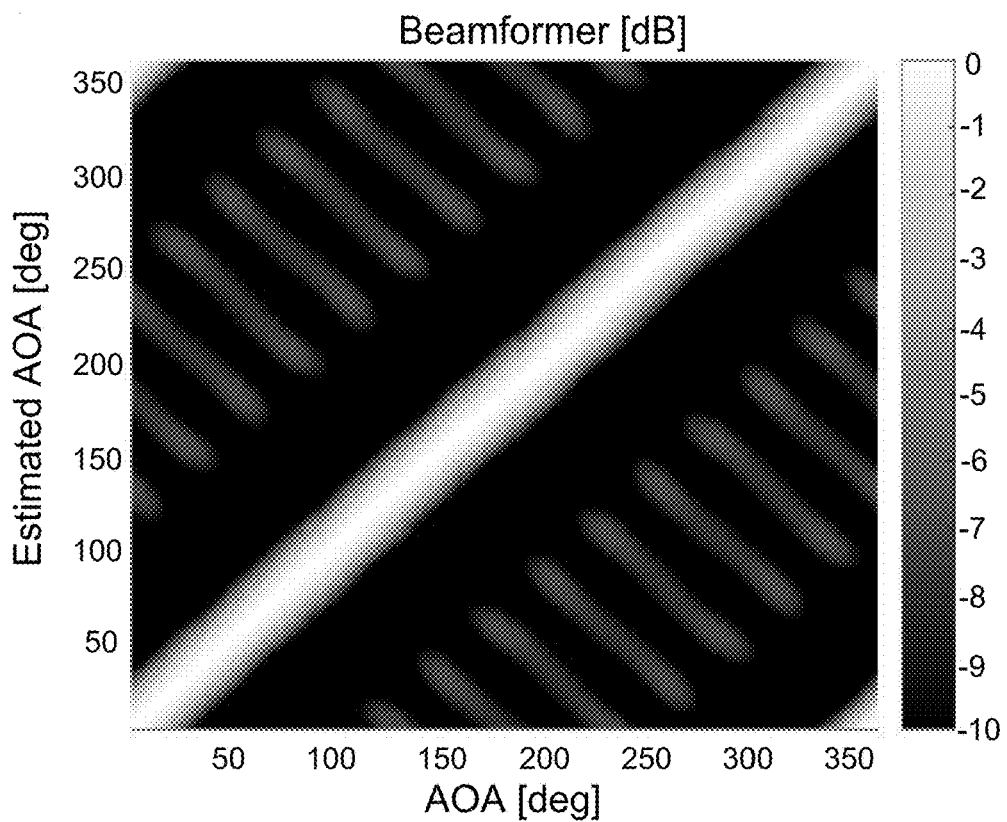
Figure 12D:
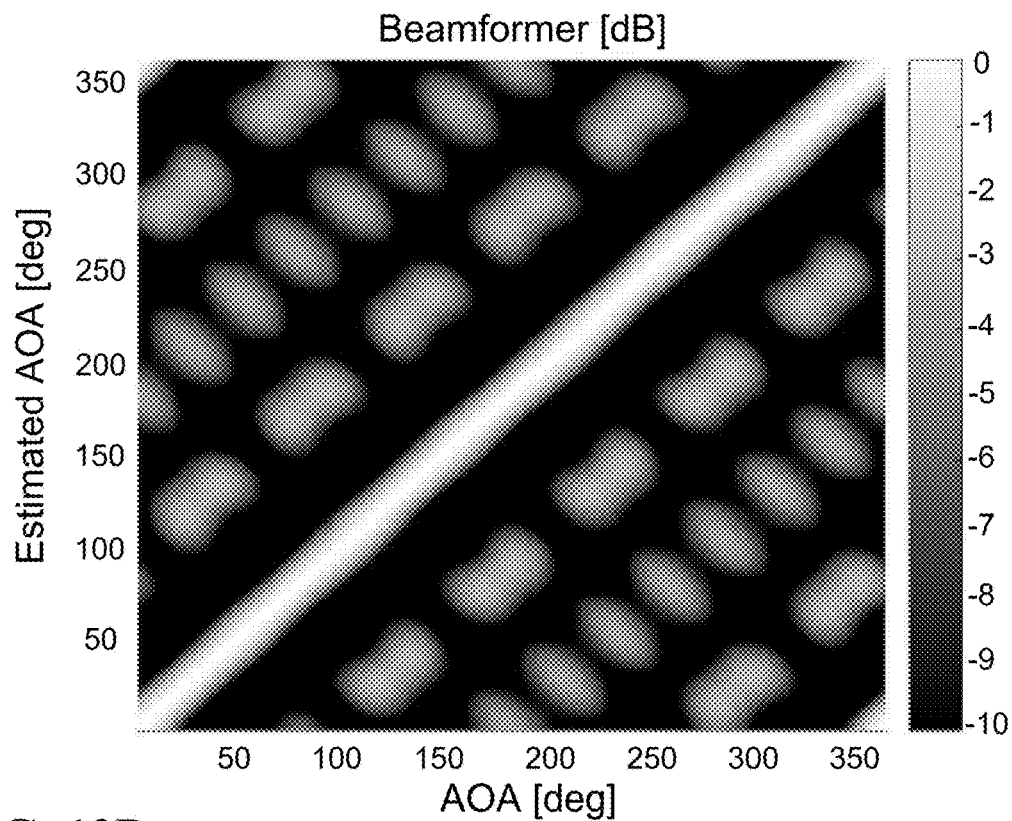
Figure 12E:
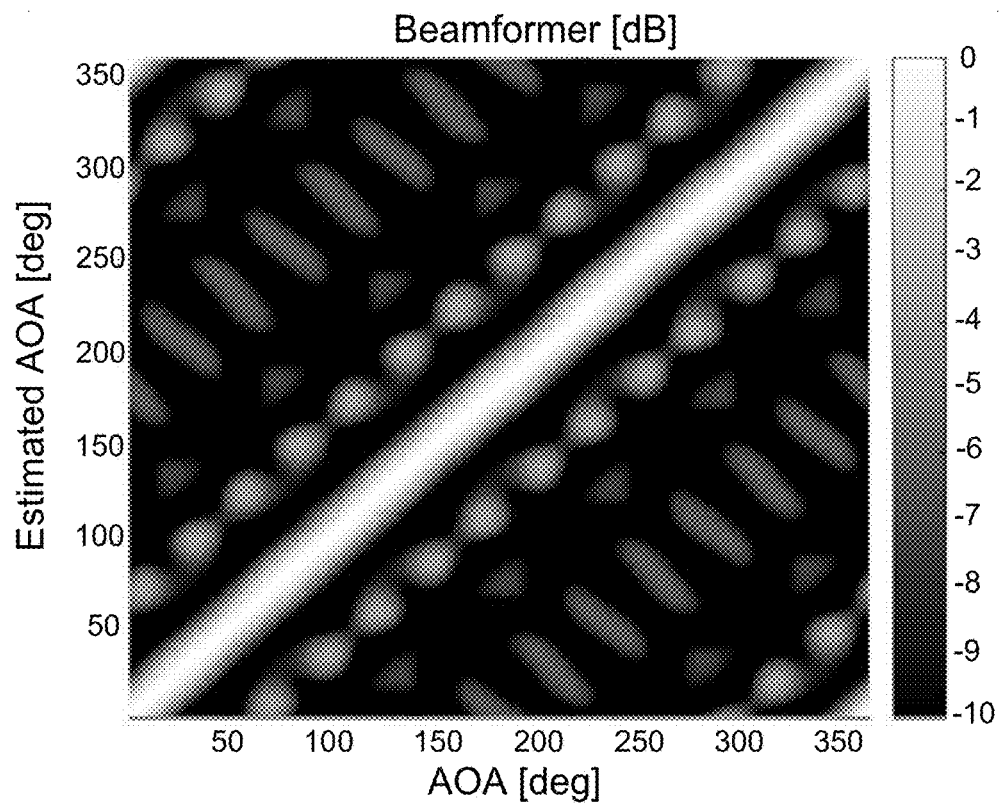
Figure 12F:
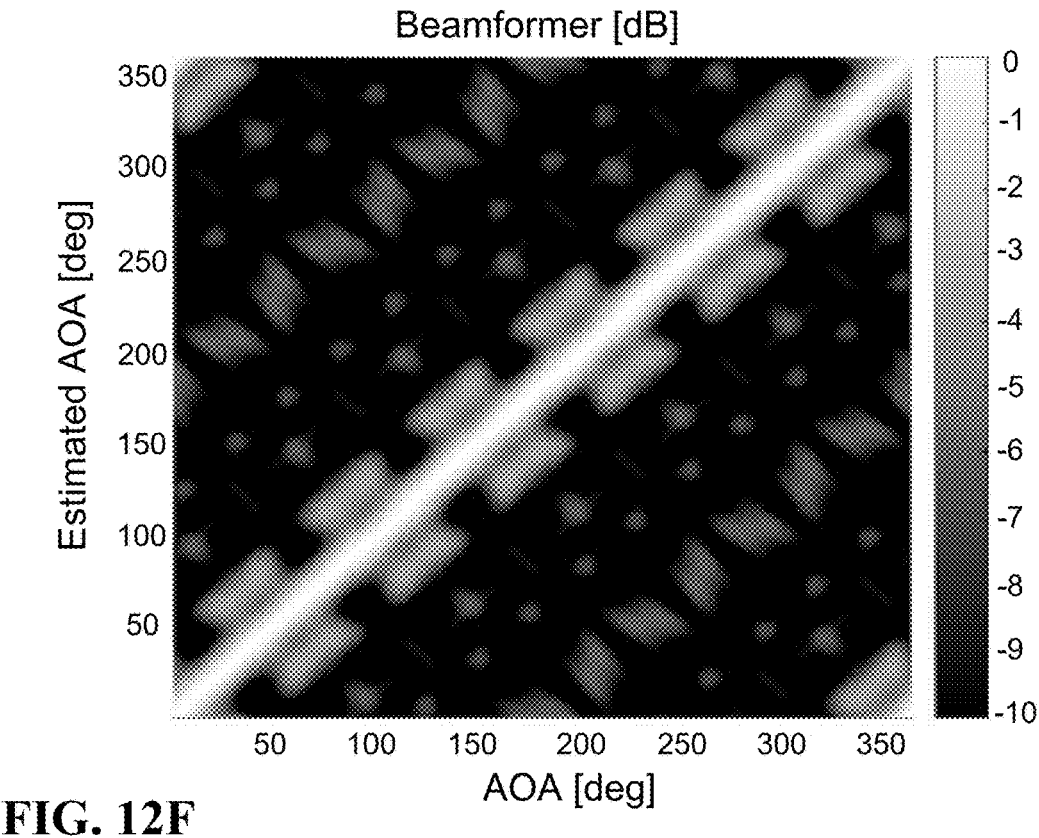
Figure 12G:
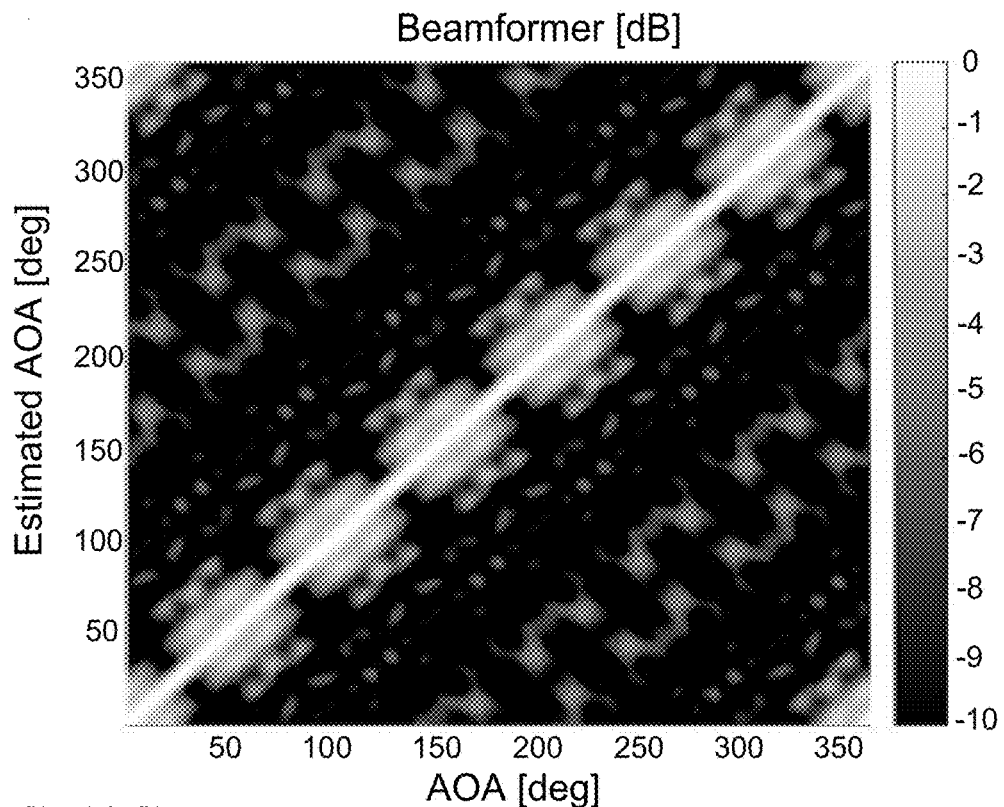
Figure 12H:
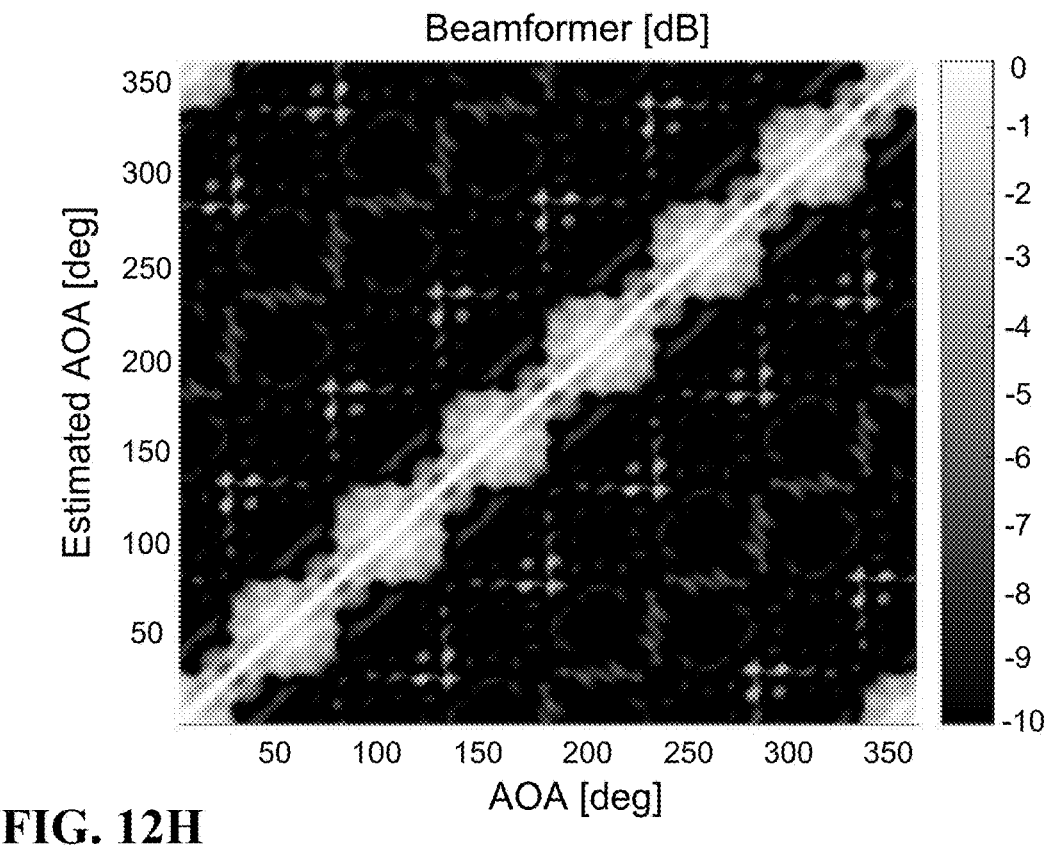
Figure 12I:
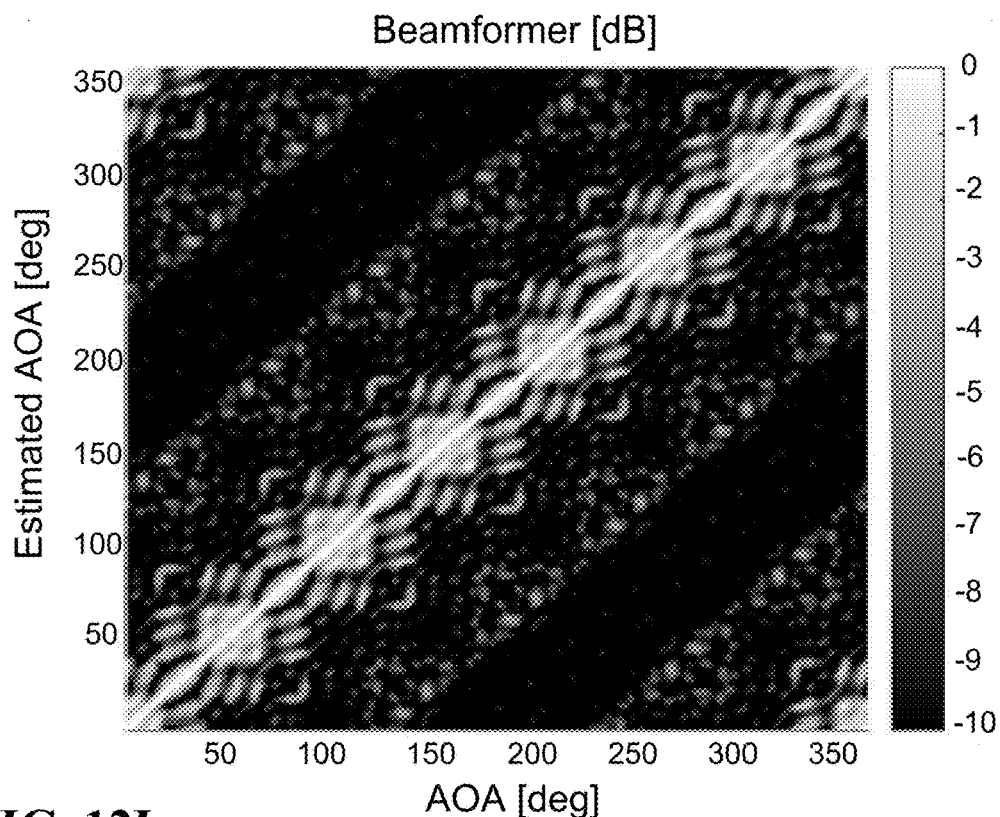

FIGS. 12A to 12I show a parabolic configuration of the DF antenna system. FIG. 12A illustrates a DF antenna system including 7 tapered dipole antenna elements having parabolic curved elongated antenna elements, generally having a curvature of the form $ar^2+br+c$ and $-ar^2-br-c$ (where r is the radial coordinate indicating distance from the central axis along a plane defined by the circular array), and FIGS. 12B to 12I show beam pattern graphs indicative of operation of the direction-finding technique and accuracy thereof for signal frequencies of 30 MHz, 130 MHz, 180 MHz, 220 MHz, 300 MHz, 500 MHz, 750 MHz and 1000 MHz respectively.

Figure 13A:
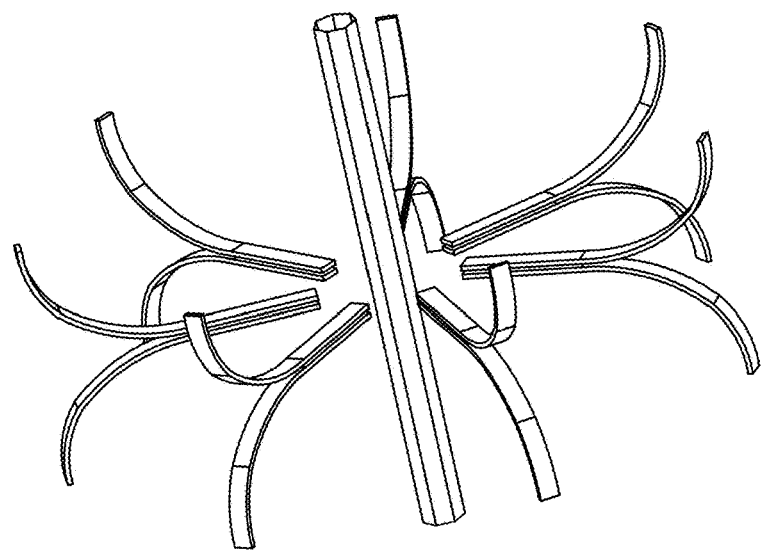
FIGS. 13A to 13I illustrate DF antenna system with quarter-circle configuration of the tapered dipole antenna elements (FIG. 13A) and beam patterns for signal frequencies of 30 MHz, 130 MHz, 180 MHz, 220 MHz, 300 MHz, 500 MHz, 750 MHz and 1000 MHz in FIGS. 13B to 13I respectively.
Figure 13B:
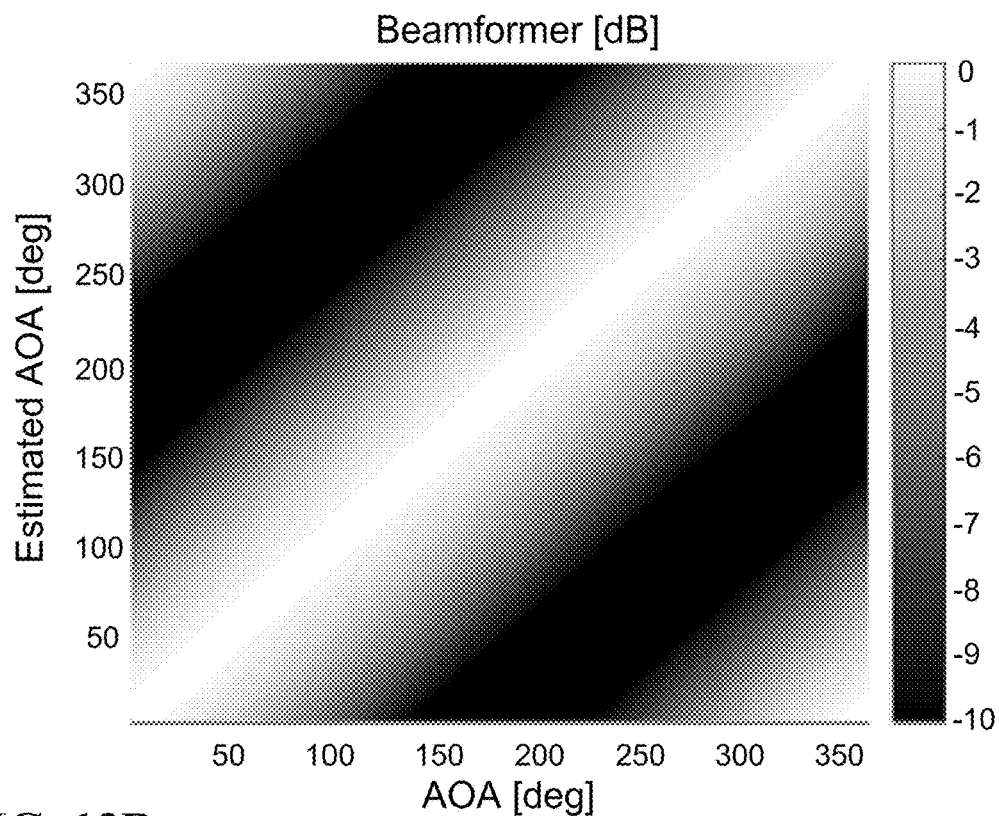
Figure 13C:
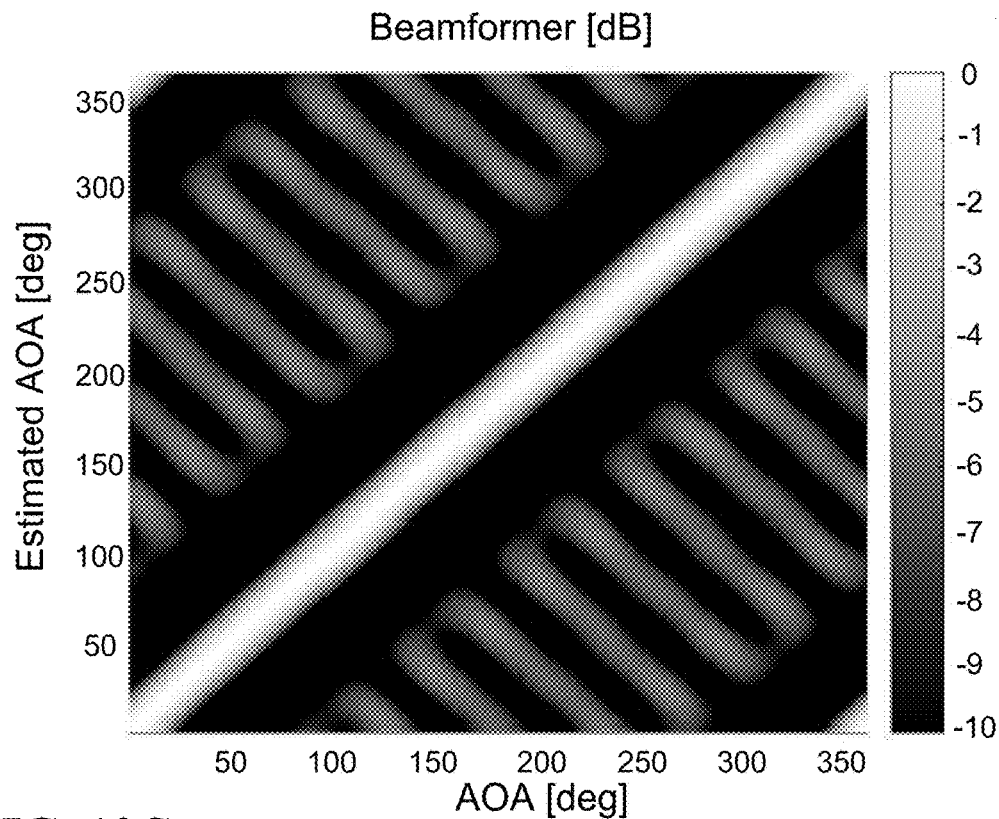
Figure 13D:
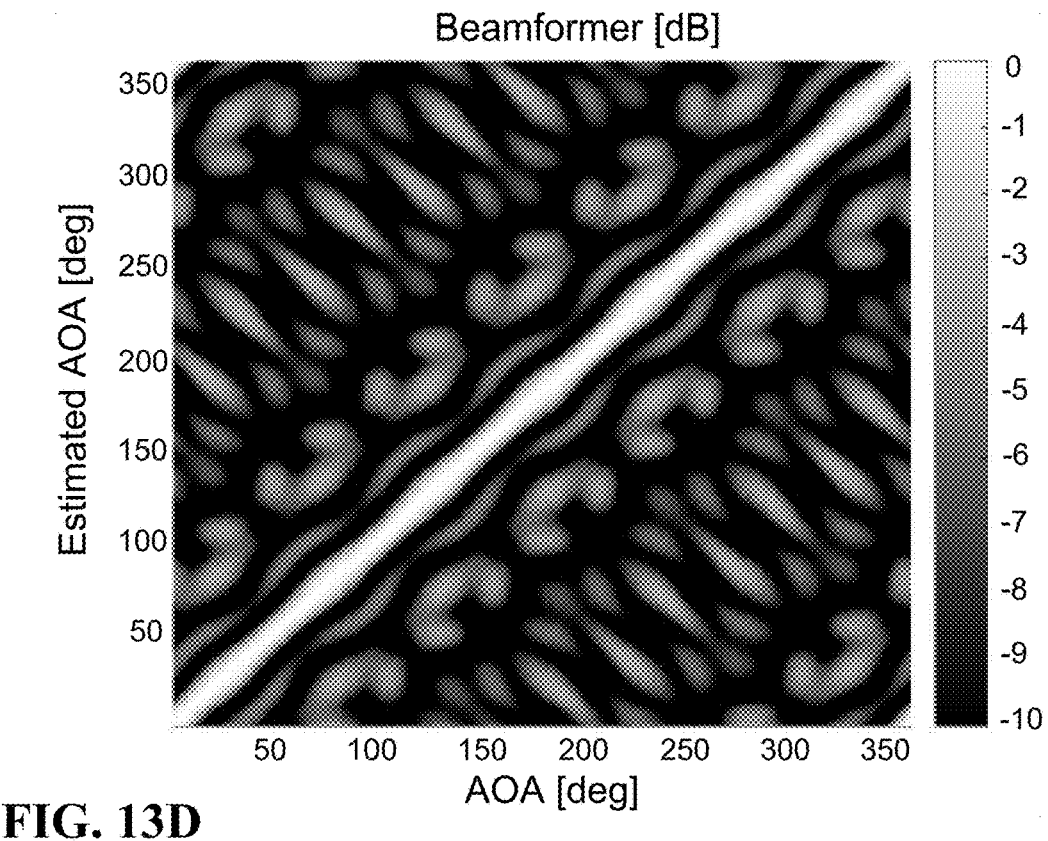
Figure 13E:
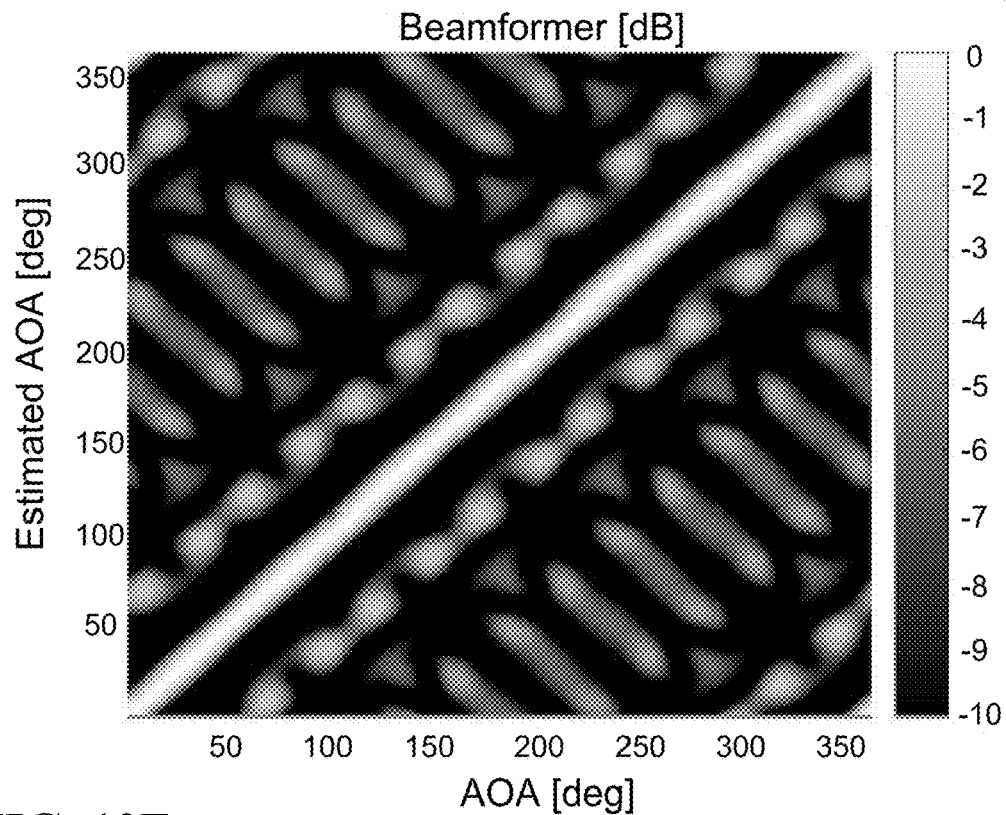
Figure 13F:
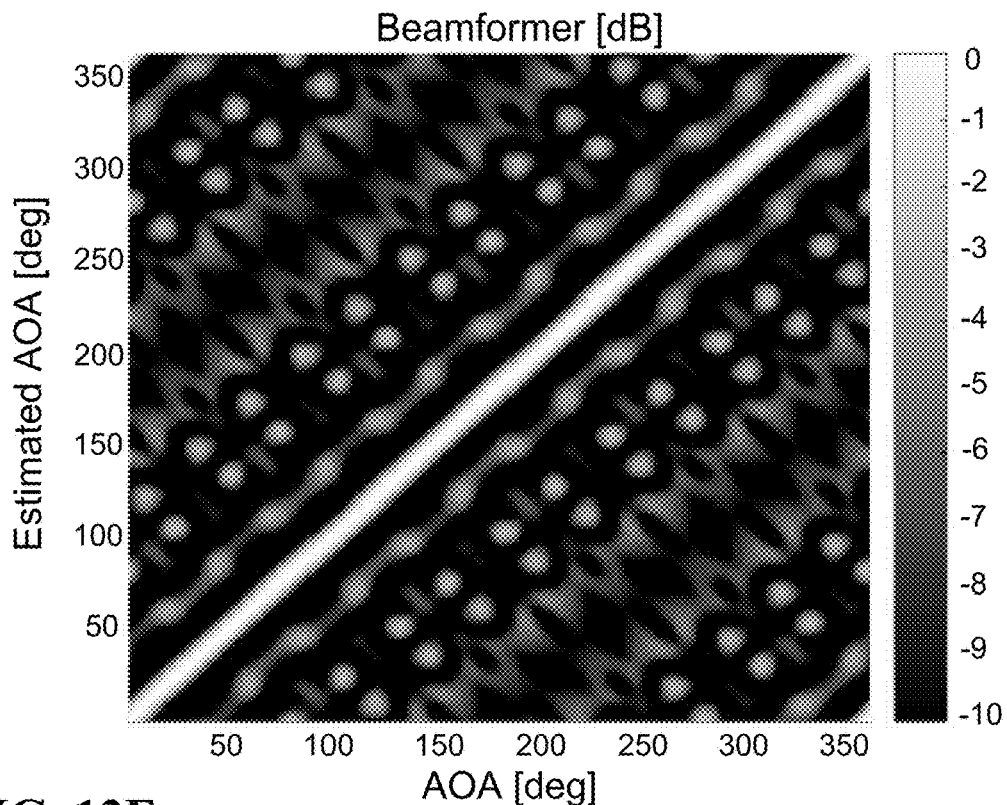
Figure 13G:
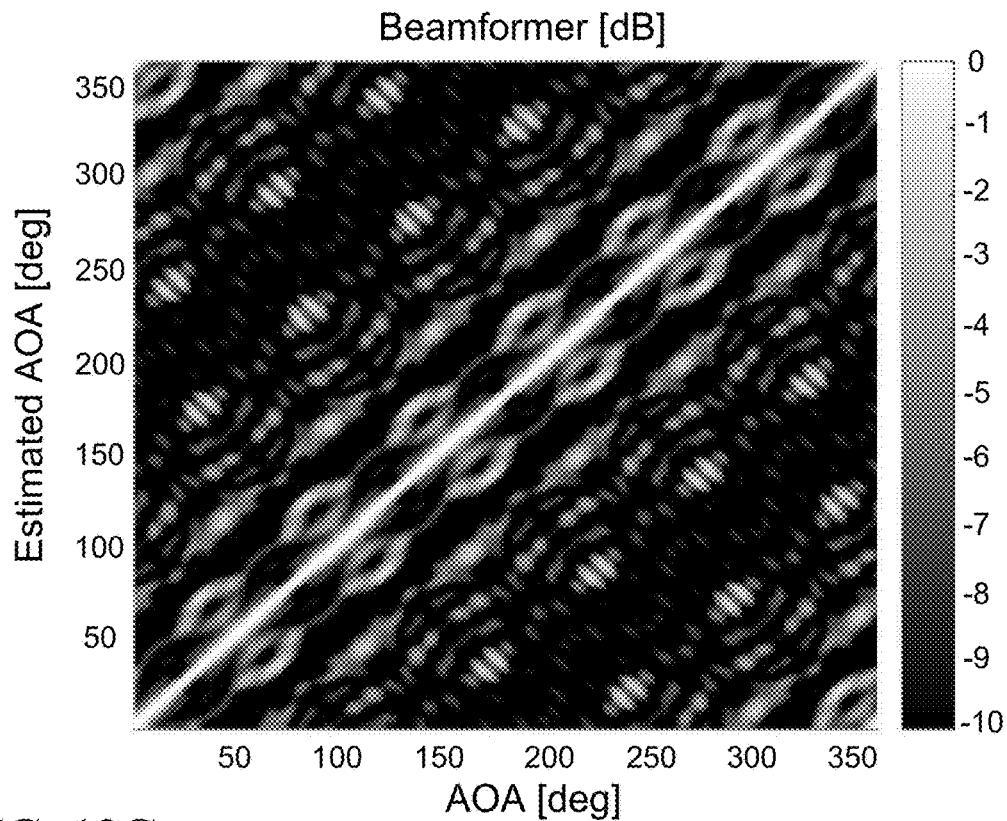
Figure 13H:
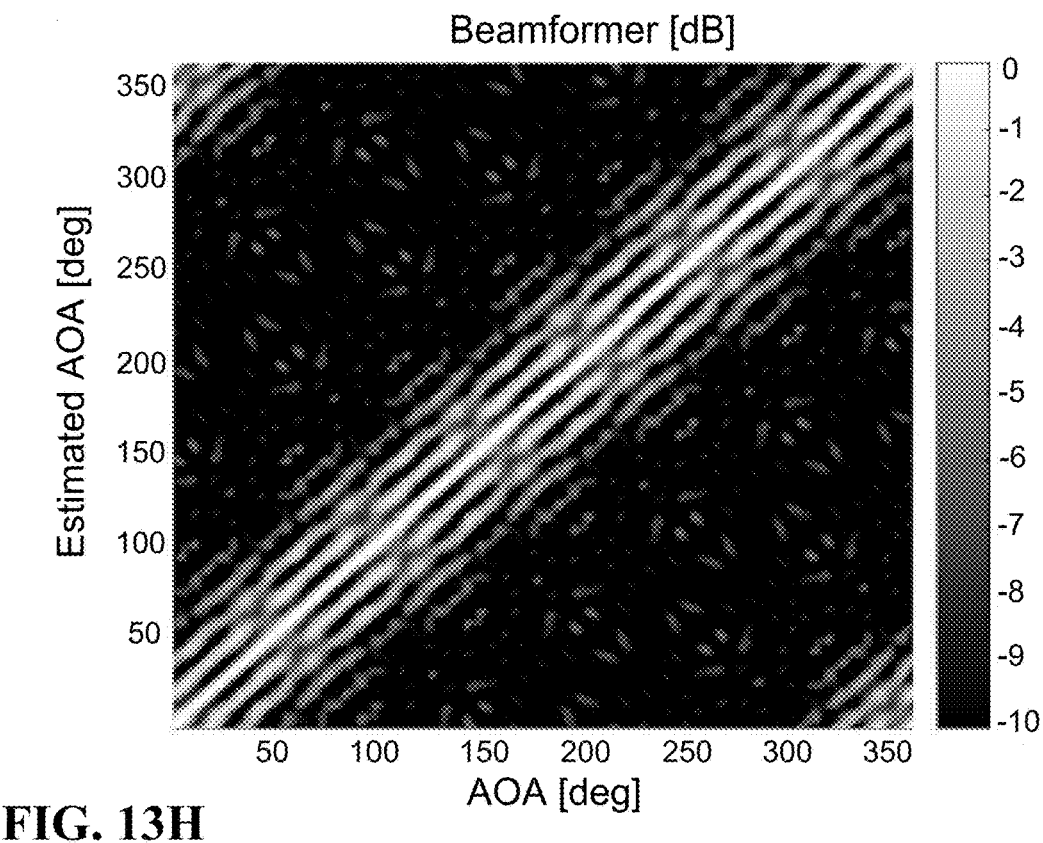
Figure 13I:
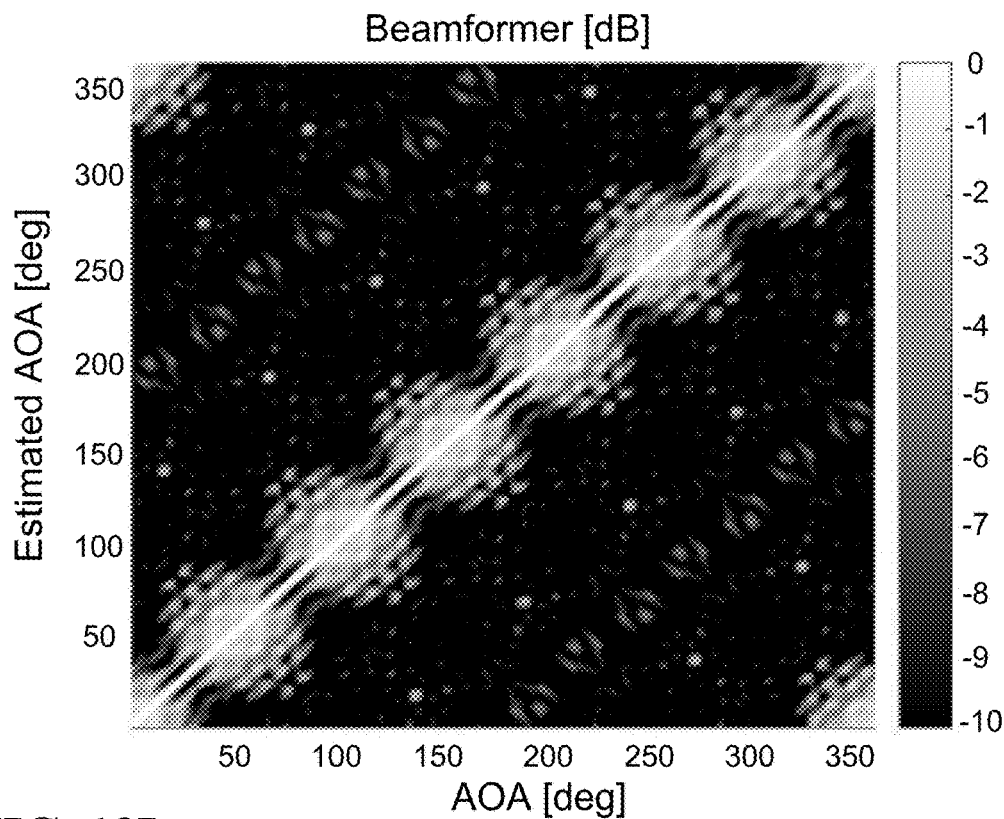

Additional curve configuration is exemplified in FIGS. 13A to 13I. FIG. 13A illustrates DF antenna system including elongated antenna elements curved to the form for quarter circle, i.e. being curved according to the form $\sqrt{R^2-r^2}-a$ (and $-\sqrt{R^2-r^2}+a$) (where R is a selected curvature radius, a is a selected constant defining displacement between the antenna elements and r relates to radial coordinate), and FIGS. 13B to 13I show beam pattern graphs indicative of operation of the direction-finding technique and accuracy thereof for signal frequencies of 30 MHz, 130 MHz, 180 MHz, 220 MHz, 300 MHz, 500 MHz, 750 MHz and 1000 MHz respectively.

Figure 14A:
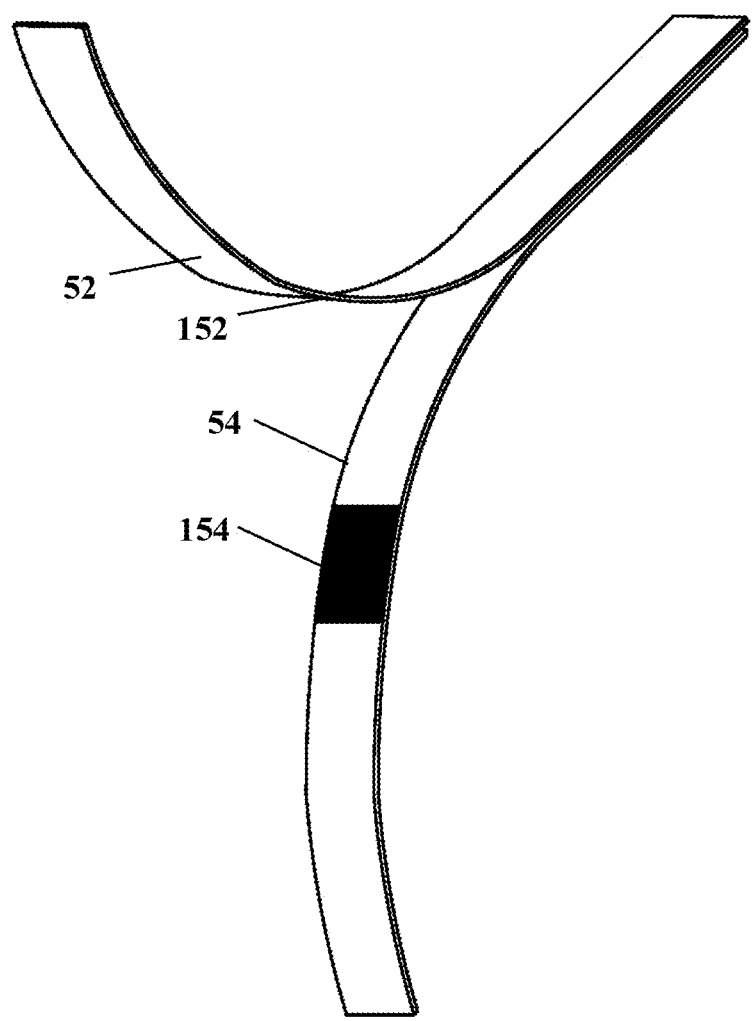
FIGS. 14A to 14J illustrate DF antenna system with quarter-circle configuration of the tapered dipole antenna elements and additional of chokes in selected locations (FIG. 14A) exemplify chokes configuration (FIG. 14B) and beam patterns for signal frequencies of 30 MHz, 130 MHz, 180 MHz, 220 MHz, 300 MHz, 500 MHz, 750 MHz and 1000 MHz in FIGS. 14C to 14J respectively.
Figure 14B:
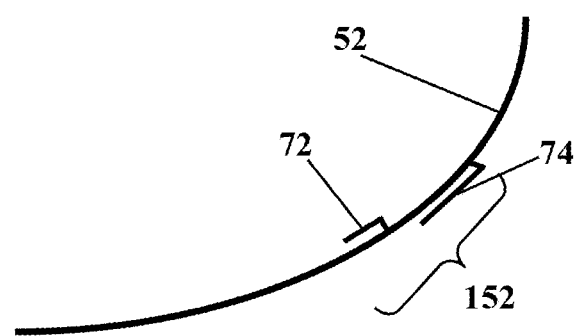
Figure 14C:
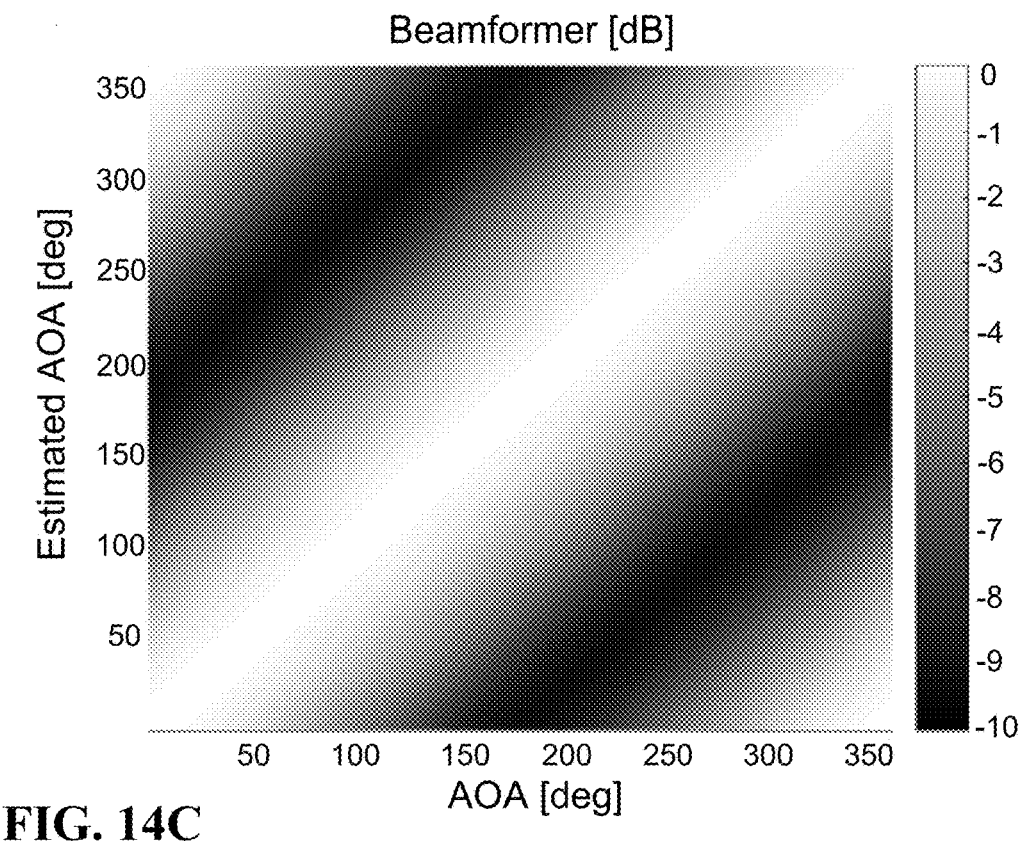
Figure 14D:
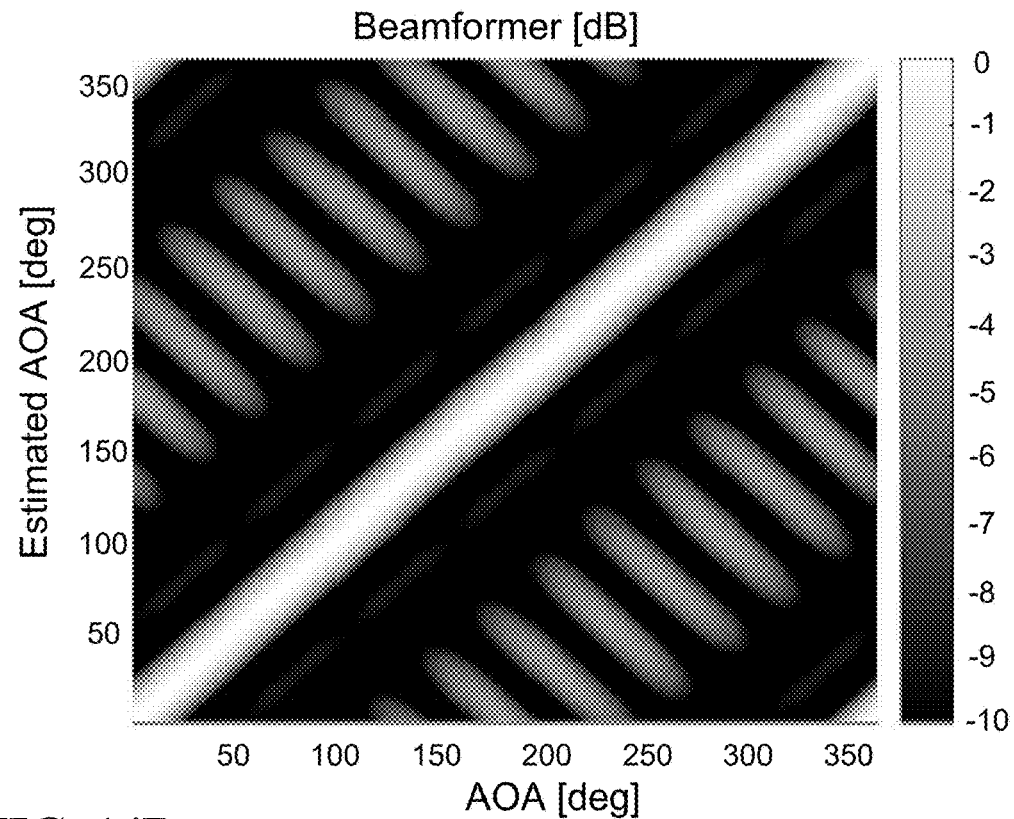
Figure 14E:
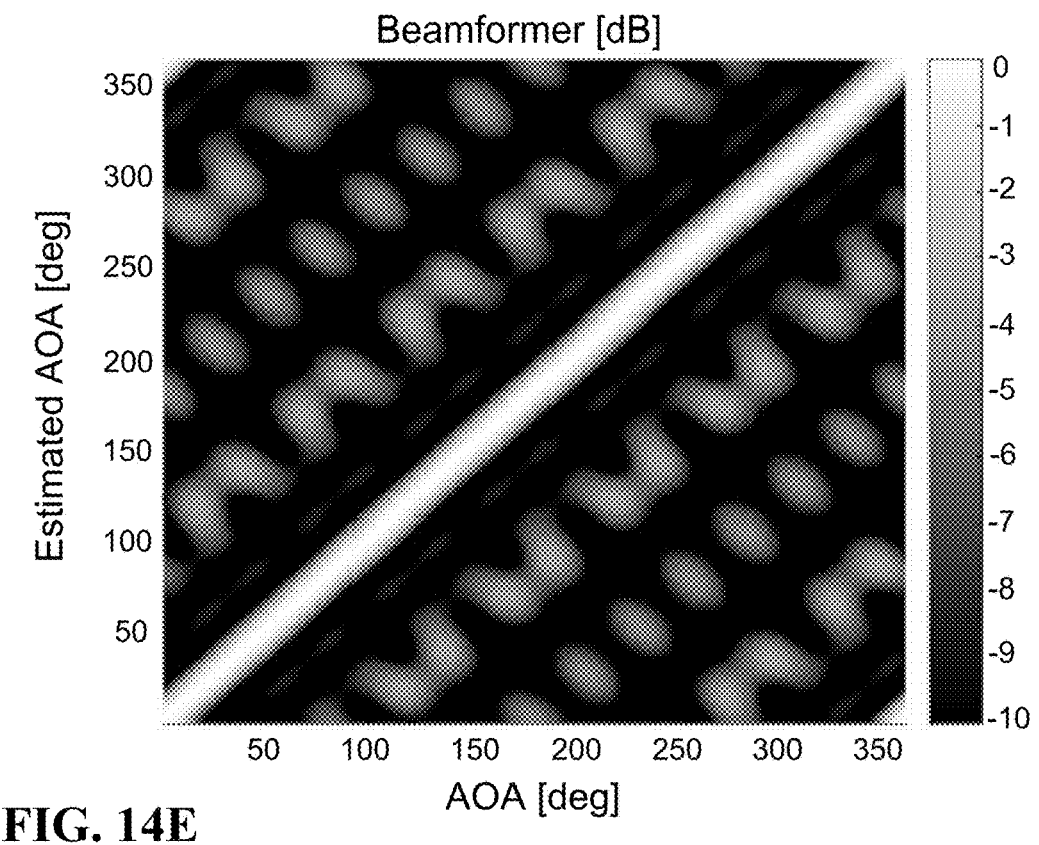
Figure 14F:
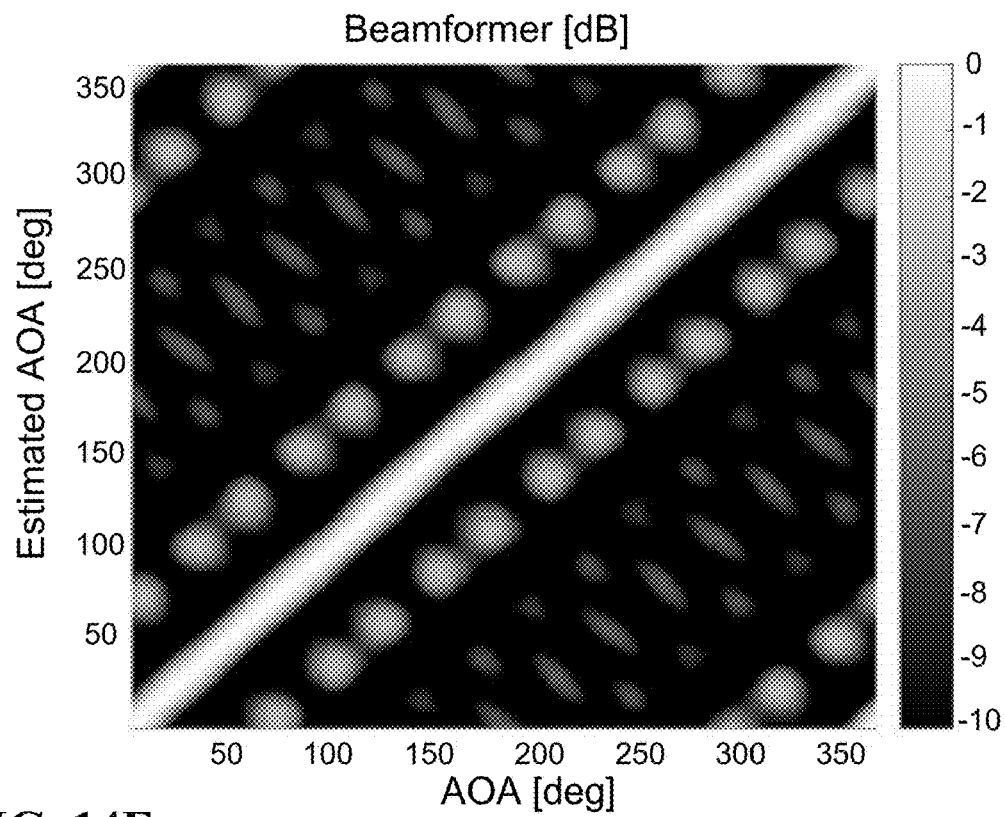
Figure 14G:
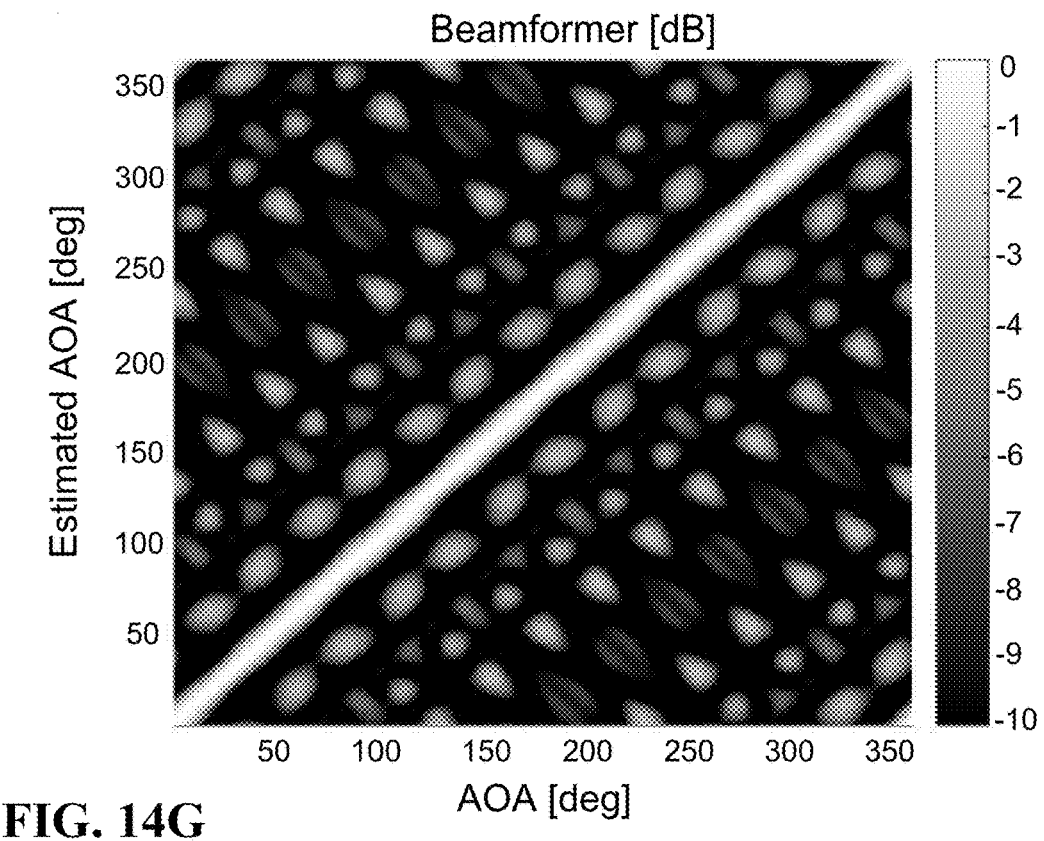
Figure 14H:
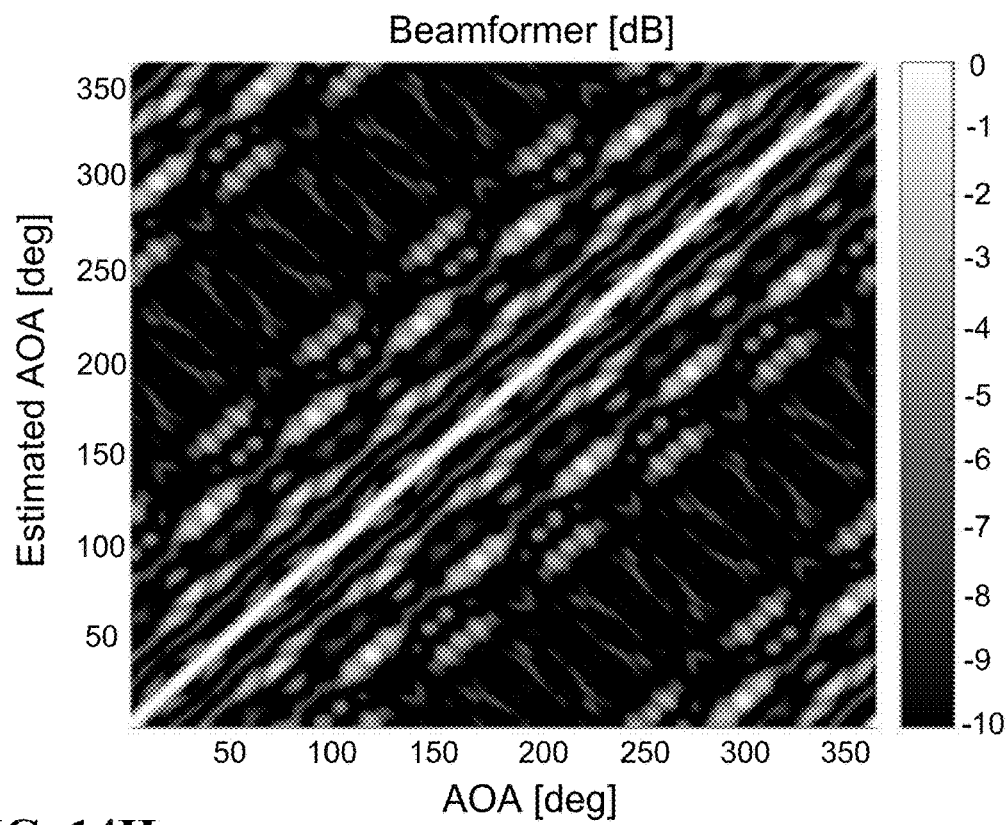
Figure 14I:
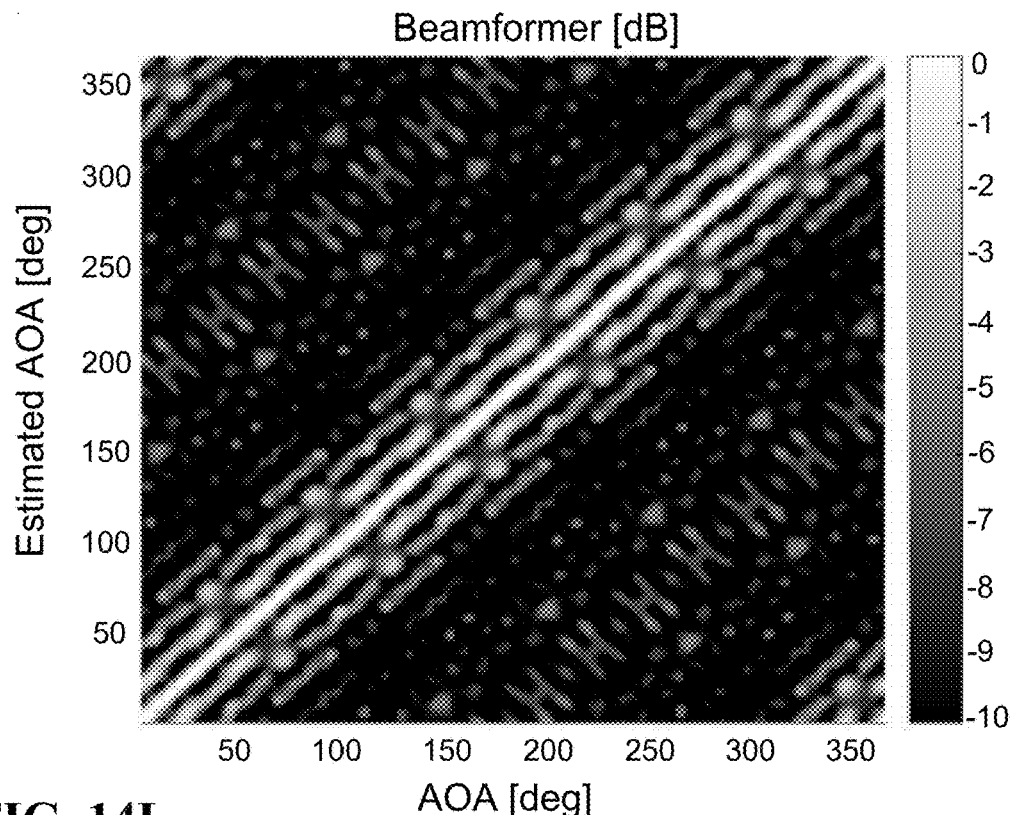
Figure 14J:
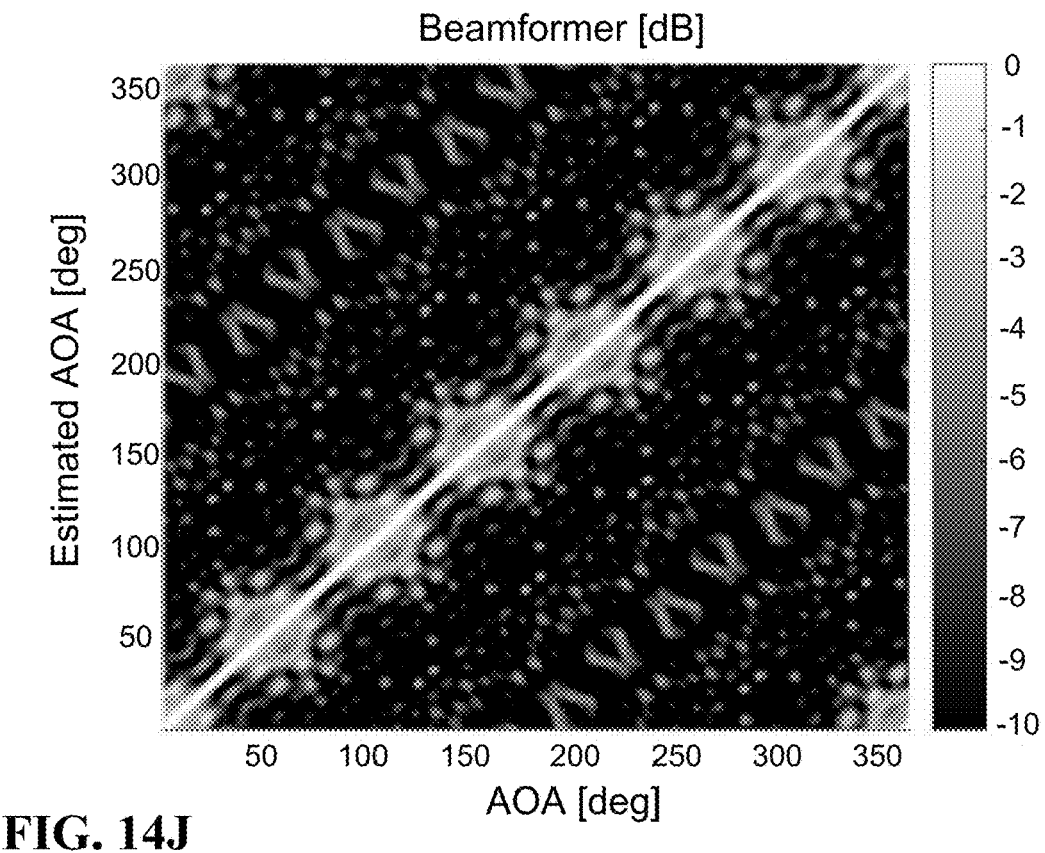

FIGS. 14A to 14J exemplify DF antenna system utilizing quarter circle antenna elements utilizing chokes at selected location along curvature of the antenna elements. FIG. 14A illustrates a single dipole antenna element in which the quarter wave ($\lambda/4$) chokes 152 and 154 are included along curvature of the antenna elements 52 and 54, FIG. 14B illustrates the chokes 152 on antenna element 52 in more details, and FIGS. 14C to 14J show corresponding beam pattern graphs for signal frequencies of 30 MHz, 130 MHz, 180 MHz, 220 MHz, 300 MHz, 500 MHz, 750 MHz and 1000 MHz respectively.

As exemplified in FIG. 14B, the chokes are generally configured as bent tips of conducting material extending from the antenna elements 52 or 54, similarly to the example of FIG. 3. The chokes may be located at different positions along the antenna elements 52 and 54 and are used for reducing interference of signal portions reflected from the antenna element. The sue of choke may typically increase direction finding accuracy for signals of high frequency, generally by reducing signal interference that causes estimation errors, as can be seen between FIGS. 13I and 14J relating to 1000 MHz frequency.

Generally, it can be seen from the above described examples, as well as the example of FIGS. 5A to 5B and FIGS. 6A to 6D, that tapering of the dipole antenna elements provides accurate direction-finding results over a broad band of frequencies. Further, the examples of exponential curve of FIGS. 5A and 5B and quarter circle of FIG. 13A and FIG. 14A typically show greater accuracy over wide bandwidth.

Figure 15A:
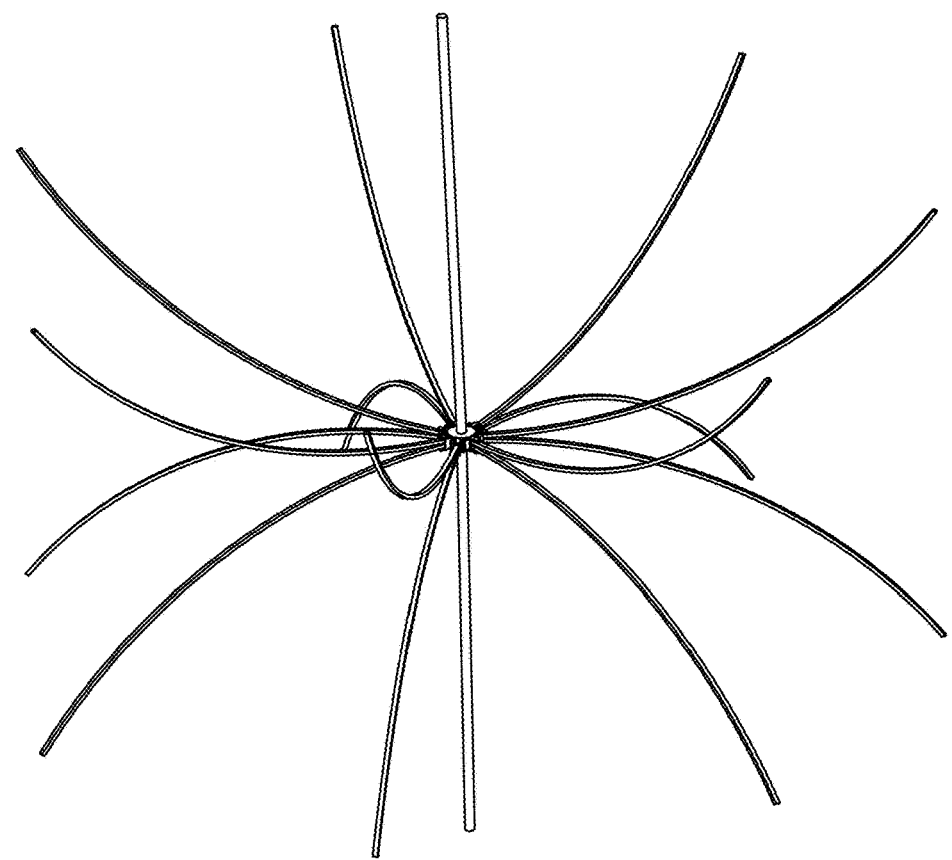
FIGS. 15A to 15I illustrate DF antenna system with general curvature configuration of the tapered dipole antenna elements determined by mechanical constrains (FIG. 15A) and beam patterns for signal frequencies of 30 MHz, 130 MHz, 180 MHz, 220 MHz, 300 MHz, 500 MHz, 750 MHz and 1000 MHz in FIGS. 15B to 15I respectively.
Figure 15B:
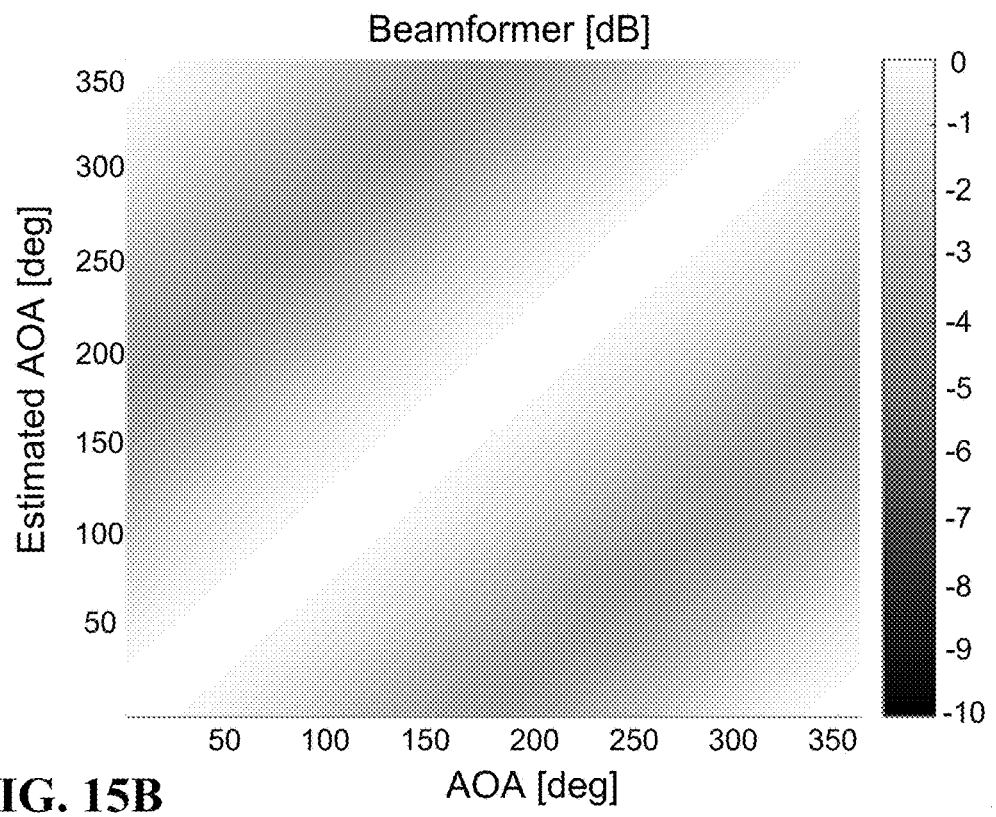
Figure 15C:
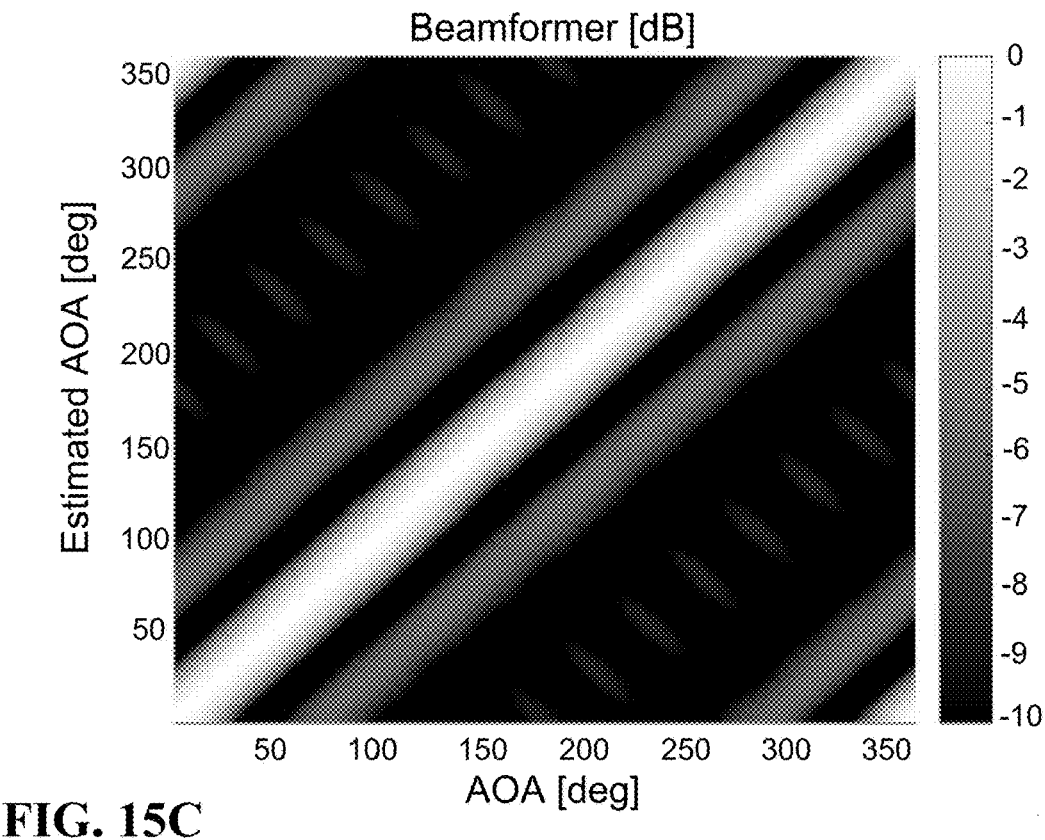
Figure 15D:
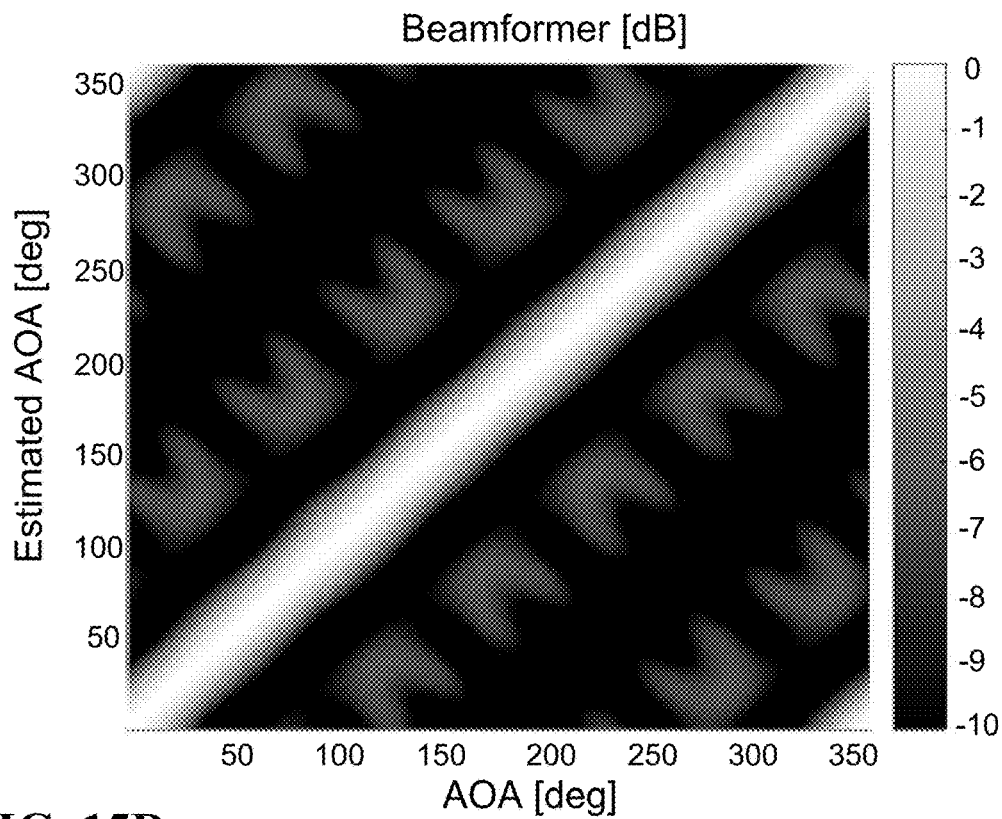
Figure 15E:
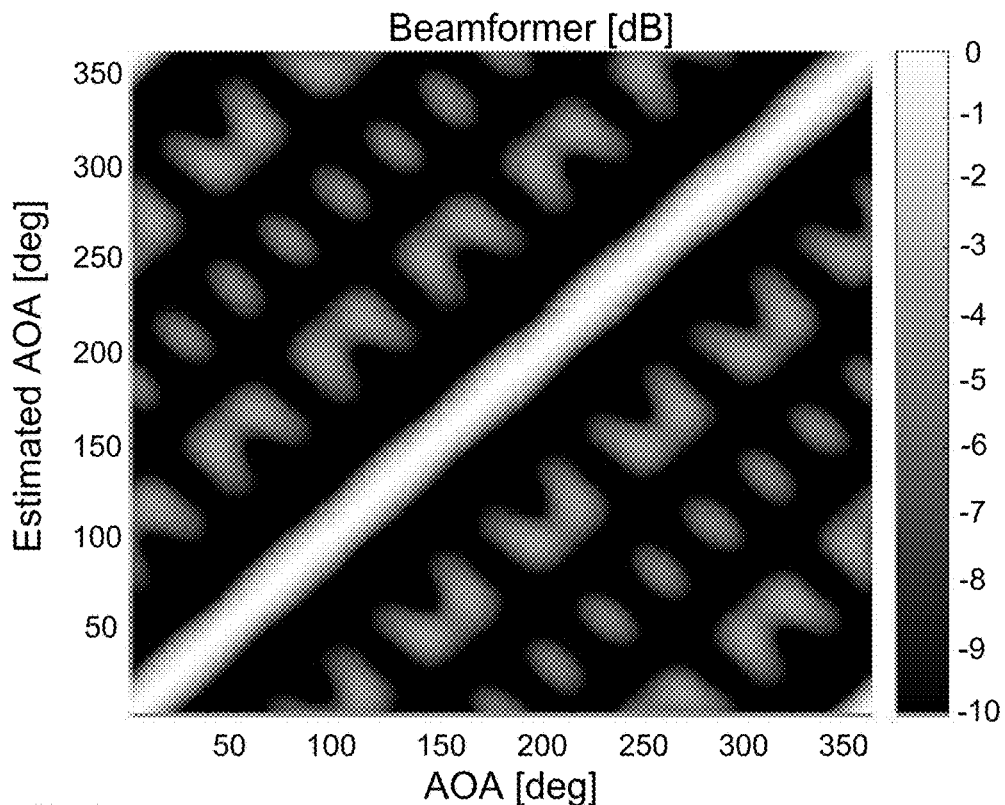
Figure 15F:
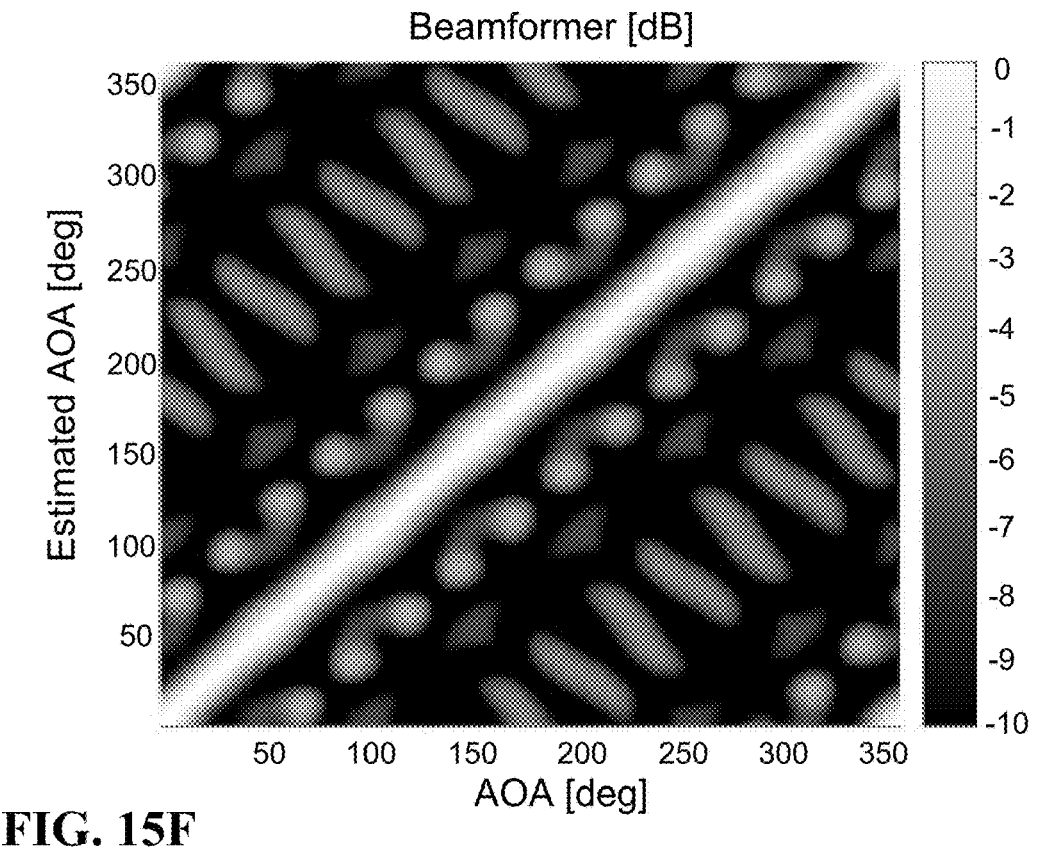
Figure 15G:
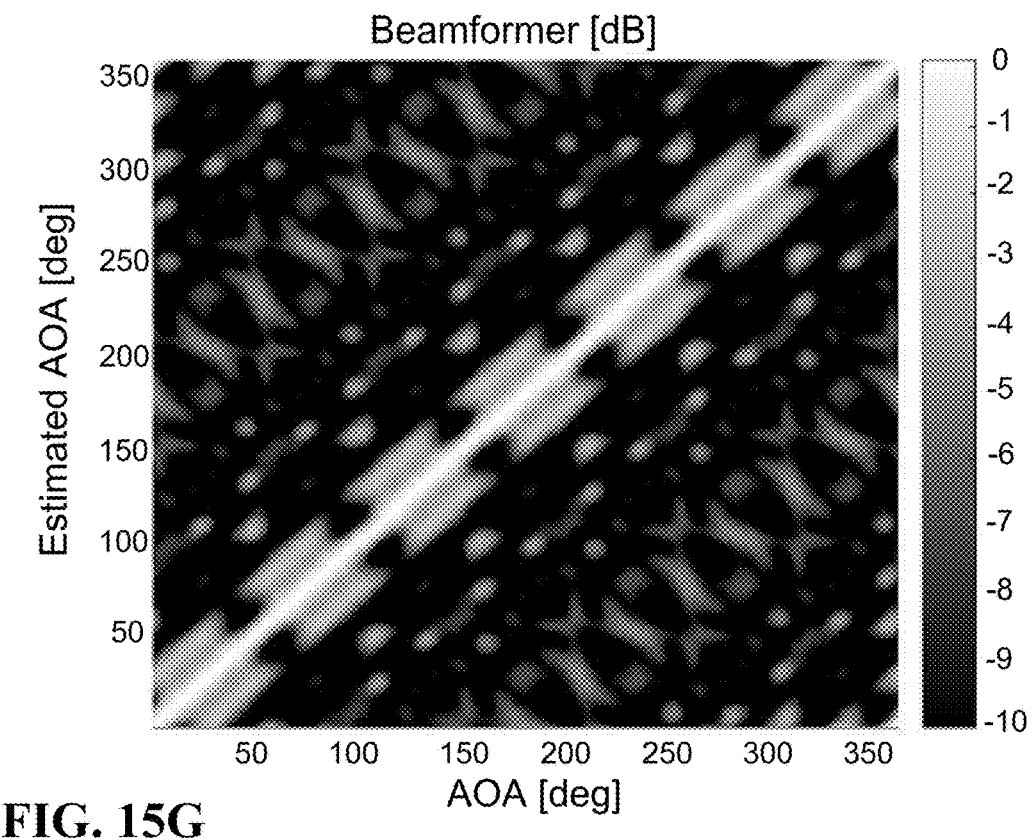
Figure 15H:
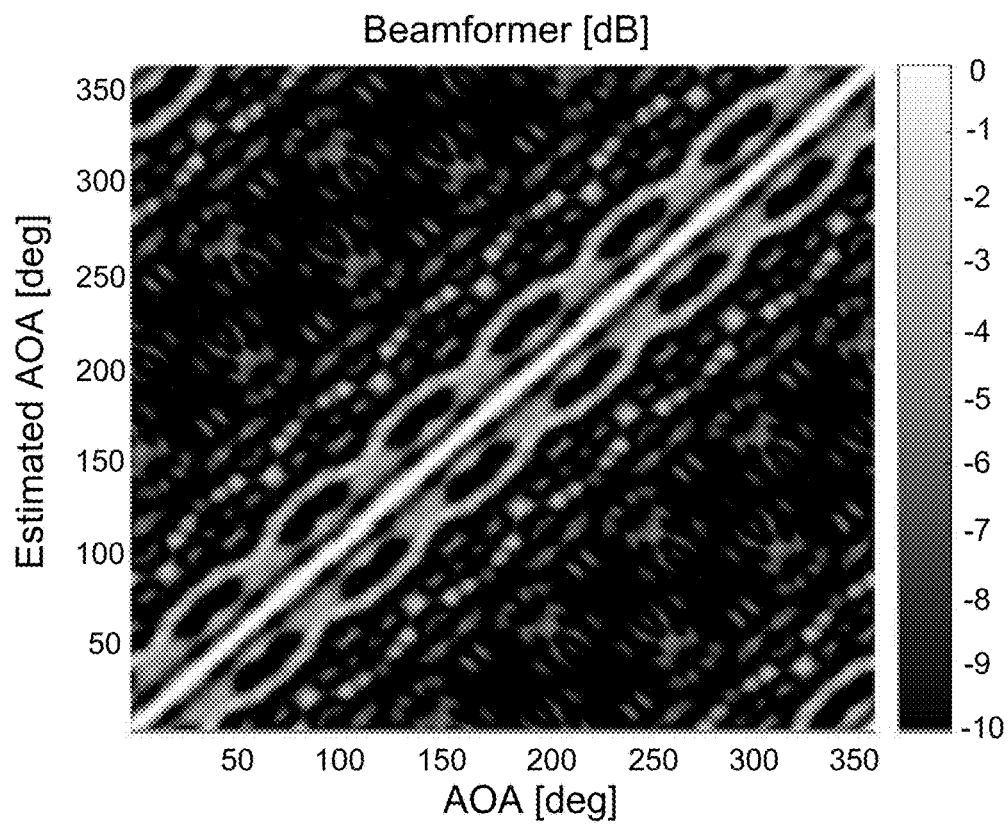
Figure 15I:
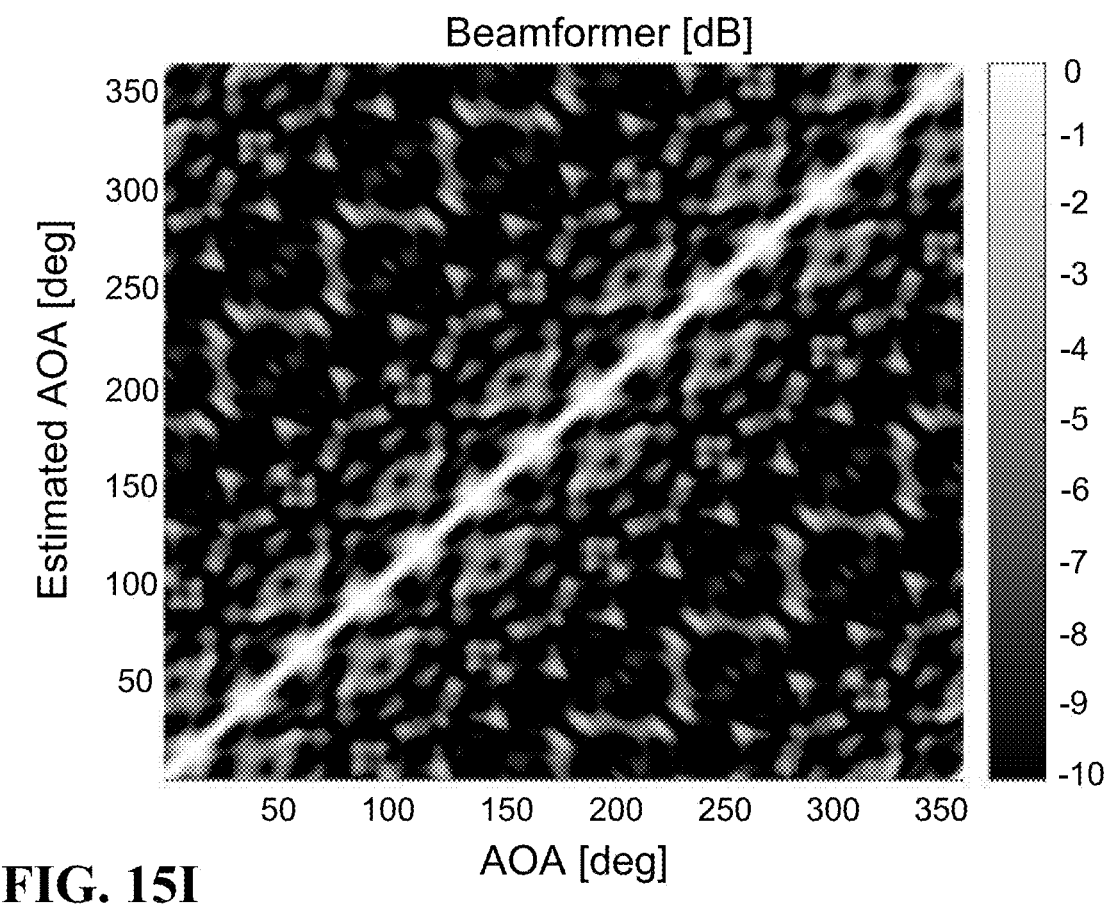

In addition to the above described configurations, the inventors of the present invention considered mechanical constrains as well as preferred wide band performance. In this connection reference is made to FIGS. 15A to 15B illustrating a DF antenna system configuration determined in according with mechanical constrains of the system and corresponding beam pattern graphs. In FIG. 15A, the DF antenna system is configured with dipole antenna elements formed by elongated curved antenna elements as described above. Curvature of the antenna elements is formed by mechanical tension provided by constructions of the system. More specifically, the elongated antenna elements are mounted at vicinity of the central axis to corresponding connectors, where at the mounting location, the antenna elements are oriented parallel to each other extending along the radial direction. At a distal point, located between 0.6 of total length to the distal end of the antenna elements, each antenna element is connected to a second mount, e.g. cable, providing tension toward higher (and lower) point on the central axis, thus bending the antenna element.

Generally, the rectangular elongated antenna elements may be formed from various materials, preferably including a conducting layer located between two sheets of dielectric material as illustrated in FIG. 3. More specifically the rectangular elongated antenna elements may be formed from any one of the following materials: Epoxy Glass, Polycarbonate, Bakelite, Fiber Glass/fiberglass, Plexiglas and Lexan. The electrically conducting layer may be provided as metal sheet and/or suitable doping of the dielectric material to provide sufficient conducting.

Thus, the present technique provides for a broad band direction finding antenna system. The system is configured to be of low form factor, being deployable and mobile. The antenna system is configured with a plurality of tapered dipole antenna element formed of rectangular elongate stripes.

The invention claimed is:

1. A direction-finding antenna system, comprising:
a plurality of tapered dipole antenna elements arranged in circular array around a central axis;
wherein each of the plurality of tapered dipole antenna elements comprises a pair of rectangular elongated antenna elements mounted radially from said central axis and configured to be curved such that a distance between said pair of rectangular elongated antenna elements is larger at periphery of the direction-finding antenna system with respect to a center thereof.

2. The direction-finding antenna system of claim 1, wherein said pair of rectangular elongated antenna elements comprise at least one metal stripe sandwiched between two flexible dielectric stripes.

3. The direction-finding antenna system of claim 1, wherein each of said pair of rectangular elongated antenna elements is configured with ratio between length dimension and width dimension thereof being greater than 10 (L/W>10).

4. The direction-finding antenna system of claim 1, wherein each of said pair rectangular elongated antenna elements comprises one or more chokes along length thereof.

5. The direction-finding antenna system of claim 4, wherein said one or more chokes are located at peripheral end of the pair of rectangular elongated antenna elements.

6. The direction-finding antenna system of claim 4, wherein said one or more chokes comprise at least outward choke and inward choke of different lengths.

7. The direction-finding antenna system of claim 1, wherein the pair of rectangular elongated antenna elements are curved such that a phase center of the plurality of tapered dipole antenna elements is distal for signals of lower frequency and central for signals of higher frequency.

8. The direction-finding antenna system of claim 7, wherein curvature of the pair rectangular elongated antenna elements is selected to provide a ratio between wavelength of collected signal and radial distance of corresponding phase center of signal detection being within predefined range for a selected bandwidth.

9. The direction-finding antenna system of claim 1, wherein said plurality of tapered dipole antenna elements comprises dipole antenna elements of two groups configured for collection of signals of two orthogonal polarizations respectively.

10. The direction-finding antenna system of claim 8, wherein arrangement of the tapered dipole antenna elements defines a general plane for determining signal direction, dipole antenna elements of said two groups comprise dipole antenna mounted for collection of signals of polarities at +45 degrees and −45 degrees with respect to said general plane.

11. The direction-finding antenna system of claim 1, wherein said plurality of tapered dipole antenna elements comprise dipole antenna elements mounted for collection of signals having vertical polarization with respect to general plane defined by the circular arrangement thereof.

12. The direction-finding antenna system of claim 11, further comprising a second circular array of antenna elements configured for collection of signal having horizontal polarization.

13. The direction-finding antenna system of claim 1, configured for operation in RF frequencies between 20 MHz and 1000 MHz.

14. The direction-finding antenna system of claim 1, configured for operation in RF frequencies between 80 MHz and 600 MHz.

15. The direction-finding antenna system of claim 1, configured for operation in RF frequencies between 80 MHz and 250 MHz.

16. The direction-finding antenna system of claim 1, configured for operation in RF frequencies between 80 MHz and 150 MHz.

17. The direction-finding antenna system of claim 1, configured for operation in RF frequencies between 180 MHz and 250 MHz.

18. The direction-finding antenna system of claim 1, configured for operation in RF frequencies between 400 MHz and 600 MHz.

19. The direction-finding antenna system of claim 1, wherein said direction-finding antenna system being configured in mobile mode suitable for low form factor and high mobility and in operation mode configured to be deployed at a selected location for operating in determining direction of origin of collected signals.

* * * * *